United States Patent
Shusman

(10) Patent No.: US 11,483,610 B2
(45) Date of Patent: Oct. 25, 2022

(54) METHOD AND APPARATUS FOR GENERATING INTERACTIVE PROGRAMMING IN A COMMUNICATIONS NETWORK

(71) Applicant: MediaIP, LLC, Lewes, DE (US)

(72) Inventor: Chad W. Shusman, Jenkintown, PA (US)

(73) Assignee: MEDIAIP, LLC, Radnor, PA (US)

( * ) Notice: Subject to any disclaimer, the term of this patent is extended or adjusted under 35 U.S.C. 154(b) by 0 days.

(21) Appl. No.: 16/685,546

(22) Filed: Nov. 15, 2019

(65) Prior Publication Data

US 2020/0084493 A1    Mar. 12, 2020

Related U.S. Application Data

(63) Continuation of application No. 16/252,179, filed on Jan. 18, 2019, now Pat. No. 10,735,797, which is a
(Continued)

(51) Int. Cl.
*H04N 21/2668* (2011.01)
*H04N 21/23* (2011.01)
(Continued)

(52) U.S. Cl.
CPC ........ *H04N 21/2668* (2013.01); *H04H 20/38* (2013.01); *H04H 60/33* (2013.01);
(Continued)

(58) Field of Classification Search
CPC ......... H04N 21/2668; H04N 21/23424; H04N 21/23439; H04N 21/23605;
(Continued)

(56) References Cited

U.S. PATENT DOCUMENTS

| | | | | | |
|---|---|---|---|---|---|
| 5,208,665 | A | * | 5/1993 | McCalley | H04N 21/4755 348/E7.075 |
| 5,539,822 | A | * | 7/1996 | Lett | G06Q 20/401 348/E7.024 |
| 5,589,892 | A | * | 12/1996 | Knee | A63F 13/12 348/E7.071 |

(Continued)

FOREIGN PATENT DOCUMENTS

| | | | | |
|---|---|---|---|---|
| CN | 105578299 A | * | 5/2016 | ......... H04N 21/4312 |
| WO | WO-03090484 A1 | * | 10/2003 | ............. G06Q 30/02 |

OTHER PUBLICATIONS

International Search Report for International Application No. PCT/US03111534 which was filed on Apr. 15, 2003.
(Continued)

*Primary Examiner* — James R Sheleheda
(74) *Attorney, Agent, or Firm* — Volpe Koenig

(57) ABSTRACT

A moderator client device may add program information for multi-media content using interactive elements. The moderator client device may associate an interactive component with the multi-media content using the interactive elements on a moderator interface. An interactive program may be generated from the multi-media content, tags and time-codes, and the interactive component. A response to the interactive program may be received from a viewer client device based on an interaction of the user of the viewer client device with the interactive component. The response received from the viewer client device may be displayed simultaneously with the updated interactive program on the display of each of a plurality of viewer client devices.

40 Claims, 65 Drawing Sheets

Related U.S. Application Data continuation of application No. 15/790,802, filed on Oct. 23, 2017, now Pat. No. 10,187,683, which is a continuation of application No. 14/611,152, filed on Jan. 30, 2015, now Pat. No. 9,800,915, which is a continuation of application No. 11/323,575, filed on Dec. 29, 2005, now Pat. No. 8,949,875, which is a continuation of application No. 10/414,863, filed on Apr. 15, 2003, now abandoned.

(51) Int. Cl.

| | | |
|---|---|---|
| *H04N 21/234* | (2011.01) | |
| *H04N 21/854* | (2011.01) | |
| *H04N 21/2343* | (2011.01) | |
| *H04N 21/8541* | (2011.01) | |
| *H04N 21/47* | (2011.01) | |
| *H04N 21/472* | (2011.01) | |
| *H04N 21/85* | (2011.01) | |
| *H04N 21/40* | (2011.01) | |
| *H04N 21/43* | (2011.01) | |
| *H04N 21/431* | (2011.01) | |
| *H04H 60/33* | (2008.01) | |
| *H04N 7/173* | (2011.01) | |
| *H04N 21/475* | (2011.01) | |
| *H04N 21/442* | (2011.01) | |
| *H04H 20/38* | (2008.01) | |
| *H04N 21/236* | (2011.01) | |
| *H04N 21/258* | (2011.01) | |
| *H04N 7/088* | (2006.01) | |
| *H04N 21/81* | (2011.01) | |
| *H04N 21/8545* | (2011.01) | |

(52) U.S. Cl.
CPC ......... *H04N 7/088* (2013.01); *H04N 7/17336* (2013.01); *H04N 21/23* (2013.01); *H04N 21/234* (2013.01); *H04N 21/23424* (2013.01); *H04N 21/23439* (2013.01); *H04N 21/23605* (2013.01); *H04N 21/23614* (2013.01); *H04N 21/25891* (2013.01); *H04N 21/40* (2013.01); *H04N 21/43* (2013.01); *H04N 21/431* (2013.01); *H04N 21/43079* (2020.08); *H04N 21/44224* (2020.08); *H04N 21/47* (2013.01); *H04N 21/472* (2013.01); *H04N 21/4758* (2013.01); *H04N 21/47202* (2013.01); *H04N 21/812* (2013.01); *H04N 21/85* (2013.01); *H04N 21/854* (2013.01); *H04N 21/8541* (2013.01); *H04N 21/8545* (2013.01); *H04H 2201/30* (2013.01)

(58) Field of Classification Search
CPC ....... H04N 21/23614; H04N 21/25891; H04N 21/40; H04N 21/43; H04N 21/4307; H04N 21/431; H04N 21/44222; H04N 21/47; H04N 21/472; H04N 21/47202; H04N 21/4758; H04N 21/812; H04N 21/85; H04N 21/854; H04N 21/8541; H04N 21/8545; H04N 7/088; H04N 7/17336; H04H 2201/30; H04H 20/38; H04H 60/33

See application file for complete search history.

(56) References Cited

U.S. PATENT DOCUMENTS

| | | | | |
|---|---|---|---|---|
| 5,729,549 A | * | 3/1998 | Kostreski | H04N 7/17336 348/E7.051 |
| 5,818,510 A | | 10/1998 | Cobbley et al. | |
| 5,828,839 A | * | 10/1998 | Moncreiff | G07F 7/00 709/204 |
| 5,936,661 A | * | 8/1999 | Trew | H04N 7/0882 348/E7.071 |
| 5,964,162 A | | 10/1999 | Chuan-Jen | |
| 6,067,564 A | * | 5/2000 | Urakoshi | H04N 21/47211 725/2 |
| 6,185,553 B1 | | 2/2001 | Byrd et al. | |
| 6,205,231 B1 | * | 3/2001 | Isadore-Barreca | G06V 10/24 382/199 |
| 6,211,869 B1 | | 4/2001 | Loveman et al. | |
| 6,240,555 B1 | * | 5/2001 | Shoff | H04N 21/4314 725/111 |
| 6,392,664 B1 | | 5/2002 | White et al. | |
| 6,539,548 B1 | * | 3/2003 | Hendricks | H04N 21/23608 348/E5.103 |
| 6,964,017 B1 | * | 11/2005 | Meisner | G06F 40/143 715/205 |
| 6,968,567 B1 | | 11/2005 | Gordon et al. | |
| 7,039,940 B2 | | 5/2006 | Weatherford | |
| 7,222,163 B1 | * | 5/2007 | Girouard | H04L 67/02 725/86 |
| 7,254,605 B1 | | 8/2007 | Strum | |
| 7,380,206 B1 | * | 5/2008 | Usuda | H04N 21/4722 715/236 |
| 7,669,223 B1 | * | 2/2010 | Hendricks | H04N 5/602 725/115 |
| 7,849,481 B2 | * | 12/2010 | Moon | H04N 21/8583 725/51 |
| 8,949,875 B2 | * | 2/2015 | Shusman | H04N 21/44224 725/74 |
| 9,210,472 B2 | * | 12/2015 | Andrews, II | H04N 21/2547 |
| 9,800,916 B2 | * | 10/2017 | Shusman | H04N 21/23605 |
| 10,187,683 B2 | * | 1/2019 | Shusman | H04N 21/43079 |
| 10,735,797 B2 | * | 8/2020 | Shusman | H04N 21/47 |
| 10,856,031 B2 | * | 12/2020 | Shusman | H04N 21/40 |
| 11,076,190 B2 | * | 7/2021 | Shusman | H04N 21/8545 |
| 2001/0023436 A1 | * | 9/2001 | Srinivasan | G11B 27/031 709/219 |
| 2001/0037376 A1 | | 11/2001 | Ullman et al. | |
| 2001/0047516 A1 | | 11/2001 | Swain et al. | |
| 2002/0007493 A1 | | 1/2002 | Butler et al. | |
| 2002/0013947 A1 | | 1/2002 | Russell et al. | |
| 2002/0083473 A1 | | 6/2002 | Agnihotri et al. | |
| 2002/0088004 A1 | | 7/2002 | Kitsukawa et al. | |
| 2002/0088011 A1 | | 7/2002 | Lamkin | |
| 2002/0133405 A1 | * | 9/2002 | Newnam | G06Q 30/02 705/14.58 |
| 2002/0138849 A1 | | 9/2002 | Blackketter et al. | |
| 2002/0143901 A1 | * | 10/2002 | Lupo | H04N 21/4758 348/E7.071 |
| 2002/0178442 A1 | * | 11/2002 | Williams | H04N 7/17318 348/E7.071 |
| 2002/0199209 A1 | | 12/2002 | Shiga | |
| 2003/0025832 A1 | | 2/2003 | Swart et al. | |
| 2003/0028890 A1 | | 2/2003 | Swart et al. | |
| 2003/0098869 A1 | * | 5/2003 | Arnold | H04N 21/4622 345/589 |
| 2003/0115612 A1 | | 6/2003 | Mao et al. | |
| 2003/0196198 A1 | | 10/2003 | Broussard et al. | |
| 2003/0196206 A1 | | 10/2003 | Shusman | |
| 2003/0208755 A1 | * | 11/2003 | Zimmerman | H04N 21/4668 725/35 |
| 2004/0032486 A1 | * | 2/2004 | Shusman | G06Q 30/02 348/14.09 |
| 2004/0078822 A1 | | 4/2004 | Breen et al. | |
| 2004/0117395 A1 | | 6/2004 | Gong | |
| 2004/0136698 A1 | * | 7/2004 | Mock | G11B 27/034 386/E5.064 |
| 2004/0210947 A1 | * | 10/2004 | Shusman | H04N 7/17336 725/135 |
| 2004/0250272 A1 | | 12/2004 | Durden | |
| 2004/0255336 A1 | * | 12/2004 | Logan | H04N 21/4663 725/38 |
| 2005/0047752 A1 | | 3/2005 | Wood et al. | |
| 2005/0154599 A1 | * | 7/2005 | Kopra | G06Q 30/06 725/106 |

(56) References Cited

U.S. PATENT DOCUMENTS

| | | | | | |
|---|---|---|---|---|---|
| 2005/0262542 | A1* | 11/2005 | DeWeese | | H04N 21/254 |
| | | | | | 348/E7.071 |
| 2006/0129458 | A1* | 6/2006 | Maggio | | G06Q 30/0218 |
| | | | | | 705/14.2 |
| 2006/0195887 | A1* | 8/2006 | Shusman | | H04N 21/2668 |
| | | | | | 725/138 |
| 2009/0094632 | A1* | 4/2009 | Newnam | | H04N 21/43074 |
| | | | | | 725/24 |
| 2009/0276805 | A1* | 11/2009 | Andrews, II | | H04N 21/435 |
| | | | | | 725/38 |
| 2013/0195429 | A1* | 8/2013 | Fay | | H04L 41/22 |
| | | | | | 715/744 |
| 2014/0150020 | A1* | 5/2014 | Begeja | | H04N 21/858 |
| | | | | | 725/34 |
| 2014/0304042 | A1* | 10/2014 | Foroutan | | H04N 21/2743 |
| | | | | | 705/12 |
| 2015/0281755 | A1* | 10/2015 | Shusman | | H04N 21/47202 |
| | | | | | 725/13 |
| 2018/0048926 | A1* | 2/2018 | Shusman | | H04N 7/088 |
| 2019/0020615 | A1* | 1/2019 | Golden | | H04L 65/1069 |
| 2019/0230397 | A1* | 7/2019 | Shusman | | H04N 21/47 |
| 2019/0387267 | A1* | 12/2019 | Shusman | | H04N 21/8545 |
| 2020/0084493 | A1* | 3/2020 | Shusman | | H04N 7/17336 |
| 2020/0366953 | A1* | 11/2020 | Shusman | | H04N 7/088 |
| 2021/0084353 | A1* | 3/2021 | Shusman | | H04N 21/8541 |
| 2021/0352350 | A1* | 11/2021 | Shusman | | H04N 7/17336 |

OTHER PUBLICATIONS

Hurwicz et al., Special Edition Using Macromedia Flash Mix, Que Corporation (2003).

Towes, Macromedia Flash Communication Server MX, Pangaea NewMedia, Inc. (2003).

* cited by examiner

| Time | Transcript 607 | Datafeed 1 608 Pop-up Facts | Datafeed 2 610 More Info | Datafeed 3 Comments & Polls 612 | Datafeed 4 Commerce 614 |
|---|---|---|---|---|---|
| 0:00 | John: So what does NATO do? | | | | |
| 0:04 | Joe: Right now, NATO does a tremendous amount- they provide AWL protection to countries like Turkey. They patrol DEA lanes. There will be a lot of NATO support activity, even if no direct NATO involvement. | Formed in 1949, NATO was set up largely to discourage an attack by the Soviet Union on the non-communist nations of Western Europe. | North Atlantic Treaty Organization (NATO) is a military alliance consisting of the United States, Canada, and other Western Countries. | | |
| 0:37 | John: The reason I wanted to ask is...how big is it? How many countries are involved, military, how many countries are headquartered in Brussels? | | | I can't stand organizations like NATO. I don't like the idea of countries giving up their sovereignty to big, unwieldy global power -Yulnarwe3 | "Of Paradise and Power: America Vs. Europe in the New World Order" - $12.60 from Amazon |
| 0:44 | Joe: Headquartered in Brussels, 19 countries with a new relationship with Russia and they've admitted new countries and it's a giant organization, multi-layers of bureaucracy and a political side and a military side that work together. They try very very hard to coordinate civilian and military and they coordinate among all the governments and all the decisions taken by consensus. There's no majority voting going on. | After World War II ended in 1945, an intense rivalry developed between Communist countries, led by the Soviet Union, and non-Communist nations, led by the United States. This rivalry became known as the Cold War. | NATO was established not to only discourage Communist aggression but also to keep peace among former enemies in Western Europe. In World War II, for example, Italy and Germany had fought most of the other countries that later became NATO members. | | |
| 1:16 | John: Who runs it now? | NATO's central office had been in Paris. In 1967, the organization moved its headquarters to Brussels, Belgium.. | | | |

You are logged in as User  Home | My Account | Preferences | Suggestions | Marketplace | Help

— 3024

Search [____] [Go]

Categories
Arts & Humanities
Auctions & Classifieds
Auto & Vehicle
Business
Community
Computing
Directory
Education
Employment
Entertainment
Family
Games
Health
Hobbies
Home & Garden
Humor
International
Internet
Lifestyles
Music
News — 3027
People
Personal Finance
Pets & Animals
Politics
Real estate
Recreation
Science & Tech
Shopping
Sports
Travel

3026

My Profile
Edit or update your information, and click submit and continue when you're done.

USERNAME  J Doe — 3000
PASSWORD  •••••••• — 3002
FIRST NAME John — 3004
LAST NAME  Doe — 3006
PROFILE    I'm interested in sports, movies and music. — 3008
           3010
EMAIL      JDoe@!$^#.com — 3012
CITY/STATE/ZIP [____] [Pa ▼] [19101]
                3016  3018   3020
COUNTRY    [USA ▼] — 3022
INCLUDE IN [☒]
DIRECTORY?
   3022

[Submit and Continue] — 3003

Advertised Product or Service — 3028

Features
Reliability: Find out about the real story on car ratings in our New Cars zone.

At the Box Office: Get the buzz on this weekend's movies in Film Buffs

Playoff Fever: The Playoffs are coming- get ready in the Hoops area

You are logged in as User    Home | My Account | Preferences | Suggestions | Marketplace | Help Search
[Go]

Categories
Arts & Humanities
Auctions & Classifieds
Auto & Vehicle
Business
Community
Computing
Directory
Education
Employment
Entertainment
Family
Games
Health
Hobbies
Home & Garden
Humor
International
Internet
Lifestyles
Music
▷News
People
Personal Finance
Pets & Animals
Politics
Real estate
Recreation
Science & Tech
Shopping
Sports
Travel

News — 3100
Choose from the menu below to access talk shows, resources and interactive features related to that subject.

- National — 3102
  Discuss headlines from across America.
- World — 3104
  The latest developments from around the globe.
- Business — 3106
  The top news from the financial world.
- Sports — 3108
  College and pro scores, results and recaps.
- Weather — 3110
  The latest conditions for your area.
- Entertainment — 3112
  What's new in Hollywood.

Advertised Product or Service

Features
War on Terror:
Discuss the latest developments in World News

Cold & Flu Season:
Find out how to protect yourself and your family in Your Health Which Wine?:
Become an instant connoisseur in the Home Cooking Area

FIG. 31

You are logged in as User     Home | My Account | Preferences | Suggestions | Marketplace | Help The Gardening Center
3308

Gardening Menu

Talk shows
Archives
Community
Web Resources

Search [____] Go

Categories
Arts & Humanities
Auctions & Classifieds
Auto & Vehicle
Business
Community
Computing
Directory
Education
Employment
Entertainment
Family
Games
Health
Hobbies
Home & Garden
Humor
Internet
International
Lifestyle
Music
News
People

Talk Show Archives
Date
Click on a show title to view a transcript. Real Networks and Windows Media Player logo denotes that streaming audio or video is available.

| SHOW NAME | TOPIC | BROADCAST ON |
|---|---|---|
| Let's Talk Gardening | The Best Seed Catalogs | Date |
| Growing Concerns | Bird Feeders | Date |
| Let's Talk Gardening | Delphiniums | Date |
| Let's Talk Gardening | Houseplants | Date |
| Green Thumbs | Growing a Shade Garden | Date |
| Growing Concerns | Controlling Vines | Date |
| Let's Talk Gardening | Dwarf conifers | Date |

3300   3301   3302   3304   3306

Advertisement

Poll Question
If you could only plant one vegetable in your garden this year what would it be?
o Cucumber
o Eggplant
o Collards
o Turnip Greens
o Sweet corn
o Tomato
o Okra
o Squash
o Pepper
o Green Beans

[Vote!]

FIG. 33

SHOW AUTHORING TOOL

Home | My Account | Preferences | Suggestions | Marketplace | Help

You are logged in as User

Modify Talk Show
▷ Basic Settings
— Edit Broadcast Schedule
— Add Co-Host
— Themes
— Send Reminders
— Change My Profile
— Advanced Options Archives
Transcripts
Audience Data
Traffic Reports Support
Help Index 3419
3420
3422
3424

3426

Gardening with Katie: Basic Settings — 3400

SHOW NAME: Gardening with Katie — 3402

DESCRIPTION: A fun weekly show for amateur gardeners to share tips and tricks! — 3404

HOSTED BY: — 3406

CATEGORY /GENRE: Home > Gardening ▽ — 3408

BROADCASTS: Weekly ▽ — 3410
3412

☐ Sunday ☐ Monday ☐ Tuesday ☐ Wednesday ☐ Thursday ☐ Friday ☒ Saturday

3:30 PM ▽  All times Eastern — 3414

INCLUDE IN PROGRAM GUIDE? ☒ — 3416

[Submit and Continue] — 3418

FIG. 34

CUSTOMIZE REPORTS

Home | Menu | Customize | Help | Logout

Select Report Group: [select ▽] [Go] — 3500

Show

Interactive Usage Report — 3502

Traffic Reports — 3506

- 3504 — ☒ Peak Usage
  Select Format: [Bar Graph ▽]
- 3508 — ☒ Total Traffic
  Select Format: [Bar Graph ▽]
- 3512 — ☐ Breakdown by User
  Select Format: [(Select) ▽]
- 3516 — ☐ Breakdown by Demographic
  Select Format: [(Select) ▽]
- 3520 — ☐ Breakdown by Geography
  Select Format: [(Select) ▽]
- 3524 — ☐ Visitor Paths
  Select Format: [(Select) ▽]
- 3528 — ☒ Referral Data
  Select Format: [Line Chart ▽]

Community

- ☒ Polling Data — 3534
  Select Format: [Pie Chart ▽]
- ☐ Clicks by User — 3538
  Select Format: [(Select) ▽]
- ☒ Feature Utilization — 3542
  Select Format: [Pie Chart ▽]
- ☐ Chat/IM Transcript Analysis — 3544
  Select Format: [(Select) ▽]

Triggers — 3550

- ☒ Search Terms
  Select Format: [Bar Graph ▽]
- ☐ Meta Tags — 3554
  Select Format: [(Select) ▽]
- ☒ Requested Content Groups — 3558
  Select Format: [Pictograph ▽]
- ☐ Breakdown by Topic — 3562
  Select Format: [(Select) ▽]
- ☒ Breakdown by Theme — 3566
  Select Format: [Bar Graph ▽]

[Submit and Continue]

You are logged in as User    Home | My Account | Preferences | Suggestions | Marketplace | Help

MY INTERACTIVE PROGRAMS — 4300

4301

| MIC RATING | SHOW NAME | NEXT BROADCAST | REMIND ME | DELETE |
|---|---|---|---|---|
| 🎤 | Show 1 | Date - Time | ☒ | ☐ |
| 🎤 | Show 2 | Date - Time | ☐ | ☐ |
| 🎤 | Show 3 | Date - Time | ☒ | ☐ |
| 🎤 4302 | Show 4 4304 | Date - Time 4306 | ☒ 4308 | ☐ 4310 |

What's On Today
Find Talk Shows
Business
Computers
Current Events
Health
Home
Kids
Musics/Movies
Regional
Shopping
Sports
Television Search [ ] [Go]

[Update Settings] — 4312

Advertisement

FIG. 43

You are logged in as User    Home | My Account | Preferences | Suggestions | Marketplace | Help

SHOW HOME PAGE

What's On Today
Program Guide
Find Talk Shows
Business
Computers
Current Events
Health
Home
Kids
Music/Movies
Regional
Shopping
Sports
Television Search [ ] Go Advertisement 4803 — Gardening with Katie —4800
4802
Show Description
The Show is for serious amateur gardeners and anyone who just wants to make their world a little greener. Come and discuss all aspects of gardening with me every weekend. We'll have hints, tips and special guests. Come on by!

Last edited by JDoe2
Date

| Add this to My Talk Shows |—4808
| Contact the Host |—4810
| More shows like this |—4812

4804
Upcoming Shows    4805
                Remind Me

Date & Time    ☐ —4806
Pest Control

Date & Time    ☐
Terrariums

Date & Time    ☐
Greenhouse Plants

Date & Time    ☐
Seeds & Grafting

Date & Time    ☐
Flower Language

Date & Time    ☐
Bonsai Trees

SHOW AUTHORING TOOL

You are logged in as User    Home | My Account | Preferences | Suggestions | Marketplace | Help Talk Show Wizard
Basic Settings
Description and Keywords
△ Genre/Theme —— 5902
Customize Appearance
Broadcast Schedule
Invitations
Launch The Bottom Line: Genre/Theme If you'd like your show to have a preset genre, select from the menu below (click on a name for more information). This will set up certain "look and feel" aspects of your show to match your selected genre, and save you some time in setting up your show. When you are done, click Submit and Continue.

☐ No Selection
☒ News/Perspective
☐ Sports
☐ Human Interest —— 5904
☐ Comedy
☐ Confrontation/Trash
☐ Do-it-Yourself
☐ Sales/Informercial ☐ Daytime
☐ Prime Time
☐ Late Night

[Submit and Continue] —— 5906

METHOD AND APPARATUS FOR GENERATING INTERACTIVE PROGRAMMING IN A COMMUNICATIONS NETWORK

CROSS-REFERENCE TO RELATED APPLICATIONS

This application is a continuation of U.S. patent application Ser. No. 16/252,179, filed Jan. 18, 2019, entitled "PROVIDING INTERACTIVE VIDEO ON DEMAND," which is a continuation of U.S. patent application Ser. No. 15/790,802, filed Oct. 23, 2017, entitled "PROVIDING INTERACTIVE VIDEO ON DEMAND," which is a continuation of U.S. patent application Ser. No. 14/611,152, filed Jan. 30, 2015, entitled "METHOD AND APPLICATION FOR INTERACTIVE VIDEO ON DEMAND", on Oct. 24, 2017, which is a continuation of U.S. patent application Ser. No. 11/323,575, filed Dec. 29, 2005, entitled "METHOD AND APPLICATION FOR INTERACTIVE VIDEO ON DEMAND," which is a continuation of U.S. patent application Ser. No. 10/414,863, filed on Apr. 15, 2003, entitled "METHOD AND APPARATUS FOR INTERACTIVE VIDEO ON DEMAND," now abandoned, which is related to U.S. patent application Ser. No. 11/335,200, filed Jan. 18, 2006, entitled "METHOD AND APPARATUS FOR INTERNET-BASED INTERACTIVE PROGRAMMING" (which is continuation application of U.S. patent application Ser. No. 10/123,618, filed Apr. 15, 2002, entitled "METHOD AND APPARATUS FOR INTERNET-BASED INTERACTIVE PROGRAMMING"), and U.S. patent application Ser. No. 10/222,461, filed on Aug. 16, 2002, entitled "METHOD AND APPARATUS FOR INTERACTIVE PROGRAMMING USING CAPTIONING," now abandoned, the entire contents of all of which are incorporated by reference as if stated fully herein.

BACKGROUND

This invention pertains generally to the field of generating interactive programming and more specifically to generating and transmitting interactive programming including participants' interactions over a communication network.

Broadcast media, such as television, have traditionally been limited to serial processes where a program is broadcast to a viewer in an audience with limited opportunities, such as calling in over a telephone line to talk to a talk show host, for the viewer to participate in the program. The evolution to a more interactive form of broadcast media, or media where the viewer is allowed to participate, has been slow given the lack of bidirectional communication channels between the viewer and the program broadcaster.

When bidirectional communication channels are created, viewer participation has so far been limited to choosing program content, responding to advertising messages, and answering viewer questionnaires or polls. This is primarily because most interactive programming follows a conventional broadcast program paradigm wherein the programming is wrapped in advertisements; and the only responses needed from an audience are to view linear pre-recorded programs and to buy advertised items or services. Little has been done to fully involve the audience in a rich participatory experience where the audience has as much control and influence over the content of an interactive program as the originator of the interactive program. Such limited viewer participation is in contrast to the expectations of some viewers who want a richer and more satisfying participatory experience within the context of an interactive program.

Therefore, a need exists for a light-weight interactive programming system allowing for rich viewer participation which is easily integrated with existing content. The present invention meets such need Some television programs include captioning information created by the television program broadcaster. The captions are encoded into the television signal and broadcast to a viewer's television where the captions are extracted from the television signal and displayed on the viewer's television screen. The captions are intended for the hearing impaired and contain textual representations of the auditory components of a television broadcast. While intended for the hearing-impaired, captions are used in a variety of situations. For example, the captions may be used in lieu of the audio components of the television signal so that viewers can still watch television in environments where the noise levels are very high, for example in a gymnasium.

The captioning for a television program include a textual representation of the entire contents of the television program since the captions are intended as a complete replacement for the audio components of a television program. This aspect of captions makes the captions useful for a variety of other purposes. For example, the captions can be used to create transcriptions of a television program for archival purposes. In addition, the captions provide a compact representation of the complete television program. Finally, a description or metadata may be generated for a television program using the caption information. These different uses for captioning data make captioning an attractive source of information and content for people desiring to form special interest groups or communities around particular television programs. For example, a commentator may want to create a talkshow to explore news items included in a televised news report. Such a talkshow would allow viewers and a commentator to fully explore news items within the context of a news broadcast.

Therefore, a need exists for an interactive program generation tool allowing the creation of a talkshow from captioning data. Such a tool should be lightweight, meaning it does not require a lot of processing resources to run, and should be able to generate interactive programming for a variety of different display devices. The present invention meets such a need.

Television has traditionally been a serial process where a television program having a series of images and sounds are broadcast to a viewer in an audience with limited opportunity for the viewer to participate in the television program. The evolution to a more interactive form of television, or television where the viewer is allowed to participate, was slow given the lack of bidirectional communication channels between the viewer and the television program broadcaster. When bidirectional communication channels were created, they tended be of insufficient bandwidth for communication of complex viewer interactions with the television program.

Development of a nearly ubiquitous communications network, namely the Internet, has greatly expanded the use of interactive television. However, viewer participation has so far been limited to choosing television content, responding to advertising messages, and answering viewer questionnaires or polls. This is primarily because most interactive television programming follows a conventional television paradigm wherein the television programming is wrapped in advertisements; and the only responses needed from an audience are to watch linear pre-recorded programs and to buy advertised items or services. Little has been done to fully involve the audience in a rich participatory experience where the audience has as much control and influence over the content of an interactive program as the originator of the interactive program. This is in contrast to the expectations of some viewers who want a richer and more satisfying participatory experience within the context of an interactive program.

Some interactive television formats also have a disadvantage in that, although they may use the Internet as a bidirectional communication channel, the interactive television format is dependent upon set-top-boxes and middleware that a viewer either purchases or leases from a broadcaster such as a cable operator. While these devices may have a variety of functional features, they may require an additional expenditure that a viewer or a Multiple Systems Operator (MSO) may not want to incur, especially if the viewer already has an Internet-enabled device such as a home computer. This makes most existing interactive television programming "heavy" in the sense that specialized hardware is needed to take advantage of the interactive content embedded in an interactive programming signal. Additionally, the combination of a required set-top-box and specialized interactive television formats make interactive programming distributed over an interactive television network difficult to integrate with conventional Web content such as Web pages available from a Web site.

Therefore, a need exists for a light-weight interactive programming system allowing for rich viewer participation which is easily integrated with existing content. The present invention meets such need.

SUMMARY

In one aspect of the invention, an interactive programming server embeds interactive components into a video signal. The interactive programming server receives content from a content source and interactive components from an interactive component source and uses the content and interactive components to generate an interactive Video On Demand (iVOD) interactive program. The iVOD interactive program is transmitted through a communications medium to a participant who views the content and interacts with the interactive components of the iVOD interactive program. The participant's responses to the content is transmitted back to the interactive programming server where the participant responses are incorporated into new content which is used to generate new iVOD interactive programming.

In another aspect of the invention, the content is a television signal having a vertical blanking interval and the interactive program is generated by embedding the interactive component in the vertical blanking interval.

In another aspect of the invention, the content is a digital video signal and generating the interactive program includes encapsulating the interactive components in a first elementary stream of a digital video broadcast transport stream and adding the content to a second elementary stream of the video broadcast transport stream.

In another aspect of the invention, the communications medium may be a cable television network, a satellite television network, or a wide area network.

In another aspect of the invention, the participant response includes an audience approval rating of the interactive program.

In another aspect of the invention, the participant response includes an answer to a poll question.

In another aspect of the invention, the interactive component includes additional information about the content.

In another aspect of the invention, the interactive component is a uniform resource locator of a resource coupled to the interactive programming transceiver through a wide area network. The resource may be a Web site where a participant can complete a commercial transaction such as purchasing an advertised product.

In another aspect of the invention, the interactive component includes an advertisement.

In one aspect of the invention, an interactive program includes moderator content generated by the moderator and edited participant commentary that is served by a moderator server. Moderators create and manage interactive programs using a Web site. Viewers register to be participants in interactive programs using the Web site as well. The interactive programs can be distributed as electronic documents written in a markup language such as HTML or XML over the Internet. The interactive programs can also be converted to conventional interactive television content for distribution over an interactive television network. The interactive programs can also be distributed over a Virtual Private Network (VPN) for use as a secure collaboration tool by an enterprise such as a business concern. The interactive programs require few processing resources so the interactive programs can be embedded within other Web processes such as electronic commerce (eCommerce) or television commerce (t-Commerce) transactions.

In another aspect of the invention, a method is provided for creating and transmitting an interactive program over a communications network. A moderator server is operably coupled to the communications network. A moderator client and a plurality of viewer clients are operably coupled to the moderator server via the communications network. In operation, participant comment signals are received by the moderator server via the communications network from the plurality of viewer clients and transmitted by the moderator server via the communications network to the moderator client. The moderator server then receives from the moderator client edited participant comment signals and moderator signals and generates interactive program signals using the edited participant comment signals and the moderator signals. The interactive program signals are then transmitted by the moderator server via the communications network to the plurality of viewer clients.

In another aspect of the invention, a data processing system is adapted for creating and transmitting an interactive program to a plurality of viewer clients as described above. In addition, the data processing system receives content signals from a content server and generates the interactive program signals using the content signals, edited participant comment signals, and the moderator signals.

In another aspect of the invention, the data processing system receives content signals from a content server and transmits the content signals via the communications network to the viewer clients while incorporating the content signals into the interactive program.

In another aspect of the invention, the communications network is a virtual private network thus enabling private and secure transmission of an interactive program throughout an enterprise.

In another aspect of the invention, the participant comment signals further include an interactive program rating signal indicating a level of audience satisfaction with the interactive program.

In another aspect of the invention, the moderator signals further include a participant exclusion signal corresponding to a specific viewer client from the plurality of viewer clients. The participant exclusion signal is used to exclude participant comments received from the specific viewer client thus preventing specified viewers from participating in the interactive program.

In one aspect of the invention, a caption and program information extractor monitors a broadcast media signal having captions and program information encoded in the broadcast media signal. A caption and program information extractor monitors a broadcast media signal having captions and program information encoded in the broadcast media signal. The captions and program information are extracted and stored in a content database. A moderator accesses the content database to retrieve captions and for a program specified by the program information. The moderator uses the services of a moderator server to generate interactive programming from the captions and the moderator's own comments. The interactive programming is transmitted to a plurality of viewers who interact with the interactive programming by entering viewer comments. The viewer comments are received by the moderator along with additional captions and new interactive programming is generated using the viewer comments, additional captions, and additional moderator commentary.

In one aspect of the invention, a method for generating an interactive program for transmission over a communications network is provided. A caption and program information extractor extracts captions and program information from a broadcast media signal and puts the captions and program information in a content database. A moderator server is coupled through the communications network to a moderator client and a plurality of viewer clients. The moderator server receives moderator comments and edited viewer comments from the moderator client through the communications network and gets captions and program information from the content database. The moderator server then generates interactive programming using the moderator comments, edited viewer comments, program information, and captions and transmits the interactive programming to the viewer clients through the communications network.

In another aspect of the invention, the moderator server receives viewer comments from the viewer clients and transmits the viewer comments to the moderator client through the communications network.

In another aspect of the invention, the communications network used is a virtual private network.

In another aspect of the invention, the viewers rate an interactive program by further including an interactive program rating signal in the viewer comment signals. In response, a moderator may transmit a viewer exclusion signal specifying a viewer client to the moderator server and the moderator server generates the interactive programming using the viewer exclusion signal to exclude viewer comments received from the specific viewer client. In addition, the moderator may transmit a viewer invitation signal corresponding to a specific viewer client to the moderator server and the moderator server generates viewer interactive programming using the viewer invitation signal to include viewer comments from the specific viewer client on a virtual stage.

In another aspect of the invention, an apparatus is provided for generating an interactive program for transmission over a television broadcast network and a communications network. The apparatus includes a content database, a caption and program information extractor coupled to a broadcast media signal source and the content database, and a moderator server coupled to a moderator client, the content database, and the television broadcast network. The moderator server includes a processor and a memory operably coupled to the processor. Program instructions stored in the memory are executed by the processor to implement the features of an interactive programming generation system. The program instructions include: receiving moderator comments and edited viewer comments by the moderator server from the moderator client; getting captions and program information by the moderator server from the content database; generating viewer interactive programming using the moderator comments, edited viewer comments, program information, and captions; and transmitting the interactive programming by the moderator server to viewer televisions through the television broadcast network.

In another aspect of the invention, the moderator server is further coupled to a plurality of viewer clients through the communications network. The program instructions further include receiving viewer comments by the moderator server from viewer clients through the communications network and transmitting the viewer comments by the moderator server to the moderator client through the communications network.

In another aspect of the invention, an apparatus for generating an interactive program for transmission over a television broadcast network is provided. The apparatus includes a content database and a caption and program information extractor coupled to a broadcast media signal source. The caption and program information extractor extracts captions and program information from a broadcast media signal and puts the captions and program information in the content database. A moderator server is coupled to a moderator client through the communications network and coupled to the content database. The moderator server is further coupled to the television broadcast network. The moderator server includes programming instructions for generation of interactive programming from the captions and program information. The moderator server receives moderator comments and edited viewer comments from the moderator client through the communications network and gets captions and program information from the content database. The moderator server then generates interactive programming using the moderator comments, edited viewer comments, program information, and captions and transmits the interactive programming to viewer televisions through the television broadcast network. In another aspect of the invention the moderator server is further coupled to a telephony network and viewers communicate with the moderator server through the telephony network.

BRIEF DESCRIPTION OF THE DRAWINGS

These and other features, aspects, and advantages of the present invention will become better understood with regard to the following description, appended claims, and accompanying drawings where:

FIG. 15 is a diagram of the type of information including in interactive components in accordance with an exemplary embodiment of the present invention.

FIG. 24 is a screen capture of a moderator's interface used to control generation of an interactive program in accordance with an exemplary embodiment of the present invention;

FIG. 30 is a screen capture of an edit profile viewer interface in accordance with an exemplary embodiment of the present invention;

FIG. 31 is a screen capture of a hub viewer interface in accordance with an exemplary embodiment of the present invention;

FIG. 33 is a screen capture of an interactive program archive viewer interface in accordance with an exemplary embodiment of the present invention;

FIG. 34 is a screen capture of a moderator interface for an interactive program authoring tool in accordance with an exemplary embodiment of the present invention;

FIG. 35 is a screen capture of a moderator interface for an interactive program reporting tool in accordance with an exemplary embodiment of the present invention;

FIG. 42 is a screen capture of a viewer interface for an interactive program incorporating Web content in accordance with another exemplary embodiment of the present invention;

FIG. 43 is a screen capture of a viewer interface for a facility to manage a viewer's personal favorite interactive programs in accordance with an exemplary embodiment of the present invention;

FIG. 48 is a screen capture of an interactive program home viewer interface in accordance with an exemplary embodiment of the present invention;

FIG. 49 is a screen capture of an interactive program system log-in interface in accordance with an exemplary embodiment of the present invention;

FIG. 59 is a screen capture of an interactive program authoring wizard in accordance with an exemplary embodiment of the present invention;

DETAILED DESCRIPTION

Figure 1:
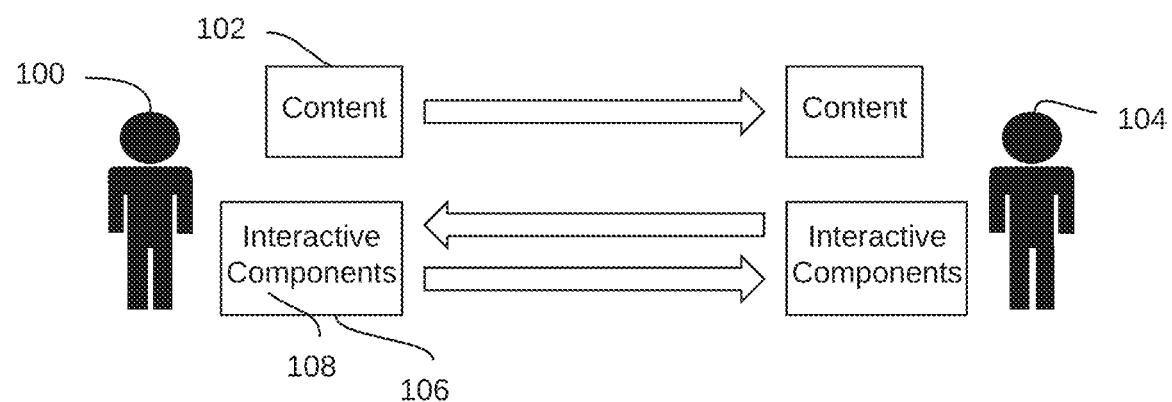
FIG. 1 is a block diagram of an interactive programming process in accordance with an exemplary embodiment of the present invention.

FIG. 1 is a block diagram of an interactive programming process in accordance with an exemplary embodiment of the present invention. An interactive programming producer 100 generates media content 102 for transmission and presentation to a participant 104. The media content can be for any purpose, such as for entertainment or educational purposes. Associated with the content are interactive components 106 that are also transmitted to the participant. The combination of the content and associated interactive components are herein termed interactive programming. In operation, the participant observes the content and interacts with the interactive components and the participant's interactions 108 are then transmitted back to the producer.

In this embodiment of an interactive programming process, an interactive programming environment includes two communications channels. In a first or forward channel, interactive programming is transmitted by a producer to a participant. In a second or back channel, a participant's reactions to the interactive programming are transmitted from the participant to the producer. The communications channels may be included in a single medium capable of managing high bandwidth communications in two directions, or may be distributed across multiple media with each medium providing a separate portion of the interactive programming in a distributed manner.

Figure 2:
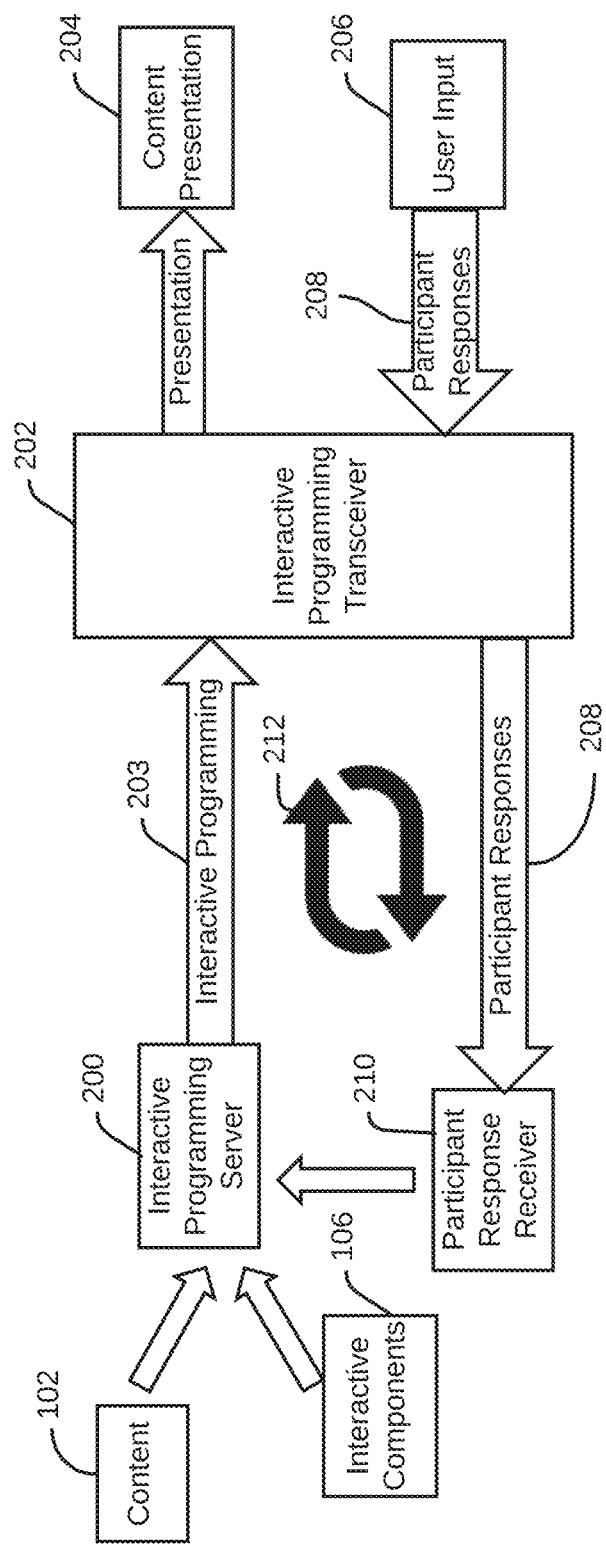
FIG. 2 is a block diagram of a system for generating interactive programming for a single two-way communications channel in accordance with an exemplary embodiment of the present invention.

FIG. 2 is a block diagram of a system for generating interactive programming for distribution over a single communication medium in accordance with an exemplary embodiment of the present invention. A producer provides media content 102 and specifications for interactive components 106 for processing in an interactive programming server 200. The interactive programming server receives the content and specifications for interactive components and uses them to generate interactive programming that is transmitted to an interactive programming transceiver device 202 through a forward channel 203. The interactive programming transceiver device separates the content from the interactive components of the interactive programming and generates a content presentation 204 that is presented to a participant. The participant responds to the content presentation and interacts with the interactive components using a user input device 206 to provide participant responses to the interactive programming transceiver which then transmits the participant responses to a participant response receiver 210 through a back channel 208 included in the same medium as the forward channel. The participant responses are then transmitted to the interactive programming server which uses the participant responses along with the content and interactive components to generate new interactive programming that is transmitted to the interactive transceiver device for presentation to the participant. This process is repeated continuously as a processing loop 212 to generate a continuous transmission of interactive programming.

Figure 3:
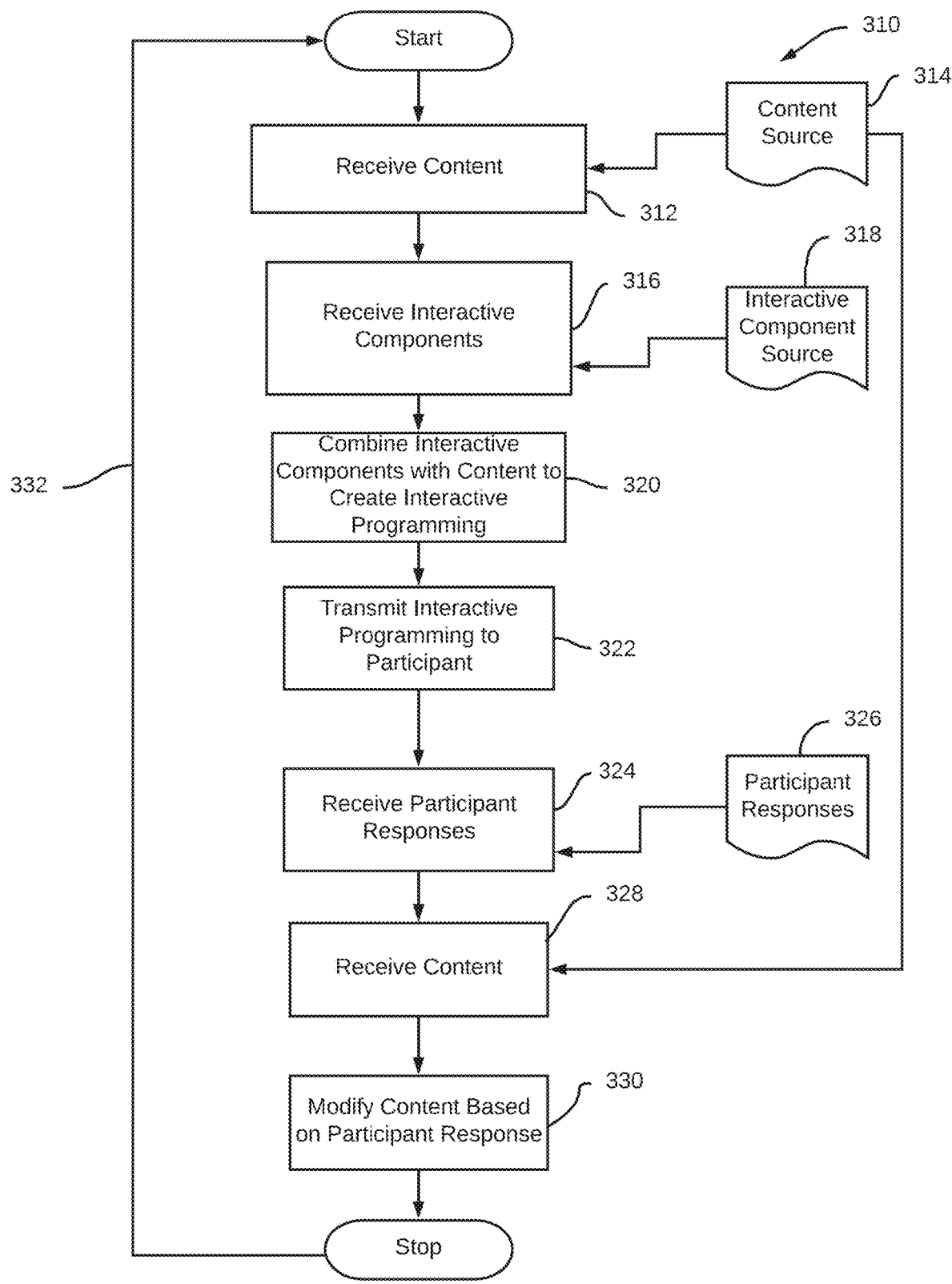
FIG. 3 is a process flow diagram of an interactive programming server process for generating interactive programming in accordance with an exemplary embodiment of the present invention.

FIG. 3 is a process flow diagram of an interactive programming generation process as implemented in an interactive programming server in accordance with an exemplary embodiment of the present invention. An interactive programming server process 310 receives (312) content from a content source 314 and receives (316) interactive components from an interactive component source 318. The interactive programming server process combines (320) the content and interactive components to create interactive programming for transmission to a participant. The interactive programming server process then transmits (322) the interactive programming to the participant.

After a participant interacts with the interactive components of the interactive programming, the interactive programming server process receives (324) participant responses 326. The interactive programming server then receives (328) additional content from the content source and modifies (330) the additional content using the participant responses. The process then repeats (332) in a loop indefinitely thus producing a continuous source of interactive programming for use by a participant.

Figure 4:
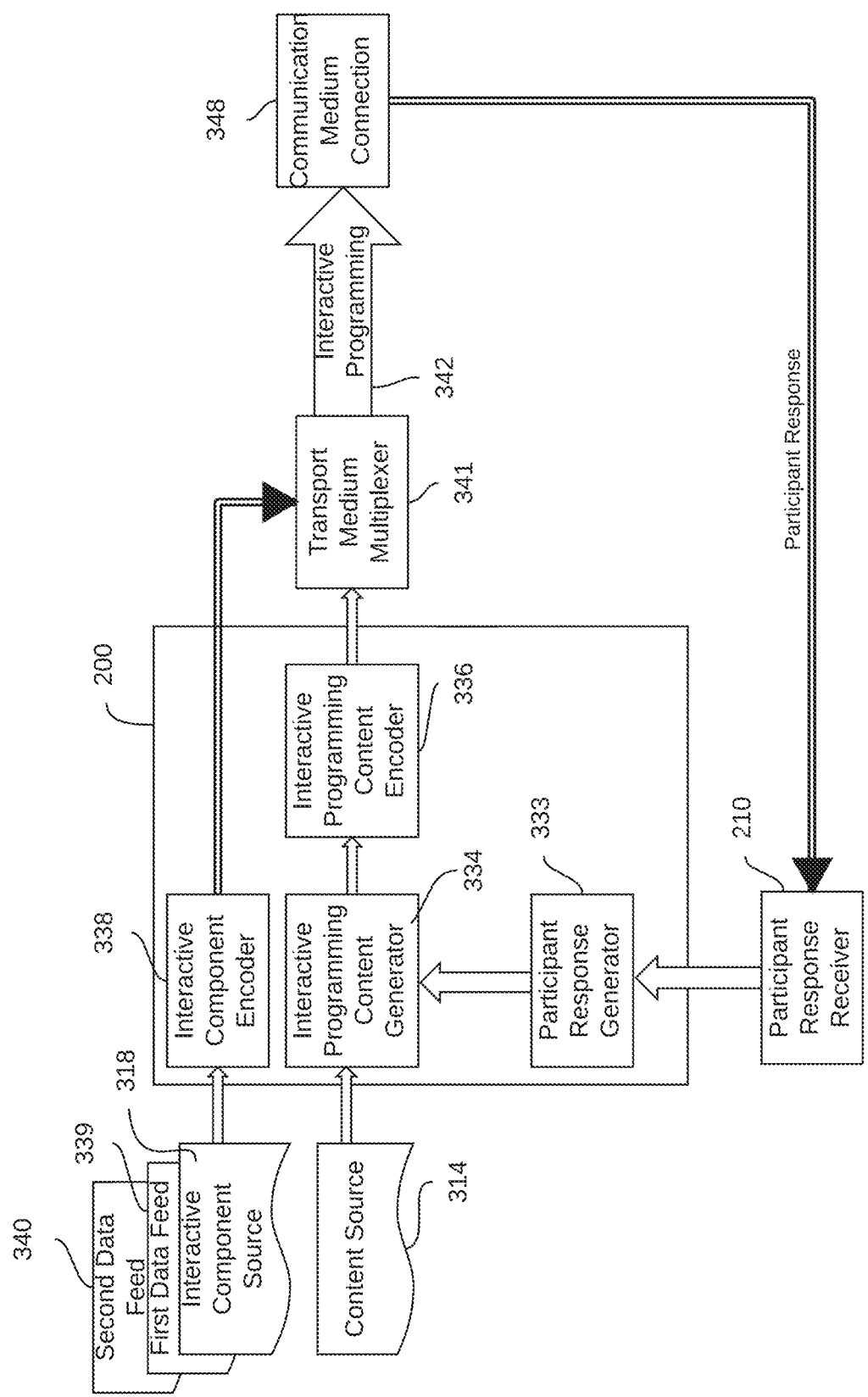
FIG. 4 is a block diagram of an interactive programming server in accordance with an exemplary embodiment of the present invention.

FIG. 4 is an architecture diagram of an interactive programming server in accordance with an exemplary embodiment of the present invention. An interactive programming server 200 includes a participant response content generator 333 that generates participant response content using participant responses received by a participant response receiver 210 coupled to a back channel included in a communications medium 348. The participant response content is combined with content received from a content source 314 to create interactive programming content by an interactive content generator 334. The interactive programming content is then transmitted to an interactive programming content encoder that encodes the interactive programming content into a format suitable for transport through a forward channel in the communications medium. The interactive programming server also includes an interactive component encoder 338 that receives interactive components from an interactive component source 318. The interactive component source includes a plurality of independent data feeds as exemplified by a first data feed 339 and a second data feed 340. The data feeds correspond to differing types of interactive components that may be used in an interactive program. The interactive component encoder encodes the interactive components into a data format suitable for transport through a forward channel in the communications medium. The encoded interactive programming content and encoded interactive components are then combined by transport medium multiplexer 341 to generate interactive programming 342 that is ultimately transmitted to the participant through communications medium.

In one interactive programming server in accordance with an exemplary embodiment of the present invention, the output of the interactive programming content encoder is a MPEG-2 encoded data stream. The output of the interactive component encoder is an UDP/IP data stream. These data streams are received by the transport multiplexer that generates the interactive programming by encapsulating the UDP/IP data stream along with the MPEG-2 data stream for inclusion in a Digital Video Broadcast (DVB) transport stream. A suitable commercially available transport multiplexer is a model TMX-2010 Transport Multiplexer available from Motorola, Inc. of Schaumburg Ill., USA.

In other interactive programming servers in accordance with exemplary embodiments of the present invention, other transport multiplexers may be used. For example, transport multiplexers accepting inputs in the form of MPEG-4 streams or transport multiplexers generating a transport stream suitable for transmission using the DOCSIS standard may also be used.

Figure 5:
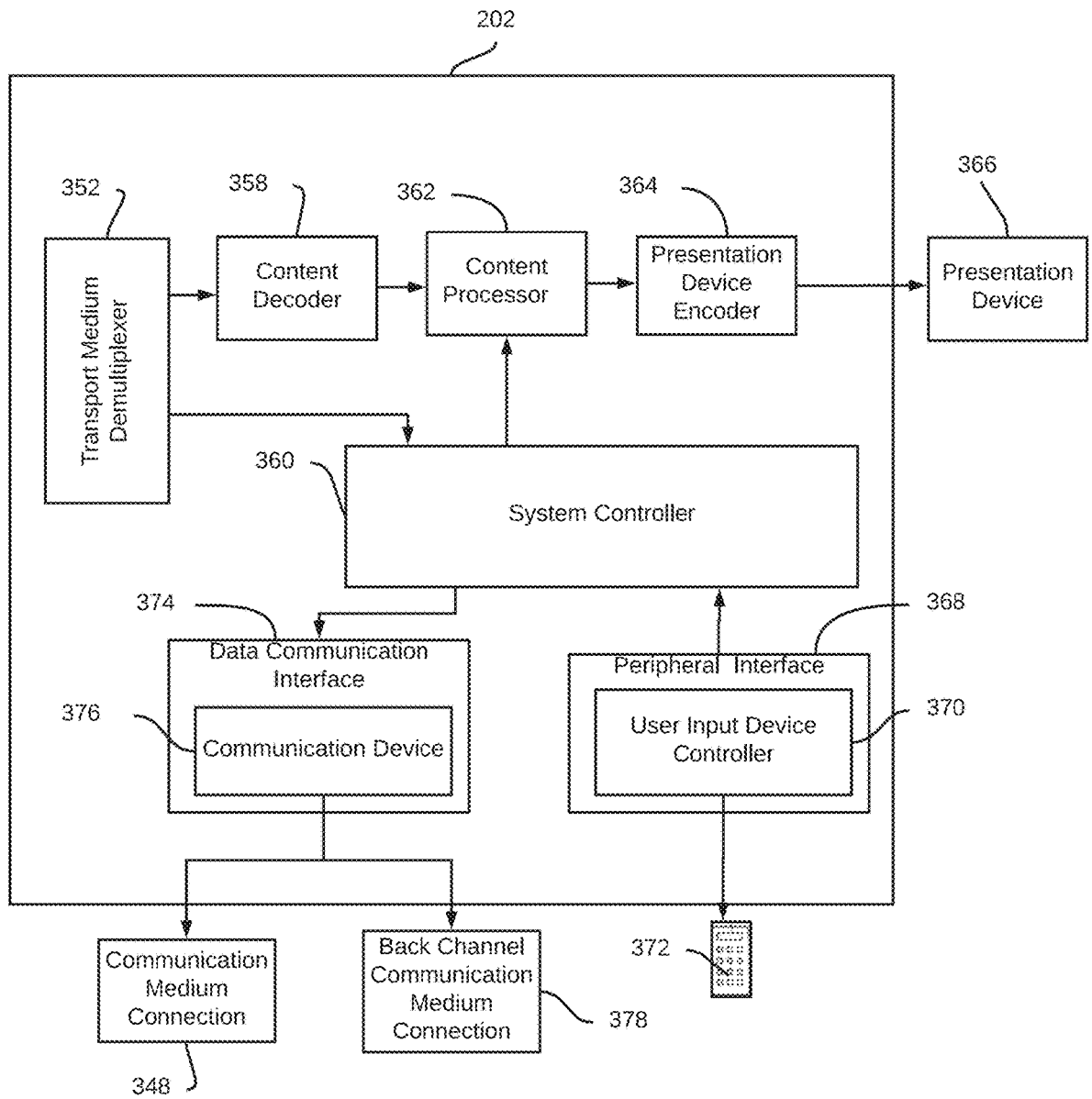
FIG. 5 is a block diagram of an interactive programming transceiver in accordance with an exemplary embodiment of the present invention.

FIG. 5 is a block diagram of an interactive programming transceiver in accordance with an exemplary embodiment of the present invention. An interactive transceiver 202 includes a transport medium demultiplexer 352 that receives interactive programming from a forward channel included in a communications medium 348. The transport medium demultiplexer separates the content and interactive components of an interactive program. The content is transmitted to a content decoder 358 that decodes the content into a format suitable for internal representation of the content for further processing. The interactive components of the interactive program are transmitted to a system controller 360. The system controller uses the interactive components to generate participant interface content that may be recombined with the decoded content in a content processor 362. The decoded content and any combined participant interface content are then transmitted to a presentation device encoder 364 that encodes the decoded content and any combined participant interface content into a format suitable for transmission to a presentation device 366.

The system controller is also coupled to a peripheral interface 368 having a user input device controller 370 for reception of participant responses transmitted by a user input device 372. A participant uses the user input device to transmit the participant's response to the presentation of the content. The system controller receives the participant's responses and uses a data communication interface 374 having a first communication device 376 to transmit the participant responses to the interactive programming server through a back channel included in the communications medium. Alternatively, the communications device may transmit the participant responses to the interactive programming server through a separate back channel communications medium 378. A suitable commercially available interactive programming transceiver is a DCT2000 set-top terminal available from Motorola, Inc. of Schaumburg Ill., USA.

Figure 6:
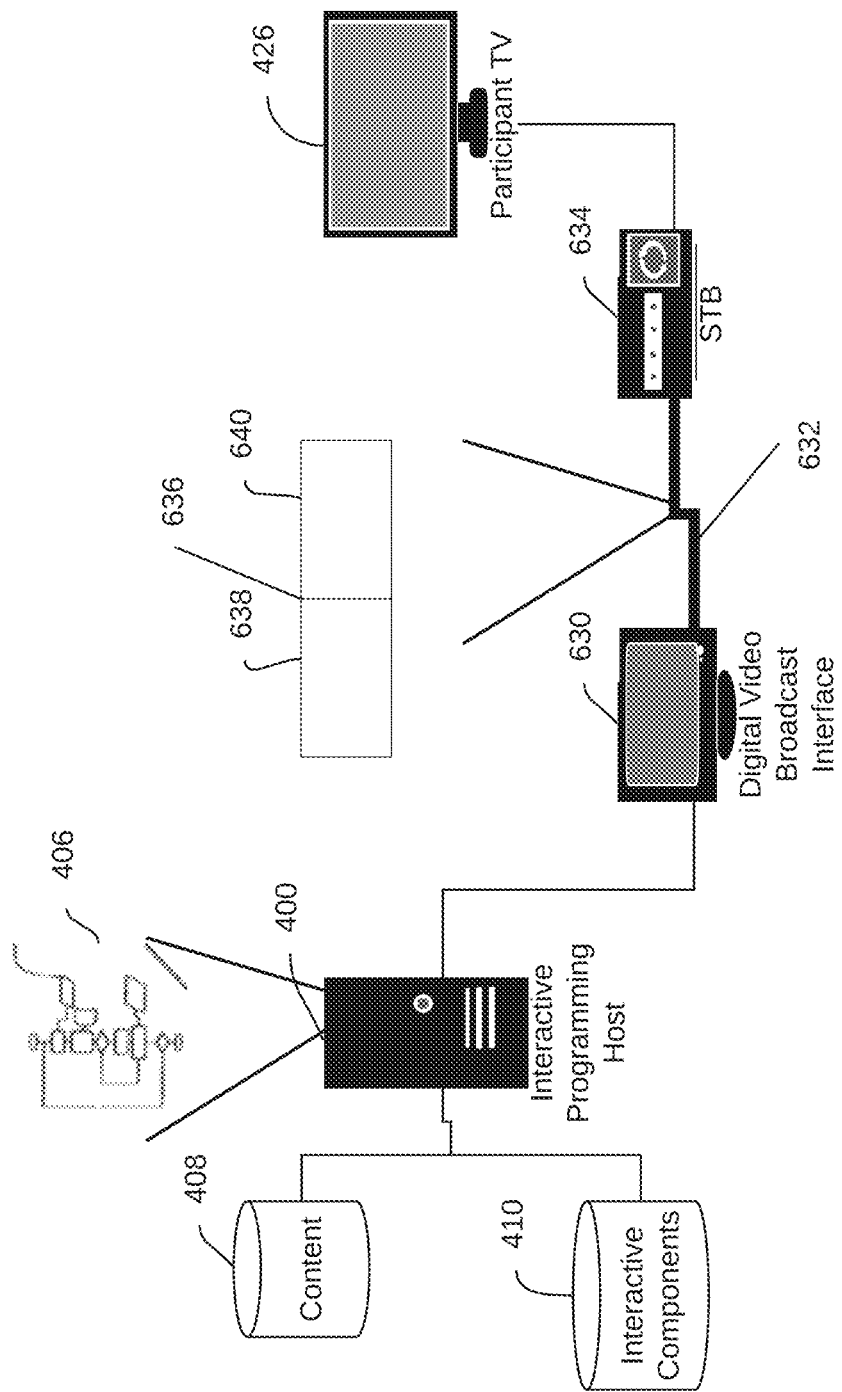
FIG. 6 is a deployment diagram depicting embedding interactive components in a digital video broadcast transport stream in accordance with an exemplary embodiment of the present invention.

FIG. 6 is a deployment diagram depicting embedding interactive components in a DVB transport stream in accordance with an exemplary embodiment of the present invention. An interactive programming host 400 is coupled to a content source 408 and an interactive component source 410 as previously described. An interactive programming server 406 hosted by the interactive programming host embeds interactive components from the interactive component source into a DVB transport stream signal 636. The DVB transport stream includes a plurality of elementary streams, with each elementary stream corresponding to a separate program. In one embodiment of interactive programming in accordance with an exemplary embodiment of the present invention, the interactive components are included in a first elementary stream 638 while the interactive programming content is included in a second elementary stream 640.

Once the interactive programming server has generated the interactive programming, the interactive programming host uses a DVB network interface or cable head 630 to transmit the interactive programming over a DVB network 632 to a participant's digital set-top box 634. The DVB signal is received by the set-top box and the interactive programming content and interactive components are separated out of the DVB transport stream and processed as previously described.

Figure 7:
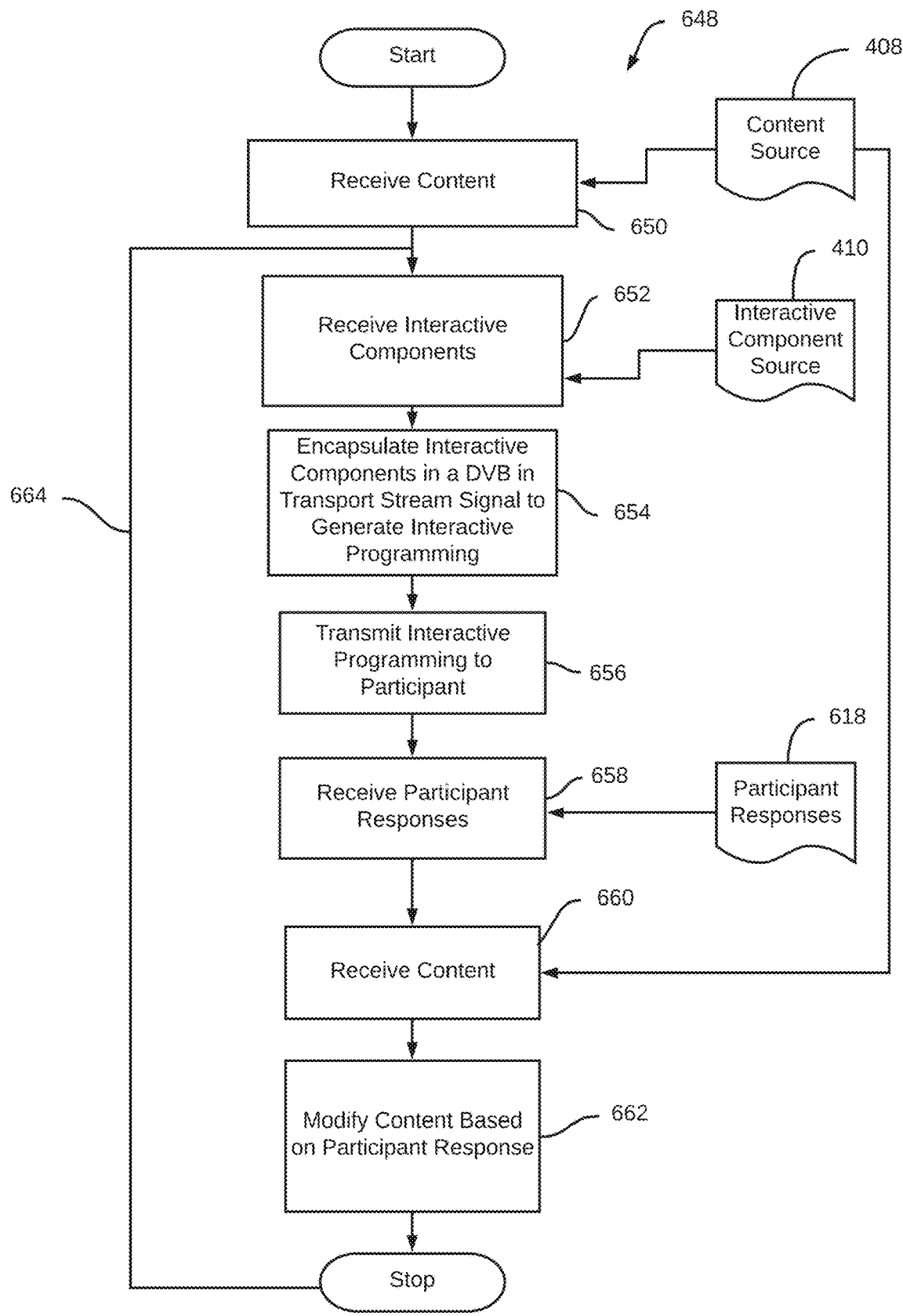
FIG. 7 is a process flow diagram of an interactive programming server process used to generate iVOD interactive programming for a digital video broadcast transport stream in accordance with an exemplary embodiment of the present invention.

FIG. 7 is a process flow diagram of an interactive programming server process used to generate iVOD interactive programming for a DVB transport stream in accordance with an exemplary embodiment of the present invention. An interactive programming server process 648 receives (650) content from a content source 408 and receives (652) interactive components from an interactive component source 410. The interactive programming server process converts the content into a digital video signal and encapsulates the interactive components into a DVB transport stream signal to generate (654) iVOD interactive programming. The interactive programming server process then transmits (656) the iVOD interactive programming to the participant.

After a participant interacts with the interactive components of the iVOD interactive programming, the interactive programming server receives (658) participant responses 618. The interactive programming server then receives (660) additional content from the content source and modifies (662) the content using the participant responses. The process then repeats (664) in a loop indefinitely thus producing continuous source of iVOD interactive programming for use by a participant.

Figure 8:
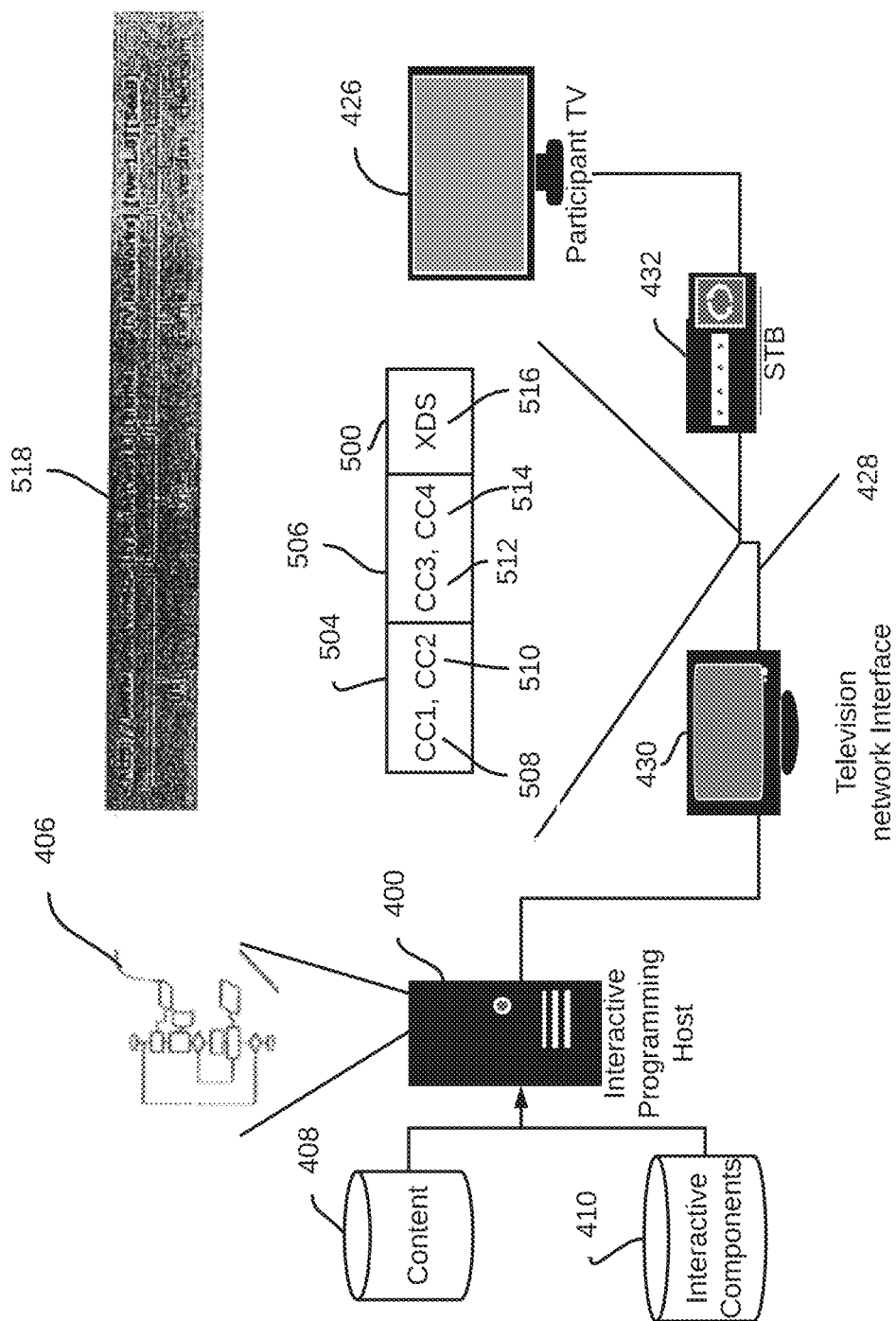
FIG. 8 is a deployment diagram depicting embedding interactive components in a television signal using a vertical blanking interval in accordance with an exemplary embodiment of the present invention.

FIG. 8 is a deployment diagram depicting a system using interactive components embedded in a vertical blanking interval of a television signal in accordance with an exemplary embodiment of the present invention. An interactive programming host 400 is coupled to a content source 408 and an interactive component source 410 as previously described. An interactive programming server 406 hosted by the interactive programming host embeds interactive components from the interactive component source into a Vertical Blanking Interval (VBI) of a television signal 500 in text fields that are specified in a VBI encoding standard. In one embodiment of interactive programming in accordance with an exemplary embodiment of the present invention, the interactive components are included in a first field 504 and a second field 506. The first field includes a first captioning information 508 and a second captioning information 510 text stream. Field 2 includes a third captioning information 512 and a fourth captioning information 514 text string as well as eXtended Data Service (XDS) information 516 encoded in a series of packets. The fields are described in table 1a and table 1b below.

TABLE 1a

| Field 1 Packets Name* | Field | Data Channel | Description |
| --- | --- | --- | --- |
| CC1 | 1 | 1 | Primary Synchronous Caption Service |
| CC2 | 1 | 2 | Special Non-Synchronous Use Captions |
| T1 | 1 | 1 | First Text Service |
| T2 | 1 | 2 | Second Text Service |

TABLE 1b

| Field 2 Packets Name* | Field | Data Channel | Description |
| --- | --- | --- | --- |
| CC3 | 2 | 1 | Secondary Synchronous Caption Service |
| CC4 | 2 | 2 | Special Non-Synchronous Use Captions |
| T3 | 2 | 1 | Third Text Service |
| T4 | 2 | 2 | Fourth Text Service |
| XDS | | | eXtended Data Services |

There are several different classes of XDS packets encapsulating information about a broadcast program. For example, defined XDS packet classes include Current Class (information about the current program such as the title, length, rating, elapsed time, audio services, caption services, and aspect ratio), Future Class (the same information for an upcoming program), Channel Information Class (information such as the network name, station call letters, native channel number and tape delay), Miscellaneous Class (containing the time of day and the local time zone) and Public Service Class (severe weather warnings). In addition, Reserved and Undefined Classes are set aside for future expansion and proprietary applications.

A complete definition of a XDS packets may be found in Recommended Practice for Line 21 Data Service, Electronics Industries Association, EIA-608 (drafts Oct. 12, 1992 and Jun. 17, 1993).

The text fields may also be used to encode links to other types of data. For example, if the interactive programming system includes an Internet Protocol (IP) back channel, the links may be in the form of Uniform Resource Locators (URLs). Such a link is herein termed a "trigger". In one interactive programming system in accordance with an exemplary embodiment of the present invention, a trigger 518 includes a URL field for specifying the URL of a resource in an IP network, a type field for specifying what type of network is used to access the URL, a name field for a display name used for the resource, a version field for specifying the version of the trigger, and a check sum field used to confirm that the trigger was accurately transmitted to a participant's STB 432.

Once the interactive programming server has generated the interactive programming, the interactive programming host uses a cable television network interface 430 to transmit the interactive programming to the participant's STB.

Figure 9:
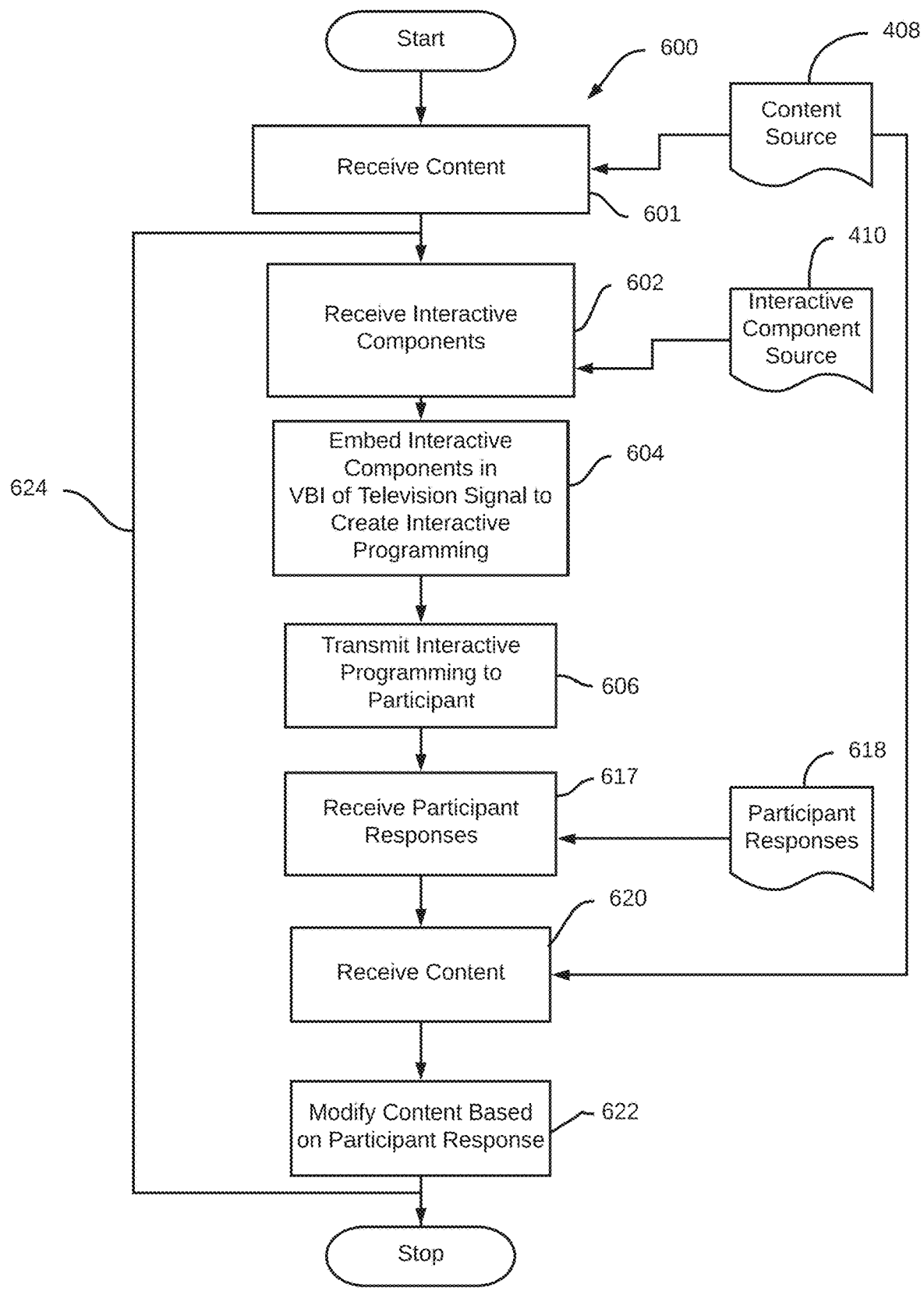
FIG. 9 is a process flow diagram of an interactive programming server process used to generate iVOD interactive programming in accordance with an exemplary embodiment of the present invention.

FIG. 9 is a block diagram of an interactive programming server process used to generate iVOD interactive programming in accordance with an exemplary embodiment of the present invention. An interactive programming server process 600 receives (601) content from a content source 408 and receives (602) interactive components from an interactive component source 410. The interactive programming server process converts the content into a television signal and embeds (604) the interactive components into the VBI of the television signal to generate iVOD interactive programming. The interactive programming server process then transmits 606 the iVOD interactive programming to the participant.

After a participant interacts with the interactive components of the iVOD interactive programming, the interactive programming server receives (617) participant responses 618. The interactive programming server then receives (620) additional content from the content source and modifies (622) the content using the participant responses. The process then repeats (624) in a loop indefinitely thus producing continuous source of iVOD interactive programming for use by a participant.

Figure 10:
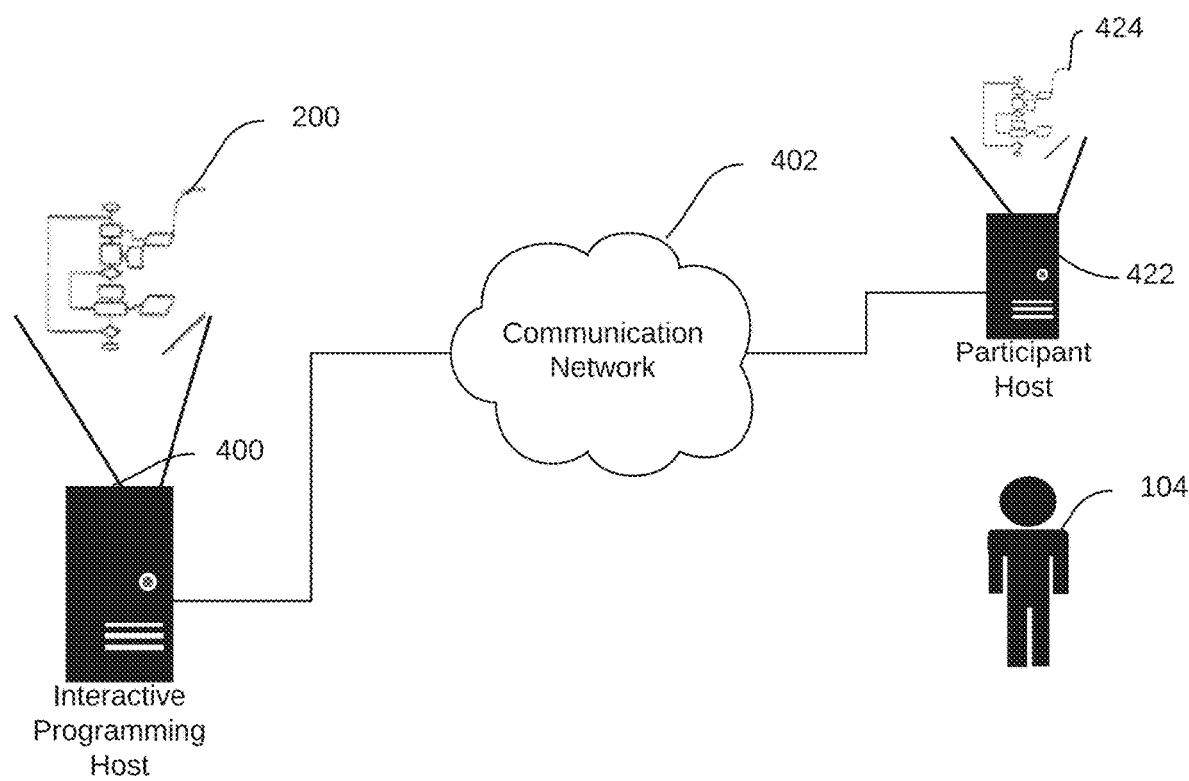
FIG. 10 is a deployment diagram of a system for delivering interactive programming wherein the delivery medium is a wide area network in accordance with an exemplary embodiment of the present invention.

FIG. 10 is a deployment diagram of a system for delivering interactive programming wherein the delivery medium is a wide area network in accordance with an exemplary embodiment of the present invention. An interactive programming server 200 is hosted by an interactive programming host 400 that is operably coupled to a communications network 402. A participant host 422 coupled to the communications network hosts a participant client 424. In the case where the communications network is the Internet, the participant client may be a Web browser or other client capable of communicating using the IP suite of communications protocols. In such a system, the Internet is a medium including both a forward channel used to transmit interactive programming to a participant 104 and a back channel used to transmit participant responses back to the interactive programming server.

Figure 11:
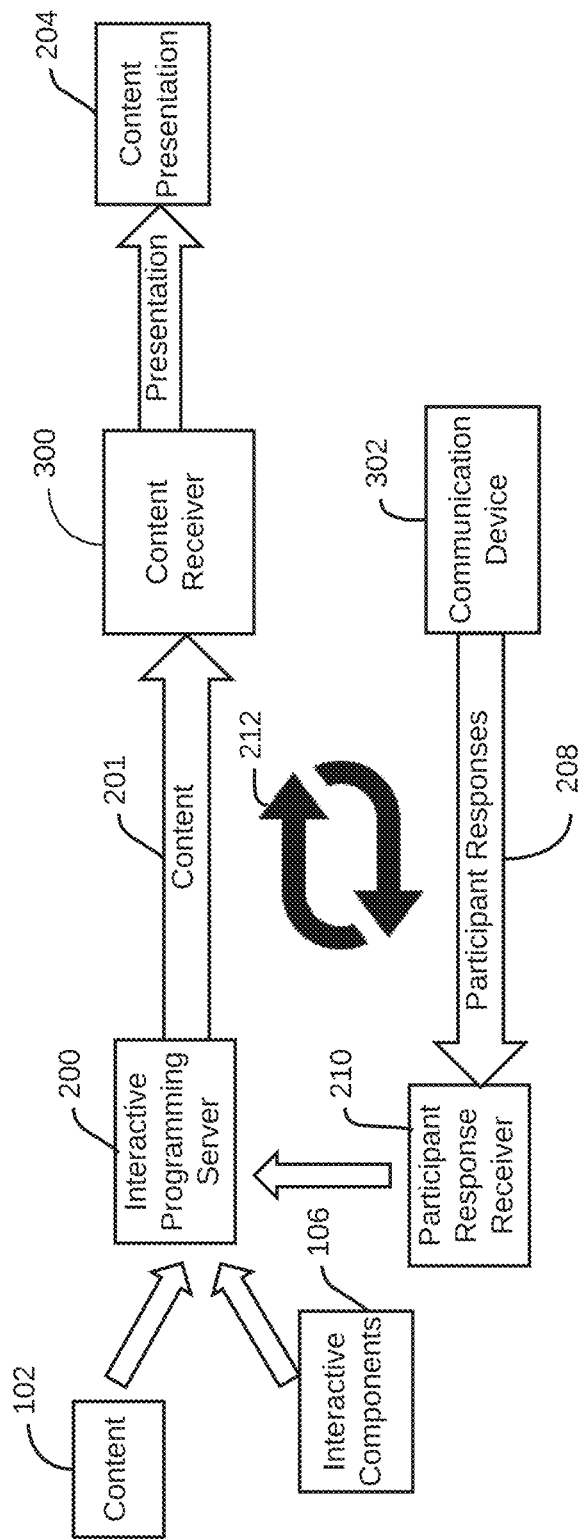
FIG. 11 is a block diagram of a system for generating interactive programming for multiple communications channels in accordance with an exemplary embodiment of the present invention.

FIG. 11 is a block diagram of a system for generating interactive programming for multiple communications channels in accordance with an exemplary embodiment of the present invention. In this system, content presentation functions and user input functions of an interactive programming transceiver as illustrated in FIG. 2 are separated and distributed across more than one device, with each device having its own communication medium. As previously described, a content producer provides content 102 and interactive components 106 to an interactive programming server 200 as before. However, instead of generating interactive programming including both content and interactive programming, the interactive programming server generates interactive programming content for transmission through a forward channel 201 to a content receiver 300. The content receiver receives the content and generates a content presentation 204 for presentation to a participant. The participant uses a separate communications device to transmit participant responses through a back channel 208 to the participant response receiver 210 for use by the interactive programming server in generating new interactive programming in an iterative process. Thus, an interactive programming loop 212 may be maintained by coordination of the transmission of content through a forward channel to a participant and receiving participant responses to the content through a back channel wherein the forward and back channels are carried by different media.

Figure 12:
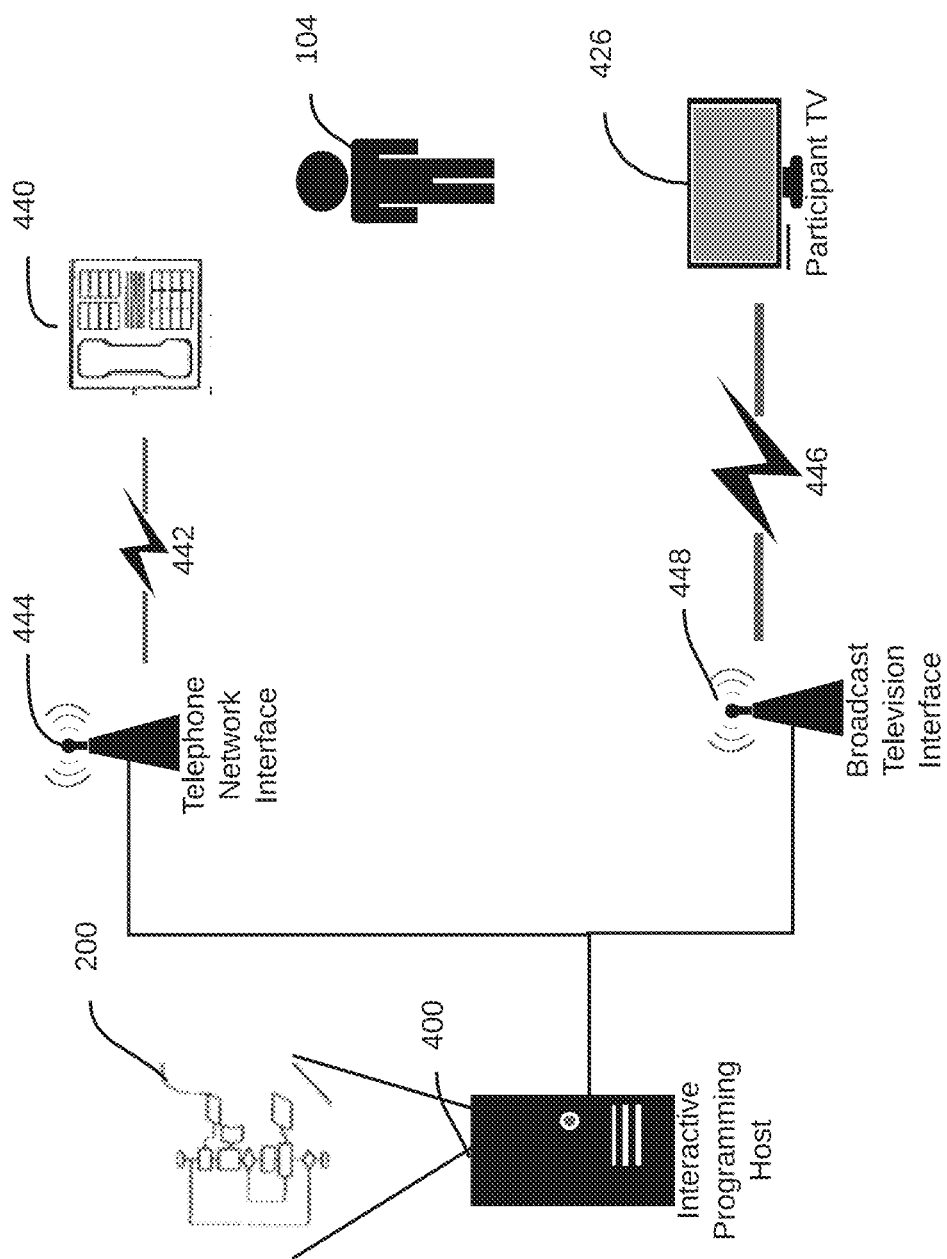
FIG. 12 is a deployment diagram of a system for delivering interactive programming wherein a medium for a forward channel is broadcast television and a medium for a back channel is a telephone system in accordance with an exemplary embodiment of the present invention.

FIG. 12 is a deployment diagram of a system for delivering interactive programming wherein a medium for a forward channel is broadcast television and a medium for a back channel is a telephone system in accordance with an exemplary embodiment of the present invention. As noted previously, multiple communications media may be used to transmit interactive programming to a participant through a forward channel and receive resultant participant responses through a back channel. In this configuration, the interactive programming host is coupled to a participant television 426 through a broadcast television network 446 by a broadcast television network interface 448. The interactive programming server may then use the broadcast television network to transmit interactive programming to the participant television.

The interactive programming host is also coupled to a telephone network 442 by a telephone network interface 444. As such, the interactive programming server may receive participant responses from the participant using a participant telephone 440 through the telephone network. In this system, the back channel for participant responses is carried on the telephone network communications medium.

In one embodiment of interactive programming in accordance with an exemplary embodiment of the present invention, the interactive programming is associated with its own telephone extension number. In this embodiment of interactive programming, a participant dials a telephone number to access a Private Branch eXchange (PBX) telephone system and then the participant enters the extension number associated with the interactive program.

Figure 13:
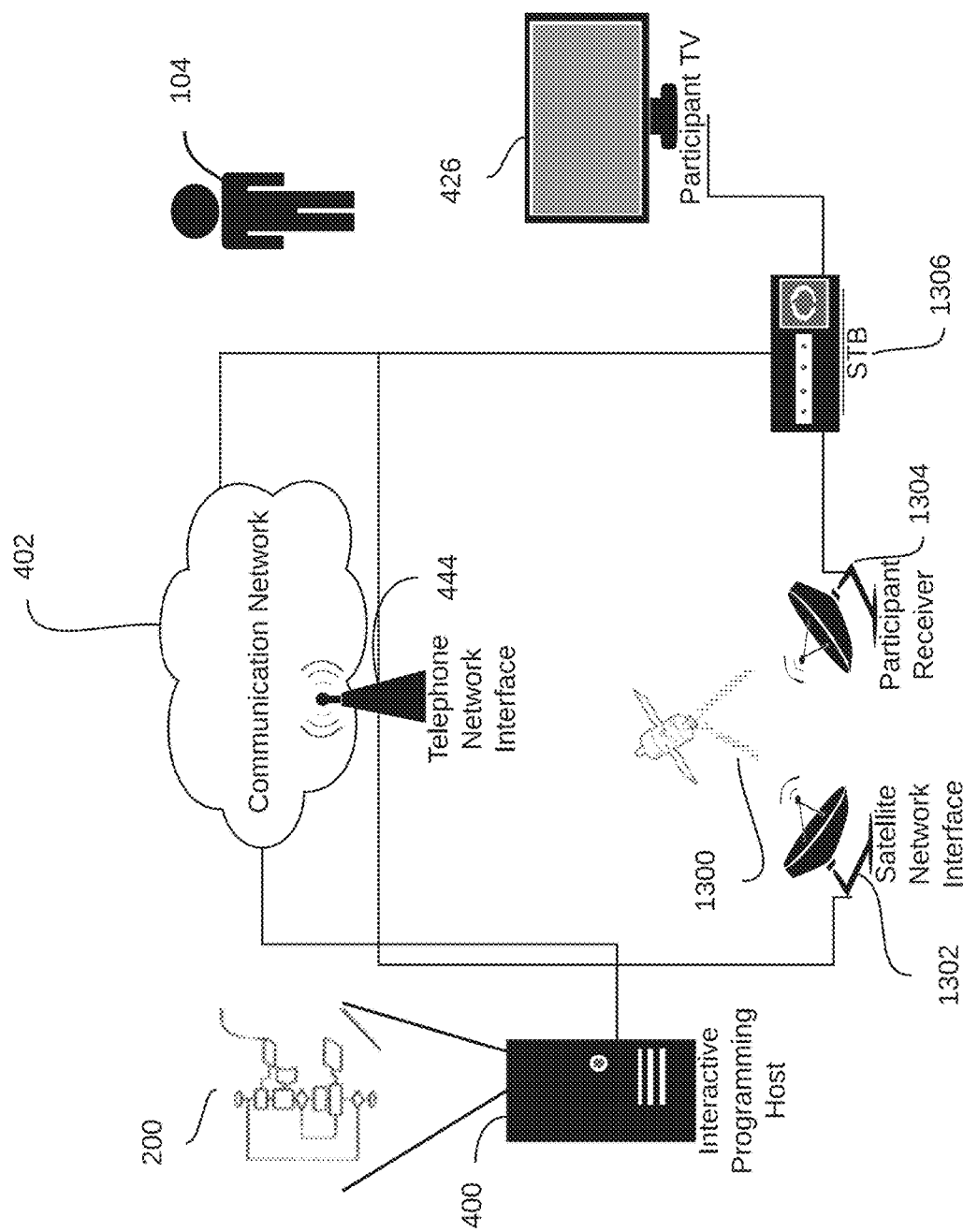
FIG. 13 is a deployment diagram of a system for delivering interactive programming wherein a medium for a forward channel is a satellite television network and a medium for a back channel is either a telephone system or a communications network in accordance with an exemplary embodiment of the present invention.

FIG. 13 is a deployment diagram of a system for delivering interactive programming wherein a medium for a forward channel is a satellite television network and a medium for a back channel is either a telephone system or a communications network in accordance with an exemplary embodiment of the present invention. In this system, the interactive programming host 400 is coupled to a participant television 426 through a satellite television network 1300 by a satellite television network interface 1302. The interactive programming server may then use the satellite television network to transmit interactive programming to the participant television through a participant receiver 1304] and satellite television network STB 1306.

The interactive programming host is also coupled to a telephone network by a telephone network interface 444. The satellite television network STB uses the telephone network to transmit participant responses to the interactive programming host. In this system, the back channel for participant responses is carried on the telephone network communications medium.

In another system for delivering interactive programming wherein a medium for a forward channel is satellite television network in accordance with an exemplary embodiment of the present invention, the back channel is a communications network, such as wide area network 402. In this system, the interactive programming host is coupled to the communications network and the satellite television network STB transmits participant responses to the interactive programming host via the communications network.

Figure 14A:
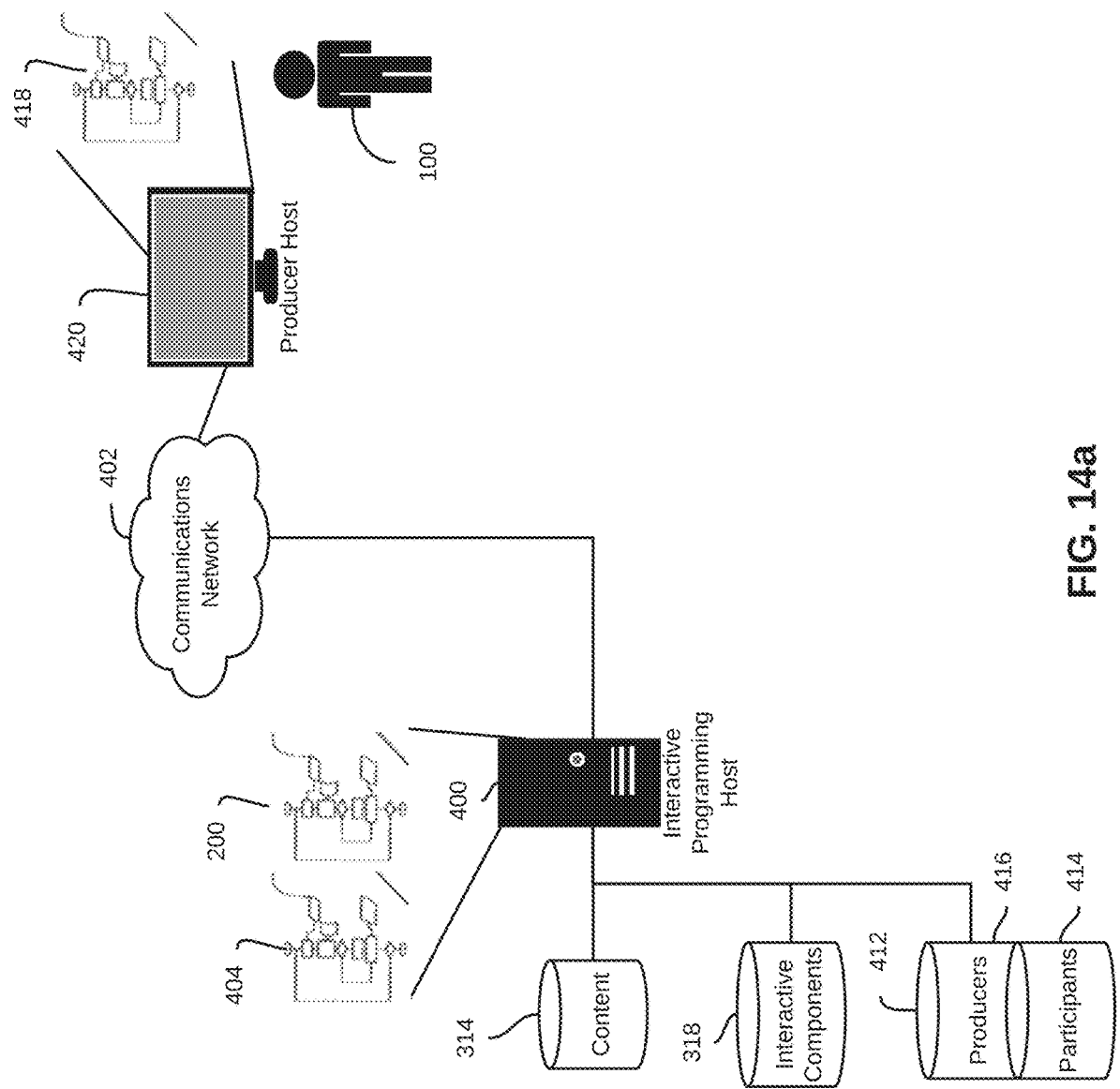
FIG. 14a is a block diagram of a system for the production of interactive programming in accordance with an exemplary embodiment of the present invention.

FIG. 14a is a block diagram of a system for the production of interactive programming in accordance with an exemplary embodiment of the present invention. The system provides user interface features allowing an interactive programming producer 100 to produce interactive programming for transmission to a participant. The system includes an interactive programming host 400 coupled to a communications network 402 such as the Internet. The interactive programming host hosts a user interface server 404 for management of user interfaces used by both the participant and the producer. The interactive programming host also hosts an interactive programming server 200 for generation of interactive programming using content from a content source 314 and interactive components from an interactive component source 318. The interactive programming host is further coupled to a database 412 for storage of information about participants 414 and information about producers 416 As the interactive programming host is coupled to a communications network, a producer may access the user interface server using the communications network and a producer client 418 hosted by a producer host 420.

In operation, the producer uses the producer client to access the user interface server via the communications network. Through a series of user interactions, the producer configures an interactive program by specifying content and interactive components. The interactive programming is then transmitted by the interactive programming server to a participant using a forward channel as previously described. The participant transmits participant responses back to the interactive programming server via a back channel as previously described. The interactive programming host may be coupled to multiple communications media which carry forward channels and back channels in various combinations.

The above described interactive programming systems may be used to deliver interactive programming having a variety of different purposes and structures. In one interactive programming system in accordance with an exemplary embodiment of the present invention, the interactive programming system is used to distribute interactive programming in the form of talk shows. Such an interactive programming system is more fully described in U.S. patent application Ser. No. 10/123,618, entitled "METHOD AND APPARATUS FOR INTERNET-BASED INTERACTIVE PROGRAMMING" and U.S. patent application Ser. No. 10/222,461, entitled "METHOD AND APPARATUS FOR INTERACTIVE PROGRAMMING USING CAPTIONING". One feature of the interactive programming system used to generate and distribute talk shows is that creators of the talk shows may archive their talk shows for later presentation in "on-demand" style formats including interactive Video On Demand (iVOD). Other interactive programming content sources may include any programming source. For example, entertainment programs, educational programs, and political talk shows can be enhanced to create iVOD interactive programming.

iVOD is a medium that exploits the ability to embed interactive components in a television or video signal. For an analog television signal, a Vertical Blanking Interval (VBI) is used to embed interactive components in the television signal. The interactive components may be included in closed captioning text streams that are part of the VBI in the television signal. For a digital video signal, the interactive components are embedded as in the transport medium along with interactive programming content.

Figure 14B:
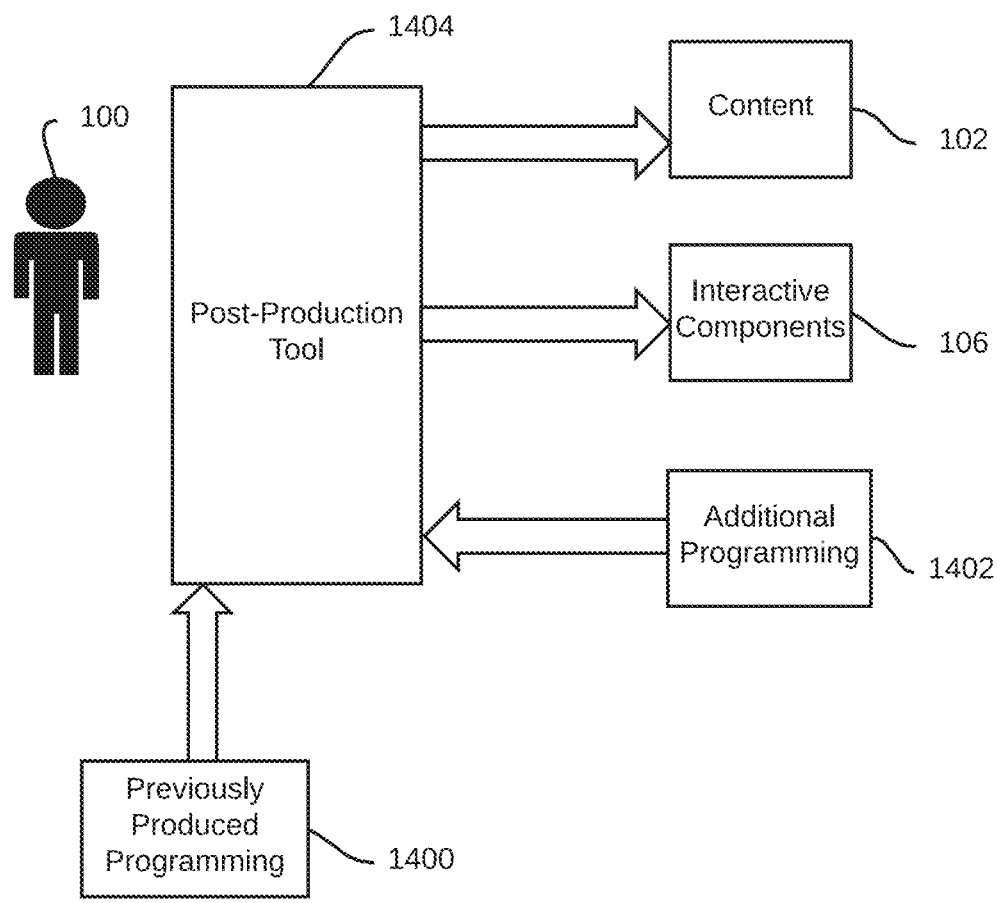
FIG. 14b is a block diagram of a post-production tool for generation of interactive programming content and interactive components in accordance with an exemplary embodiment of the present invention.

FIG. 14b is a block diagram of a software tool for generation of interactive programming content and interactive components in accordance with an exemplary embodiment of the present invention. Production of the interactive programming is a multistep process. A producer 100 obtains previously produced programming 1400 and adds additional programming 1402 to generate content 102 and interactive components 106 using a post-production tool 1404. The post-production tool allows the producer to edit the previously produced programming and synchronize the additional programming to the previously produced programming as embedded interactive components. Once the content and interactive programming are generated, they may be stored and distributed to the participant in an "on-demand" mode through various distribution channels and broadcast media.

The post-production tool provides a variety of services to the producer such as separate audio and text tracks with embedded time codes that may be synchronized with the content. The post-production tool may also be used to combine additional programming with the previously produced programming as a video signal embedded in the content. In addition, the post-production tool allows the creation of interactive components, such as polls that offer two, three, or four choice formats with a simple text entry user interface. Finally, the post-production tool allows the creation of time coded tcommerce links for product placement as an interactive component.

FIG. 15 is a diagram of the type of information including an interactive components in accordance with an exemplary embodiment of the present invention. The interactive components may include multiple datafeeds that are synchronized with the content of an interactive program. In the example, the content is included as a transcript 607 in order to illustrate synchronization of the datafeeds with the content. A first datafeed 608 includes "pop-up facts" about the subject matter of the content. A second datafeed 610 includes additional information about the subject matter of the content. A third data feed 612 includes comments and poll results from participants in the interactive programming. A fourth datafeed 614 includes proposals for commercial transactions. Each of the datafeeds may either include information directly or may include links as triggers to other data resources as previously described.

Figure 16:
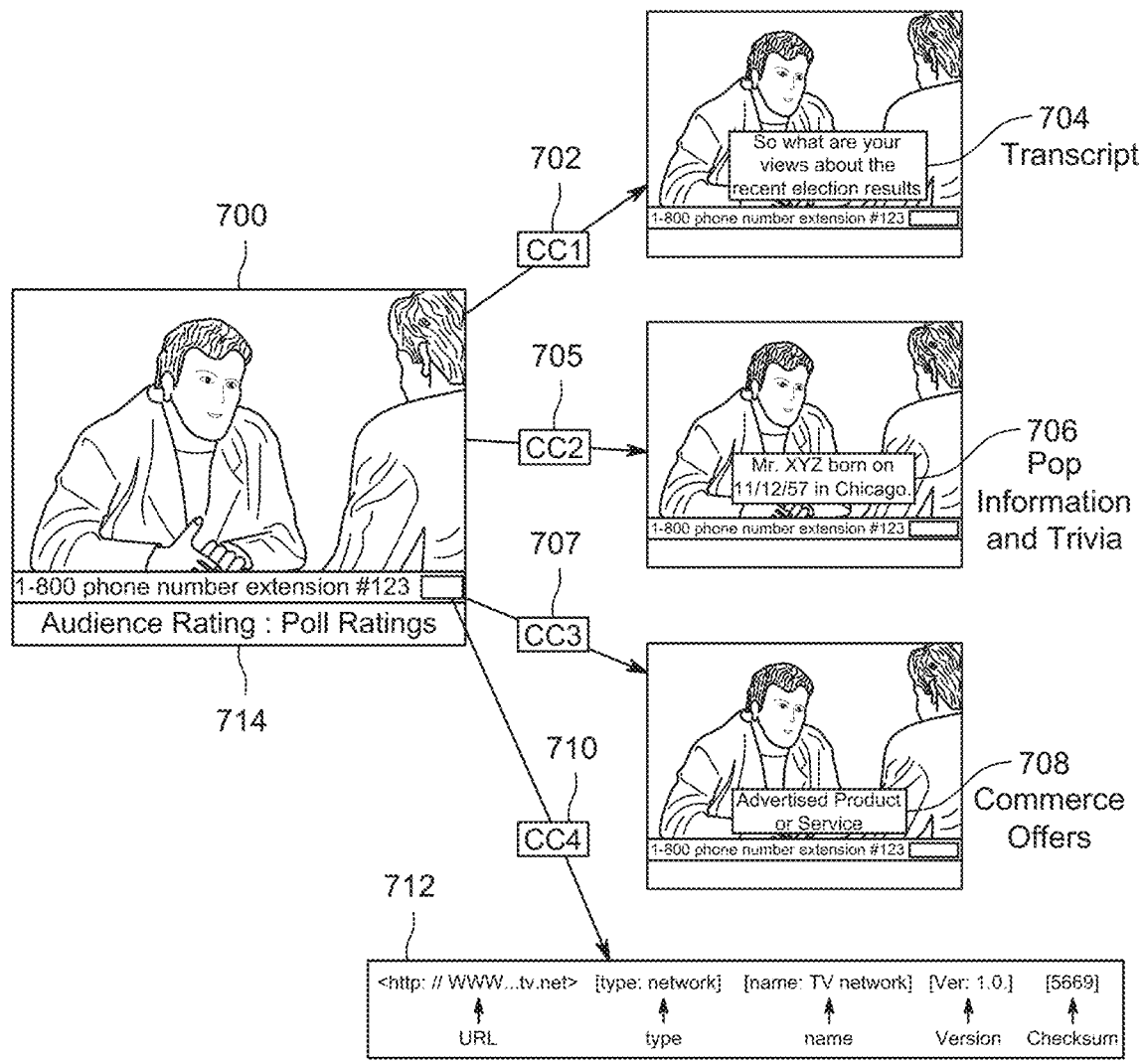
FIG. 16 is a block diagram of iVOD content including interactive features in accordance with an exemplary embodiment of the present invention.

FIG. 16 is a block diagram of iVOD content including interactive features in accordance with an exemplary embodiment of the present invention. iVOD content served by an interactive programming host can be accessed by a viewer over a communications network, a computer network, a satellite television network, or a cable television network. The use of a television signal provides the capability to embed the interactive programming components of the interactive programming in a vertical blanking interval of the television signal as well as captioning information as previously described. For example, as illustrated in table 1a above, captioning information may be included in the CC1, CC2, CC3, and CC4 field. In accordance with an exemplary embodiment of the present invention, an iVOD interactive program includes a content signal 700 and a plurality of interactive components embedded in the CC1, CC2, CC3, and CC4 fields. In this exemplary iVOD interactive program, the CC1 field 702 includes a standard transcript 704 while the CC2 field 705 includes additional pop-up information 706, such as trivia, about a subject of the interactive programming content signal, and the CC3 field 707 and the CC4 field 710 include commerce or "tcommerce" links 708 such or trigger 712 including URLs to ecommerce locations on the Internet. In this way, a producer can provide additional enhanced content to a viewer of previously produced interactive programming.

In addition to the interactive components embedded in the CC fields, the interactive program further includes a field or "ticker" 714 for display of information that is constantly updated based on participant responses to the iVOD content. This ticker can include information such as audience approval ratings for the iVOD program and participant polling responses.

Figure 17:
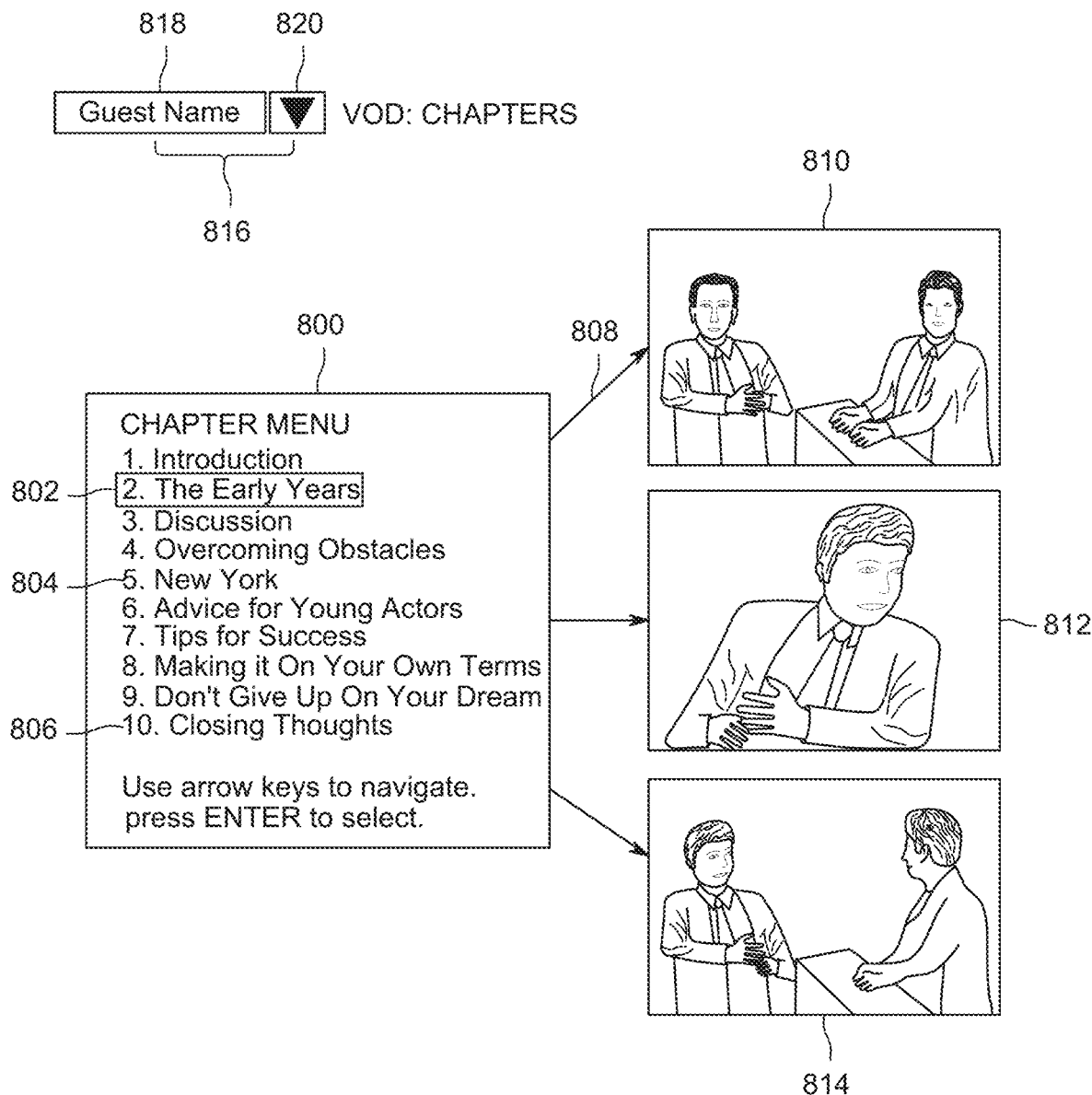
FIG. 17 is a block diagram of iVOD interactive programming including chapter features in accordance with an exemplary embodiment of the present invention.

FIG. 17 is a block diagram of iVOD interactive programming including chapter features in accordance with an exemplary embodiment of the present invention. A chapter feature of the iVOD interactive programming is used by a participant to select portions of iVOD interactive programming served by an interactive programming server that a participant may wish to participate in. A chapter feature includes a chapter menu 800 that is presented to a participant. The chapter menu includes a plurality of selectable chapter icons, such as chapter icons 802, 804, and 806. A participant selects a chapter icon and the participant's selection 808 is transmitted back to the interactive programming server which then transmits a chapter portion 810 of the iVOD interactive programming back to the participant for viewing. In a like manner, chapter icon 804 corresponds to iVOD interactive programming chapter portion 812 and chapter icon 806 corresponds to iVOD interactive programming chapter portion 814.

In one embodiment of iVOD interactive programming, a participant uses a guest selector 816 to search for iVOD programming generated for a particular subject such as a talk show featuring a particular guest. The participant can access programming for a particular interview guest by selecting a pull down menu 820 listing the names of guests. Once selected, the guest name appears in a guest name field 818 and iVOD interactive programming is made available to the participant wherein the iVOD interactive programming features the guest. iVOD interactive programming may also be searched for having other features. For example, iVOD interactive programming may be proposed for a participant knowing that some participants searched for a particular guest also searched for another related guest. As another example, the iVOD interactive programming may be searched for specific events such as unexpected or notable statements by guests during a talk show. As another example, participants may select iVOD programming from a list of "top-ten" programming segments.

Figure 18:
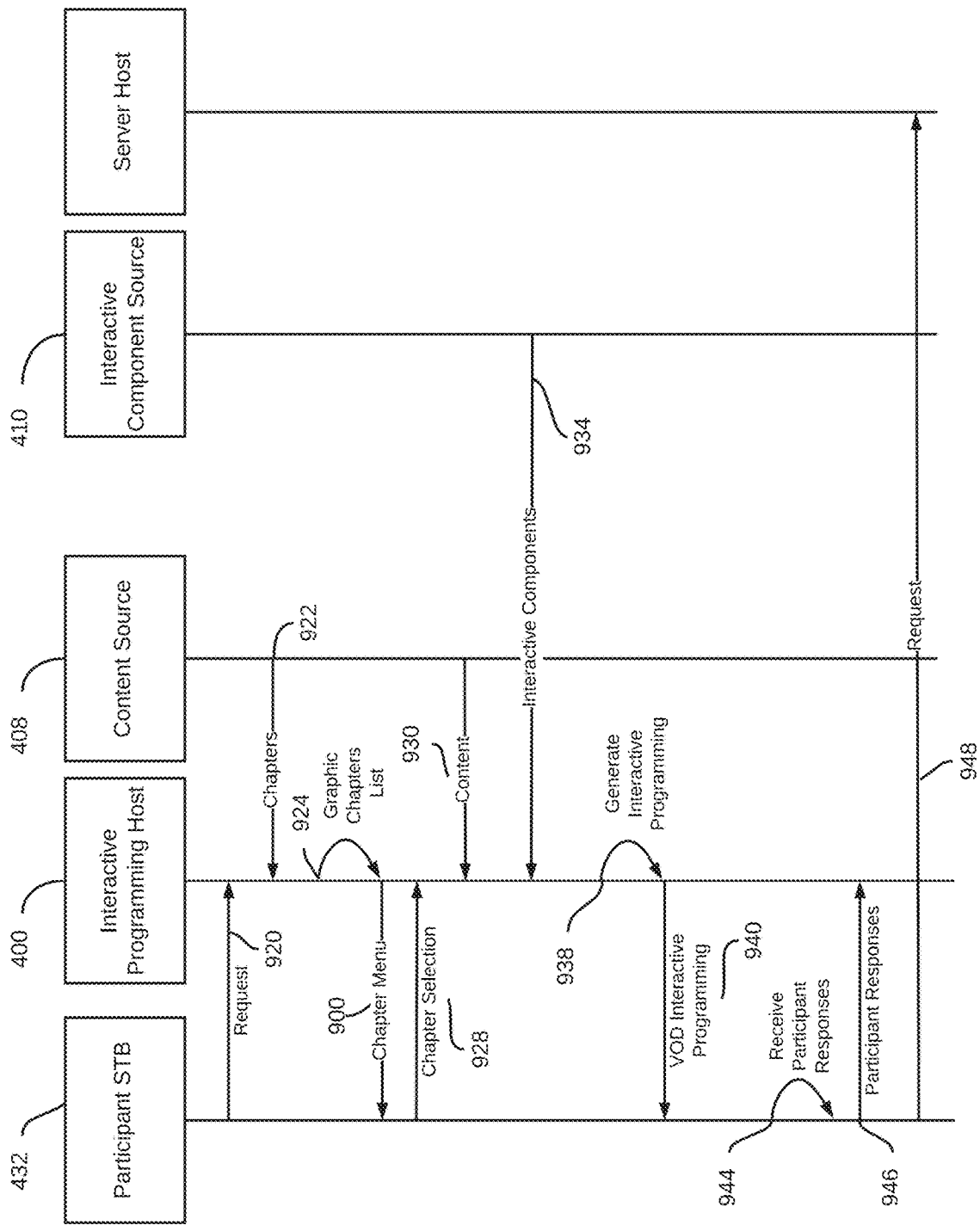
FIG. 18 is a sequence diagram of an iVOD interactive programming generation process in accordance with an exemplary embodiment of the present invention.

FIG. 18 is a sequence diagram of an iVOD interactive programming generation process in accordance with an exemplary embodiment of the present invention. A participant uses a participant STB 432 to access an interactive programming host 400 and transmits a request 920 for iVOD interactive programming. The interactive programming host accesses content from a content source 408 including chapter information and retrieves chapter information 922 for the requested iVOD interactive programming. The interactive programming host uses the chapter information to generate a chapter menu 900 having a list of selectable chapters as previously described. The user makes a chapter selection 928 from the chapter menu using the participant STB and transmits the chapter selection back to the interactive programming host. The interactive programming host uses the chapter selection to access and retrieve iVOD interactive programming content 930 and interactive components 934 from an interactive component source 410. The interactive programming server uses the content and interactive components to generate (938) an iVOD interactive programming signal 940 that is transmitted to the participant STB for viewing by the participant. The participant STB receives 944 participant responses 946 to the content portion of the iVOD interactive programming and transmits the participant responses to the interactive programming host. If a participant selects a link from a trigger to a commerce site, the participant STB transmits a request 948 to the commercial site as specified in the trigger.

The types of interactive components that may be included in iVOD interactive programming varies depending on the desires of a producer. In one iVOD interactive program in accordance with an exemplary embodiment of the present invention, a producer may include participant polls in a datafeed of the interactive components. Participants may answer the poll and the interactive programming host tabulates the participant's responses and includes them in the content portion of the interactive programming as a "ticker" that is constantly updated.

In another iVOD interactive program in accordance with an exemplary embodiment of the present invention, a producer may embed "Easter eggs" in the interactive components of an iVOD interactive program. A participant looks for the Easter eggs and once found, the Easter eggs unlock special features like audio messages from a producer or a chance to win a prize from a sponsor. In addition, participants may visit a Web site to get information on how to unlock special bonus material in exchange for registration information or viewing an advertisement.

In another iVOD interactive program in accordance with an exemplary embodiment of the present invention, a producer may include archival historical footage related to a specific iVOD interactive program.

In another iVOD interactive program in accordance with an exemplary embodiment of the present invention, a producer may include opposition running commentary. For example, an opposing view point may be presented during a politically oriented iVOD interactive program.

In another iVOD interactive program in accordance with an exemplary embodiment of the present invention, a producer may include on-camera pre-screening interviews of talk show guests.

In another iVOD interactive program in accordance with an exemplary embodiment of the present invention, a producer may include diagrams of a particular structure being discussed, such as diagrams of architecturally significant buildings during a presentation on architecture.

In another iVOD interactive program in accordance with an exemplary embodiment of the present invention, a producer may include behind-the scenes footage of the production of the iVOD interactive program.

In another iVOD interactive program in accordance with an exemplary embodiment of the present invention, a producer may include featurettes such as a documentary on a day in the life of a celebrity.

In another iVOD interactive program in accordance with an exemplary embodiment of the present invention, a producer may include triggers used for television Commerce (tCommerce) transactions.

In another iVOD interactive program in accordance with an exemplary embodiment of the present invention, a producer may include advertisements that a participant may view at their discretion. In addition, the advertisements may be linked to other information or tCommerce sites through the use of triggers.

In another iVOD interactive program in accordance with an exemplary embodiment of the present invention, a producer may include pop-up trivia facts including questions that a participant may answer. Answers from a plurality of participants may be collected as participant responses by the interactive programming server and scored so that a participant can see how the participant's performance in answering the questions compared to other participants.

Figure 19:
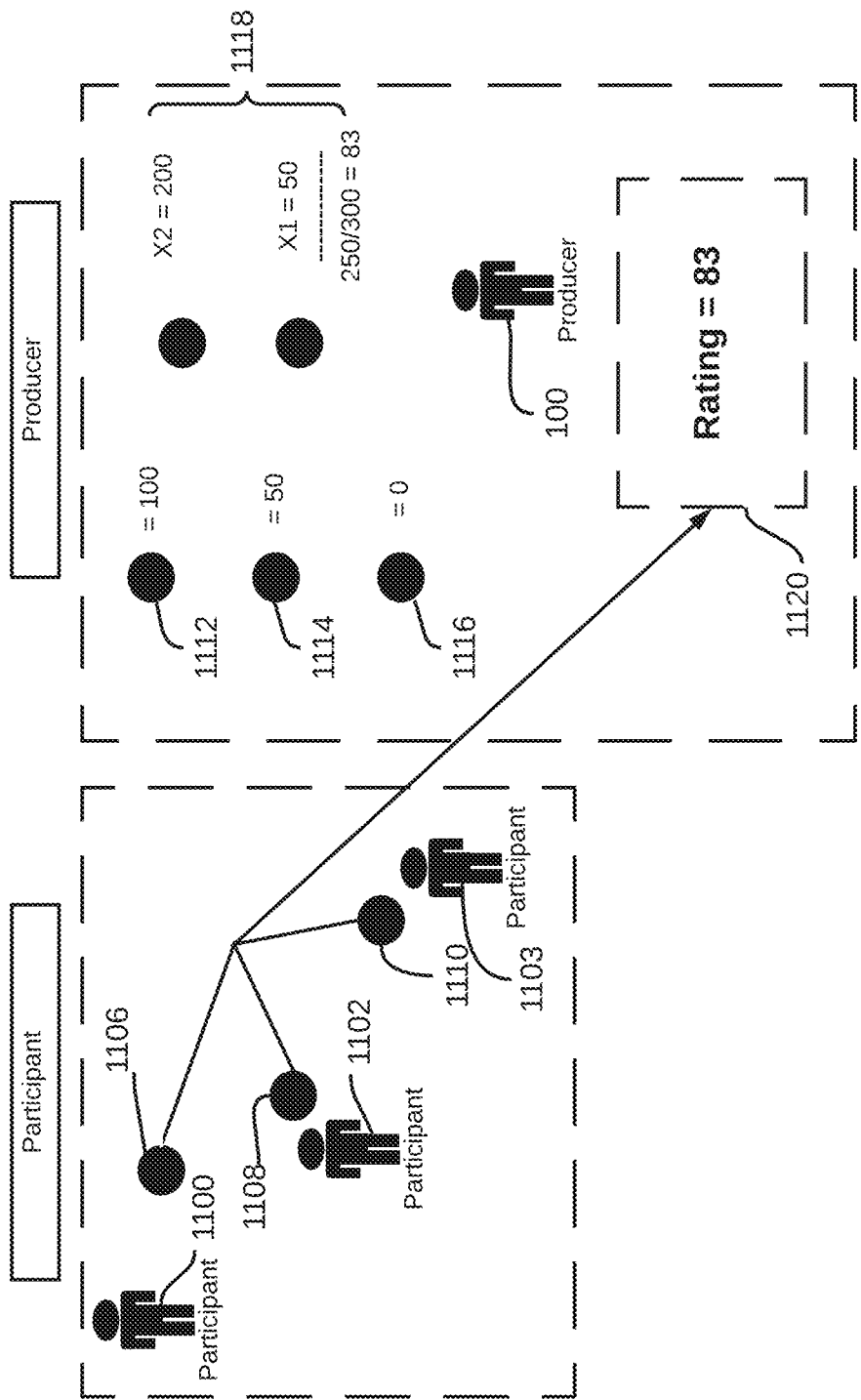
FIG. 19 is a diagram depicting a process for receiving participant reactions to an interactive program and calculating an audience approval system rating for an interactive program in accordance with an exemplary embodiment of the present invention.

FIG. 19 is a diagram depicting a process for receiving participant reactions to an interactive program and calculating an audience approval system rating for an interactive program in accordance with an exemplary embodiment of the present invention. A producer 100 generates an interactive program and transmits the interactive program to a plurality of participants as exemplified by participants 1100, 1102 and 1103. Each participant may have a different opinion of the quality of the interactive program; therefore, each participant is provided with an individual audience approval system button as exemplified by audience approval system buttons 1106, 1108, and 1110. Each participant selects an audience approval system rating button corresponding to the participant's subjective rating of the interactive program. The selection of an audience approval system button transmits a corresponding audience approval system signal to the interactive programming host (not shown) thus creating a plurality of audience approval system signals for evaluation by the interactive programming host. The interactive programming host receives the plurality of audience approval system signals and uses them to generate a single audience approval system rating signal and transmits the audience approval system rating signal for display with the interactive programming content.

In an audience approval system in accordance with an exemplary embodiment of the present invention, an audience approval system signal can take on three states, 1112, 1114, and 1116, with each state representing a participant's subjective opinion of the interactive program. In this embodiment, the three states are mapped to the corresponding numeric values of "100", "50", and "0", with "100" representing a participant's complete satisfaction with the interactive program, "50" representing the participant's partial satisfaction with the interactive program, and "0" representing the participant's complete dissatisfaction with the interactive program. Each of the plurality of audience approval system signals are mapped to one of these numeric values. These numeric values are used to generate an arithmetic mean representing the audience approval system rating of the interactive program. In the illustrated example of FIG. 11, participant 1100 rates the interactive program at "100", participant 1102 rates the interactive program at "50", and participant 1104 rates the interactive program at "100". These values are used by the interactive programming host to generate (1118) an arithmetic mean 1120 of the plurality of mapped participants' audience approval system signals. The arithmetic mean is presented to the participants as the audience approval system rating of the producer's interactive program. In one audience approval system in accordance with an exemplary embodiment of the present invention, the audience approval system rating is mapped to a color, with the numeric value of "100" being represented in green, the numeric value of "50" being represented in yellow, and the numeric value of "0" being represented in red.

Figure 20:
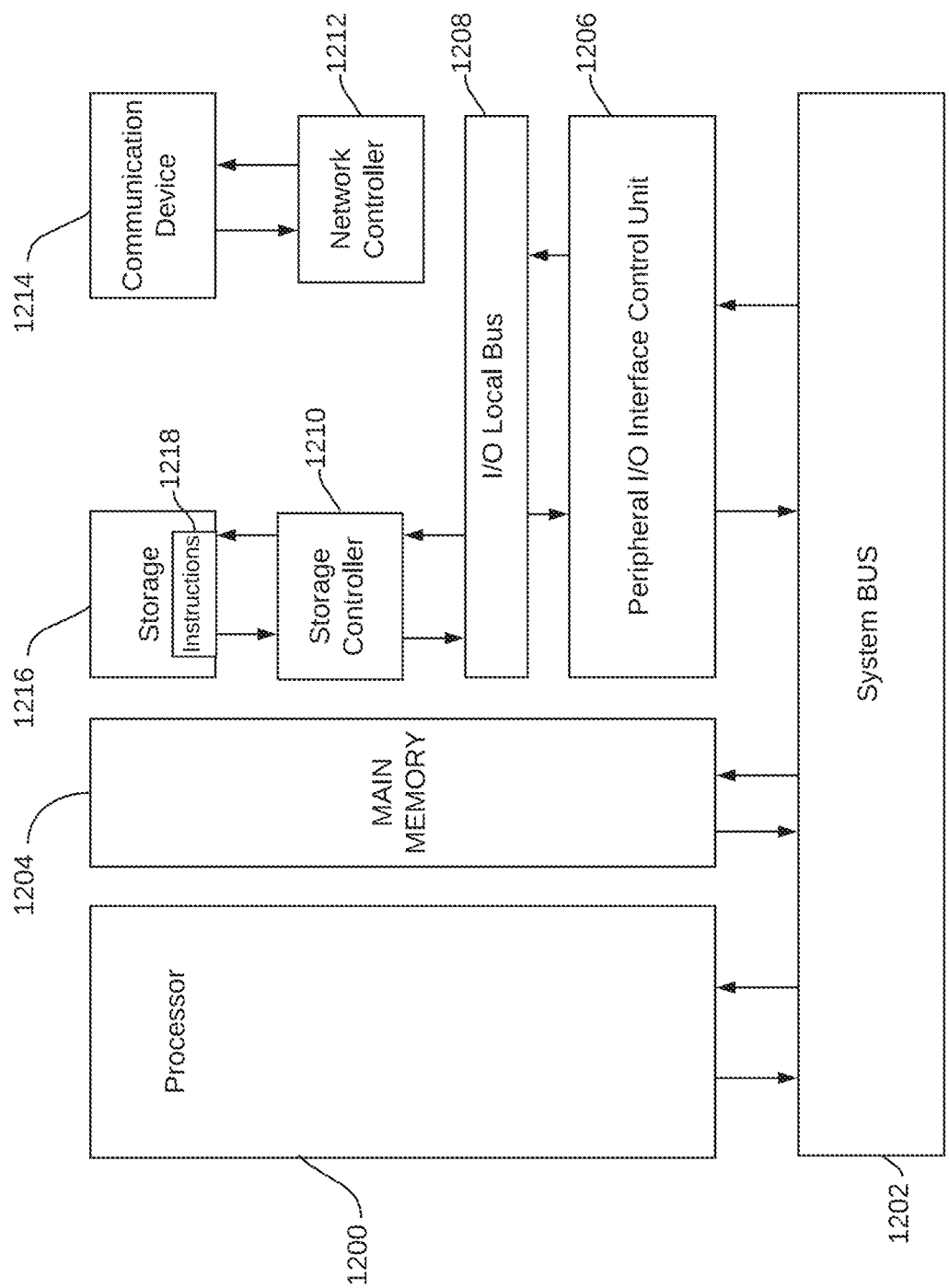
FIG. 20 is a hardware architecture diagram of a data processing system suitable for use as an interactive programming host in accordance with an exemplary embodiment of the present invention.

FIG. 20 is a hardware architecture diagram of a data processing system suitable for use as an interactive programming host in accordance with an exemplary embodiment of the present invention. A data processing system includes a processor 1200 operatively coupled via a system bus 1202 to a main memory 1204 and a peripheral I/O interface control unit 1206. The I/O interface control unit is operatively coupled via an I/O local bus 1208 to a storage controller 1210, and a network controller 1212. A communications device 1214 is operatively coupled to the network communications controller and is adapted to allow software objects hosted by the data processing system to communicate via a network with other software objects.

The storage controller is operatively coupled to a storage device 1216. Computer program instructions 1218 implementing an interactive programming server are stored on the disk storage device until the processor retrieves the computer program instructions and stores them in the main memory. The processor then executes the computer program instructions stored in the main memory to implement the interactive programming server.

Figure 21:
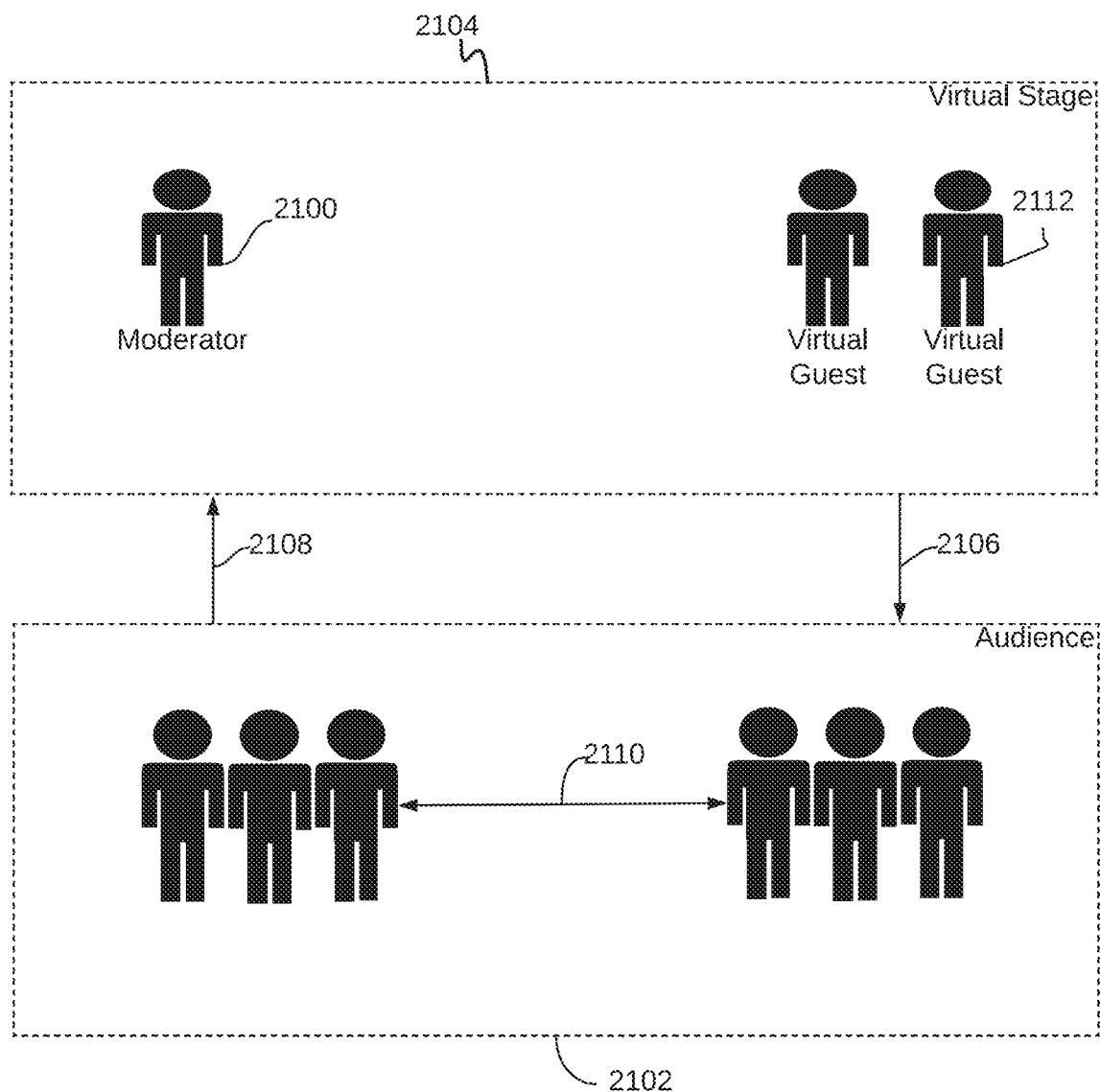
FIG. 21 is a conceptual diagram of a system for creating an interactive program incorporating participant interactions in accordance with an exemplary embodiment of the present invention.

FIG. 21 is a conceptual diagram of a system for creating an interactive program incorporating participant interactions in accordance with an exemplary embodiment of the present invention. A moderator 2100 hosts an interactive program, such as a broadcast program with a talk show format, that is transmitted to an audience having a plurality of viewers 2102. The interactive program takes place on a virtual stage 2104 where the moderator generates interactive programming for transmission to the viewers. The moderator transmits the interactive program 2106 to the viewers. The viewers may passively watch the interactive program or may become active participants by generating their own comments 2108 that are transmitted back to the moderator. The moderator edits or filters the participant comments and retransmits the edited participant comments as part of the interactive program. The viewers may communicate with each other during the interactive program by exchanging audience interactive messages 2110 between themselves.

The moderator controls the content of the interactive program in a variety of ways. The moderator introduces the initial topic or content for audience interaction. For example, the moderator may introduce a topical event such as a news story and then ask for participant comments. The moderator may also use previously prepared content such as a non-interactive program that is transmitted to the audience in order to elicit audience member responses and engage viewers. The moderator can invite virtual guests 2112 from the audience onto the virtual stage. While on the virtual stage, the virtual guests exchange interactive messages directly with the moderator rather than with other audience members or participants. The moderator may also exclude a participant or viewer from the audience. Additionally, the moderator may generate additional interactive programming for use by the audience such as polls so that the audience can participate in the interactive program by selecting responses to a question from a list of answers. The results of the participant responses are aggregated for inclusion in the interactive program.

In one system for creating an interactive program incorporating participant interactions in accordance with an exemplary embodiment of the present invention, the interactive programs are talk shows hosted by independent moderators and delivered to an audience via the Internet. This system allows a moderator to be recognized as an expert or respected voice in a particular field while building a community of viewer participants interested in that particular field. The system allows the moderator to create a controlled and moderated environment where the moderator directs the flow of information and has complete control over the medium. The system is cost-effective because no special hardware or training is needed to operate the system. The system features a customizable Web-based interface for moderators and viewers to use in creating customized collaborative interactive programs.

Figure 22:
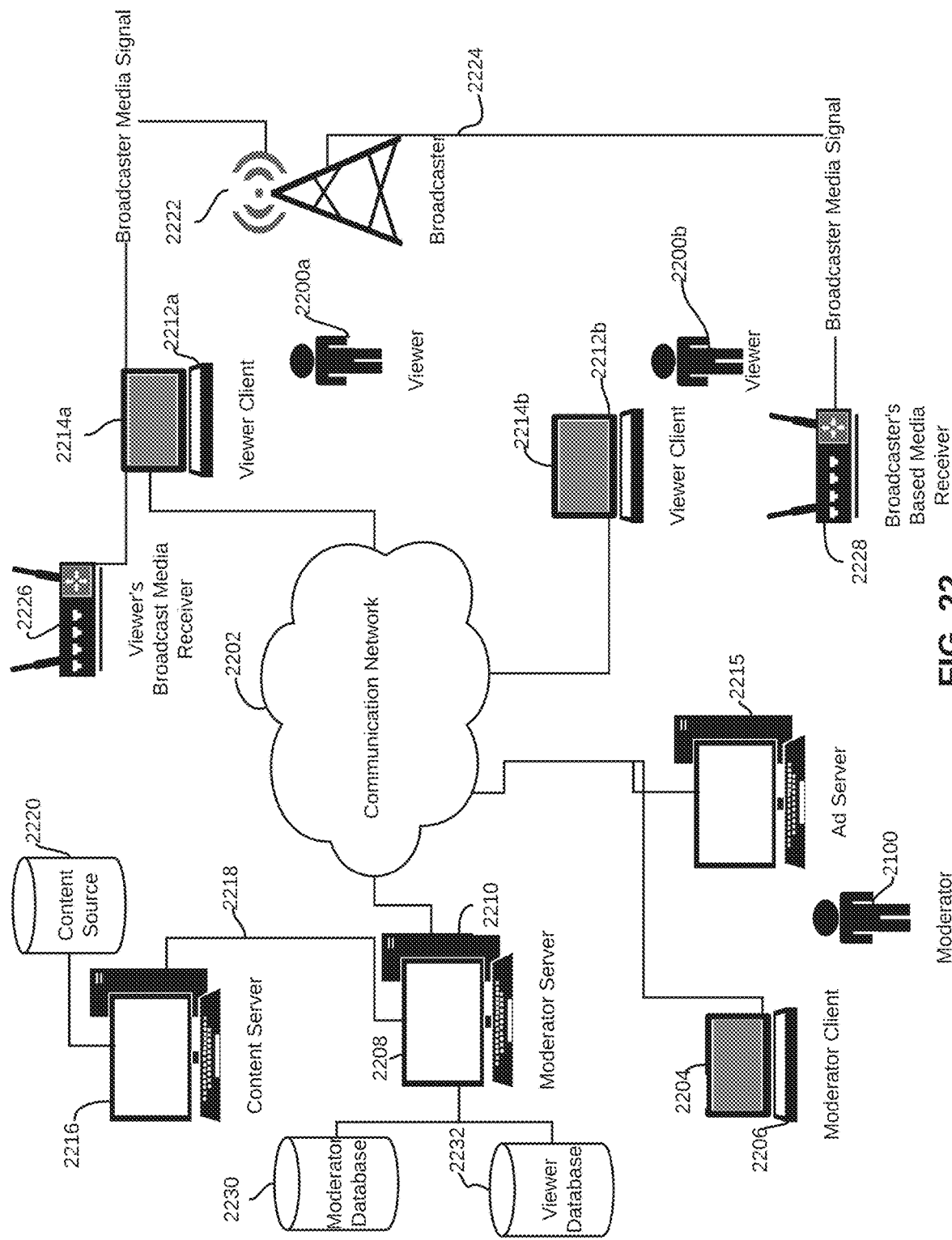
FIG. 22 is a deployment diagram of a system for creating an interactive program in accordance with an exemplary embodiment of the present invention.

FIG. 22 is a deployment diagram of a system for creating an interactive program incorporating participant interactions in accordance with an exemplary embodiment of the present invention. A moderator 2100 transmits an interactive program to a plurality of viewers, as exemplified by viewers 2200 *a* and 2200 *b*, via a communications network 2202 such as the Internet. The moderator uses a moderator client 2204 to transmit moderator signals over communications link 2206 and communications link 2208 to a moderator server 2210. The moderator server uses the moderator signals to generate an interactive program that is transmitted over communications link 2208 and communications links 2212 *a* and 2212 *b* to a plurality of viewer clients as exemplified by viewer clients 2214 *a* and 2214 *b*. The viewers become participants by responding to the interactive program by generating and transmitting to the moderator server a plurality of participant comment signals using the viewer clients. The participant comment signals encode the participants' commentary about the interactive program. The moderator server receives the participant comment signals and retransmits them to the moderator client where the moderator edits the participant comment signals. The moderator generates new moderator signals that are transmitted to the moderator server along with the edited participant comment signals. The moderator server uses the moderator signals and the edited user comment signals to generate additional interactive program signals that are transmitted to the viewers' clients. The process of receiving participant comment signals, editing the user comment signals, and generating new interactive program signals is repetitively performed in order to generate an interactive program incorporating viewer interactions.

In a system for creating an interactive program incorporating viewer interactions in accordance with an exemplary embodiment of the present invention, the moderator server is operably coupled to content server 2216 via a communications link 2218. The content server hosts a content source such as content database 2220 including content suitable for broadcast by the moderator server. Such content may include past broadcast programs that the moderator is using as a topic for further discussion within the audience. The moderator instructs the moderator server to request and receive content signals from the content server and the moderator server generates an interactive program including the content signals. In this way, non-interactive content may be enhanced with an interactive component thus leveraging non-interactive content by creating an interactive program using content without an interactive component. In another embodiment of enhanced content, the content is synchronized with the interactive component and the content is transmitted to the viewer client from a server other than the moderator server in a program synchronous fashion.

In a system for creating an interactive program incorporating viewer interactions in accordance with an exemplary embodiment of the present invention, the moderator server hosts software facilities for the moderator to use in generating an interactive program. The moderator server is operably coupled to a moderator database 2230 including moderator information describing the type of interactive program the moderator produces and the moderator's interactive program broadcast schedule. The moderator information may be used to automatically generate a dynamic programming guide thus helping viewers find the moderator's interactive program. In addition, the moderator server records viewer interaction data describing the amount, timing, and type of viewer interactions with the moderator's produced interactive programming. The moderator may access the viewer interaction data to generate reports regarding the moderator's interactive programming.

In a system for creating an interactive program incorporating viewer interactions in accordance with an exemplary embodiment of the present invention, the moderator server hosts a viewer database 2232 including viewer profile information. Viewer profile information includes information about viewer preferences and viewer notification requests. The viewer preferences are used by the moderator server to suggest interactive programming generated by a moderator which may match the viewer's stated preferences. The viewer notification requests are used by the moderator server to generate viewer notifications that are transmitted to a viewer in order to notify a viewer when a specific interactive program is about to be broadcast.

In one embodiment of a viewer notification generation process in accordance with the present invention, the privacy of the viewer is protected by not allowing the moderator access to viewer profiles. For example, the moderator may initiate a notification process but the moderator is never allowed to see to which viewers the notifications are sent. In addition, any viewership reports generated on behalf of a moderator use aggregate data for the viewers so that the viewers' identifications are not associated with the individual viewership reports.

In a system for creating an interactive program incorporating viewer interactions in accordance with an exemplary embodiment of the present invention, the audience and moderator comment on a broadcast program over which the moderator has minimal control. In this embodiment, a broadcaster 2222 transmits a broadcaster media signal 2224 received by a viewer's broadcast media receiver 2226 and a moderator's broadcast media receiver 2228. In this embodiment, the moderator and the audience watch the broadcast program and exchange commentary about the broadcast program over the communications network as described above. In this way, non-interactive programming can be supplemented with an interactive component. Exemplary broadcast programs include broadcasts of real-time events, such as sporting events or breaking news stories, and pre-recorded programming such entertainment programs or documentaries.

Figure 23:
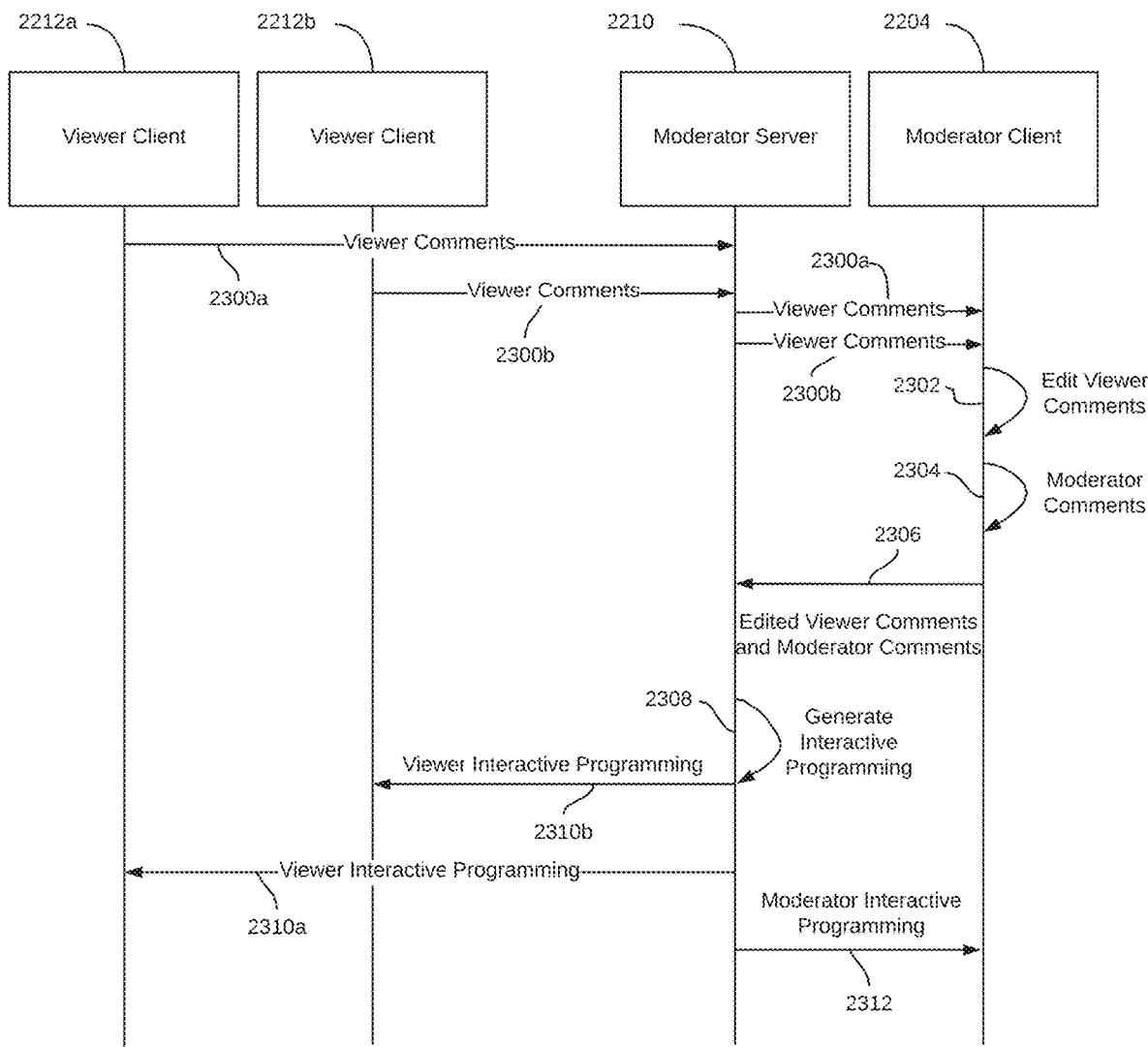
FIG. 23 is a sequence diagram of the operations within a system for creating an interactive program in accordance with an exemplary embodiment of the present invention.

FIG. 23 is a sequence diagram of a process within a system for creating an interactive program incorporating viewer interactions in accordance with an exemplary embodiment of the present invention. A moderator server 2210 receives viewer comments 2300 *a* and 2300 *b* from a plurality of viewer clients as exemplified by viewer clients 2212 *a* and 2212 *b*. The moderator server transmits the viewer comments, 2300 *a* and 2300 *b*, to a moderator client 2204. A moderator uses the moderator client to edit (2302) the viewer comments and generate (2304) moderator comments. The edited viewer comments and the moderator comments 2306 are transmitted to the moderator server along with other moderator control signals generated by the moderator such as a viewer invitation signal for indicating a viewer to invite to a virtual stage or a viewer exclusion signal for excluding a viewer that is not behaving properly. The moderator server uses the moderator comments and the edited viewer comments to generate (2308) viewer interactive programming, 2310 *a* and 2310*b*, that is transmitted to the plurality of viewer clients and moderator interactive programming 2312 that is transmitted to the moderator client. The process is repeated indefinitely to generate an interactive program with the plurality of viewers interacting with the viewer interactive programming and the moderator using the moderator interactive programming to moderate the generation process.

In one embodiment of a system for creating an interactive program in accordance with an exemplary embodiment of the present invention, the interactive programming generated by the moderator server is stored in a moderator database (for example moderator database 2230 of FIG. 22) for archival purposes. The interactive programming can be indexed and cataloged for generation of an archive listing describing the archived interactive programming. A viewer can then request archived interactive programming for viewing at a later time for "on-demand" viewing.

In one embodiment of a system for creating an interactive program in accordance with an exemplary embodiment of the present invention, a viewer can initiate the creation of an archive for an interactive program. As the interactive program is produced and transmitted to the viewer, the interactive program signals are stored for the viewer's own use. For example, a viewer can initiate the creation of an archive for a short period of time so that the viewer can leave the interactive program and rejoin the interactive program and be able to view the portions of the interactive program that the viewer missed. As another example, the viewer can create a personal archive of past interactive programs in a manner similar to a personal video recorder.

In another system for creating an interactive program in accordance with an exemplary embodiment of the present invention, the communications network is the Internet and the viewer clients and a moderator client are Web browsers. The moderator server receives moderator and participant comment signals in the form of POST requests and generates the interactive program as an interactive electronic document written in a document markup language such as Hyper Text Markup Language (HTML) or eXtensible Markup Language (XML) that is transmitted to the viewer clients. The viewer clients parse the electronic document and generate viewer displays using the instructions in the electronic document. The viewers respond to the viewer displays by entering text and selecting elements from the viewer displays. These viewer interactions are transmitted to the moderator server by the viewer's clients in subsequent POST messages. The moderator receives a different set of interactive moderator electronic documents that implement a moderator user interface enabling the moderator to control the operations of the moderator server.

In one system for creating an interactive program in accordance with an exemplary embodiment of the present invention, the system is deployed using the Microsoft® TV platform which is a standards-based, client and server software middleware system for deploying interactive programming. The platform includes a client software application hosted by a set-top-box and a server software application operably coupled by a communications network. The client software application includes a Web browser that can be used much like a conventional Web browser and an application programming interface for building native applications that are hosted by the set-top-box. The server includes several management functions including t-commerce and client management applications.

In another system for creating an interactive program in accordance with an exemplary embodiment of the present invention, the interactive programming generated by the moderator server further includes "click-through" style banner ads for selection by a viewer. If a viewer selects a click-through banner ad, the viewer's interaction with the banner ad is recorded in a moderator database in order to generate click-through activity related to the interactive programming. The banner ads may come either from the moderator server or an ad server not affiliated with the moderator server.

Figure 57:
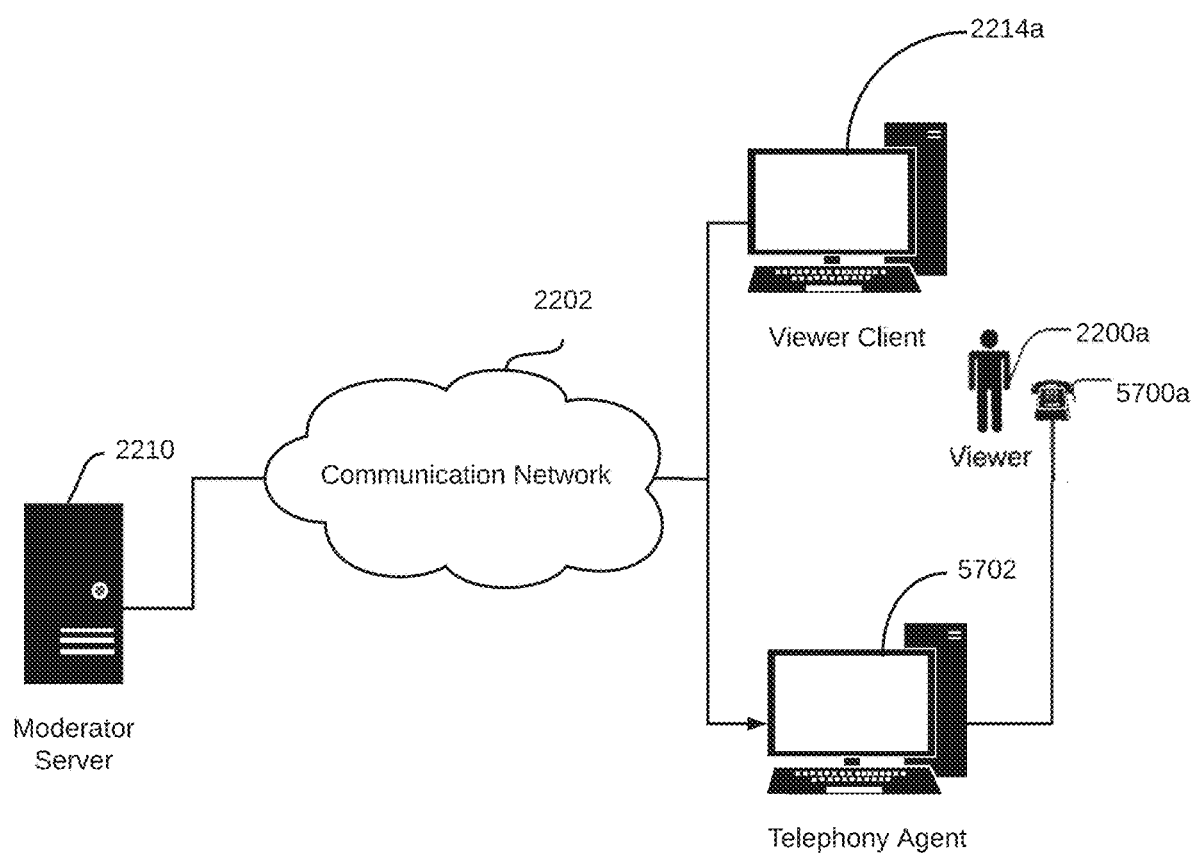
FIG. 57 is a deployment diagram for a telephony system for delivery of an interactive program in accordance with an embodiment of the present invention.

FIG. 57 is a deployment diagram for a telephony system for delivery of an interactive program in accordance with an embodiment of the present invention. A previously described moderator server 2210 is operably coupled via a communications network 2202 to previously described viewer client 2214 a. A viewer 2200 a, views an interactive program by accessing the moderator server using the viewer client. To participate, the viewer uses a telephone device 5700a to connect to a telephony agent 5702 operably coupled to the moderator server via the communications network. In operation, the viewer uses the telephone to dial up the telephony agent. The telephony agent receives audio signals and converts the audio signals to text signals that are transmitted to the moderator server via the communications network. In turn, the moderator server re-routes the textual component signals of an interactive program to the telephony agent. The telephony agent receives the textual component signals and converts the textual component signals into audio signals for transmission to the viewer via the telephone.

In another interactive program creation system in accordance with an embodiment of the present invention, a viewer downloads and installs a custom client plug-in that allows a viewer a built-in microphone on the viewer client. Using a control panel, participants direct their questions or comments to either the virtual stage or the audience interactive message area. The spoken words are digitized by the viewer client, analyzed, translated into text form, and transmitted via the communications link to the moderator server. The question or comment then appears in the interactive program. The plug-in allows viewers to participate in an interactive program in a traditional, voice-based way if they choose to.

In another interactive program creation system in accordance with an embodiment of the present invention, the spoken words are not translated to text. Instead, the digitized voice is transmitted directly over the communications link to the moderator server such as in Voice over Internet Protocol (VOIP) transmissions.

Figure 58:
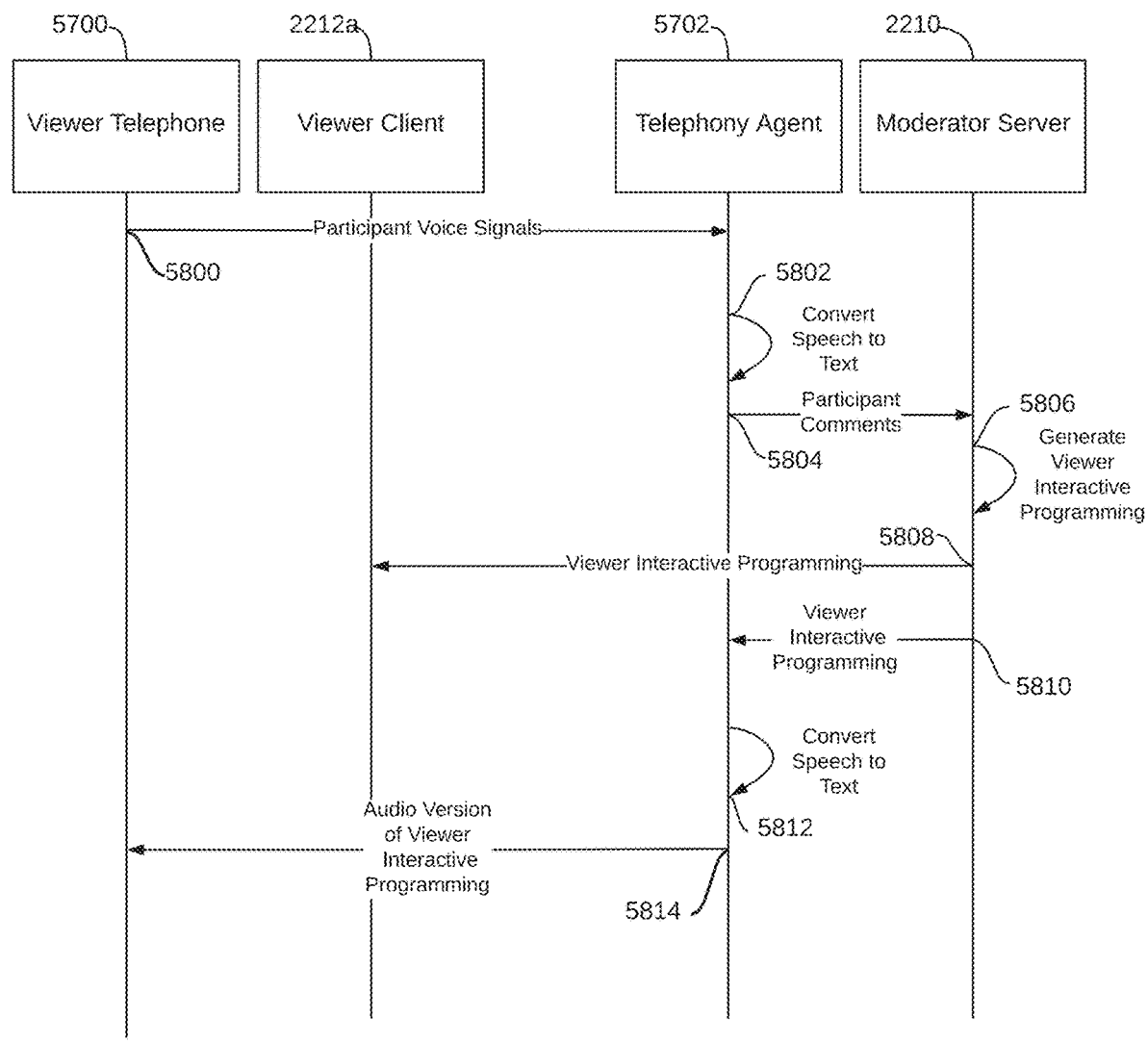
FIG. 58 is a sequence diagram for a telephony process as used by a telephony system for delivery of an interactive program in accordance with an embodiment of the present invention.

FIG. 58 is a sequence diagram for a telephony process as used by a telephony system for delivery of an interactive program in accordance with an embodiment of the present invention. A viewer uses a telephone device 5700 to send participant voice signals to a telephony agent 5702. The telephony agent converts 5802 the participant voice signals to text in a speech-to-text conversion process. The textual participant comments 5804 are transmitted to the moderator server. The textual participant comments are used to generate 5806 viewer interactive programming signals 5808 in a to-be-described process. The moderator server transmits the viewer interactive programming signals to the viewer client and transmits a second set of viewer interactive programming signals 5810 to the telephony agent. The telephony agent converts (5812) the textual portions of the viewer interactive programming to signals for an audio version of the viewer interactive programming 5814 in a text to speech conversion process. In this way, a viewer can participate in an interactive program using a telephone device for the generation of viewer interaction signals.

In another telephony process as used by a telephony system for delivery of an interactive program in accordance with an embodiment of the present invention, the video components of the interactive program are dispensed with and the participant interacts with the textual components of the interactive program using the telephone device. In this way, an interactive program can be created by a moderator with only textual or audio and textual components that is accessible to a participant using only a telephone device.

Figure 60:
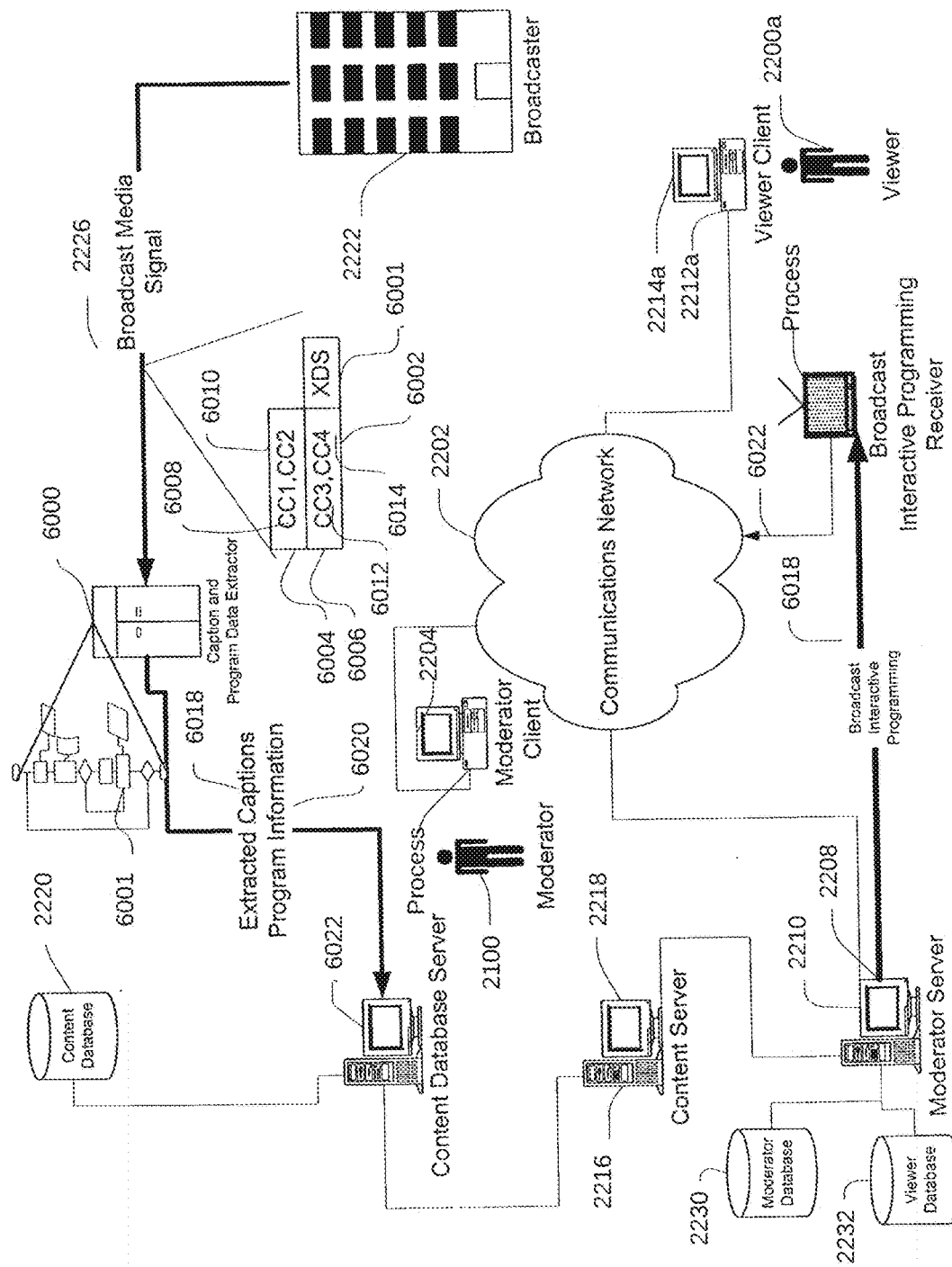
FIG. 60 is a block diagram of a system for extracting closed captioning from a broadcast signal in accordance with an exemplary embodiment of the present invention.

FIG. 60 is a deployment diagram of a system for extracting closed captioning from a broadcast signal in accordance with an exemplary embodiment of the present invention. A broadcaster 2222 transmits a broadcast media signal 2226 that is received by a caption and program data extractor 6000. The caption and program information extractor includes programming instructions 6001 that identify captioning and program information encoded in the broadcast media signal and extracts the captions and program information for storage in a database. The broadcast media signal includes captioning information 6002 encoded in the signal such as within line 21 of a vertical blanking interval (VBI) of a television signal. The captioning information is encoded in the broadcast media signal by a broadcaster in order to serve hearing-impaired viewers of the broadcast media signal. As such, the captioning information includes a transcription of the speech portion of a broadcast program. For example, a talkshow with captioning may include a transcript of the questions asked by a host of a guest and the responses of the guest to the host's questions.

The captioning information is included as several text streams in the broadcast media signal. In one embodiment of a broadcast media signal in accordance with an exemplary embodiment of the present invention, the captioning information includes a field 1 6004 and a field 2 6006. Field 1 includes a first captioning information 6008 and a second captioning information 6010 text stream. Field 2 includes a third captioning information 6012 and a fourth captioning information 6014 text string as well as eXtended Data Service (XDS) information 6001 encoded in a series of packets. The fields are described in table 2a and table 2b below.

TABLE 2a

| Field 1 Packets Name* | Field | Data Channel | Description |
|---|---|---|---|
| CC1 | 1 | 1 | Primary Synchronous Caption Service |
| CC2 | 1 | 2 | Special Non-Synchronous Use Captions |
| T1 | 1 | 1 | First Text Service |
| T2 | 1 | 2 | Second Text Service |

TABLE 2b

| Field 2 Packets Name* | Field | Data Channel | Description |
|---|---|---|---|
| CC3 | 2 | 1 | Secondary Synchronous Caption Service |
| CC4 | 2 | 2 | Special Non-Synchronous Use Captions |
| T3 | 2 | 1 | Third Text Service |
| T4 | 2 | 2 | Fourth Text Service |
| XDS | | | eXtended Data Services |

There are several different classes of XDS packets encapsulating information about a broadcast program. For example, defined XDS packet classes include Current Class (information about the current program such as the title, length, rating, elapsed time, audio services, caption services, and aspect ratio), Future Class (the same information for an upcoming program), Channel Information Class (information such as the network name, station call letters, native channel number and tape delay), Miscellaneous Class (containing the time of day and the local time zone) and Public Service Class (severe weather warnings). In addition, Reserved and Undefined Classes are set aside for future expansion and proprietary applications.

For each Class, there are two groups of similar packet types. Bit 6 is used as an indicator of these two groups. When bit 6 of the Type character is set to 0 the packet only describes information relating to the channel that carries the signal. This is known as an In-Band packet. When bit 6 of the Type character is set to 1, the packet only contains information for another channel. This is known as an Out-of-Band packet.

The Current Class includes a Program Identification Number (Scheduled Start Time) packet including four characters that define the program start time and date relative to Coordinated Universal Time (UTC). This is non-character-based data so bit #6 is always set to one. The format of the characters is identified in Table 3.

TABLE 3

| | Character | | | | | | |
|---|---|---|---|---|---|---|---|
| | B6 | b5 | b4 | b3 | B2 | B1 | b0 |
| Minute | 1 | m5 | m4 | m3 | m2 | m1 | m0 |
| Hour 1 | D | h4 | h3 | h2 | h1 | h0 | |
| Date 1 | L | d4 | d3 | d2 | d1 | d0 | |
| Month | 1 | Z | T | m3 | m2 | m1 | m0 |

The minute field has a valid range of 0 to 59, the hour field from 0 to 23, the date field from 1 to 31, the month field from 1 to 12. The "T" bit is used to indicate a program that is routinely tape delayed (for mountain and pacific time zones). The D, L, and Z bits are ignored by the decoder when processing this packet. (The same format utilizes these bits for time setting.) The T bit is used to determine if an offset is necessary because of local station tape delays. A separate packet of the Channel Information Class indicates the amount of tape delay used for a given time zone. When all characters of this packet contain all Ones, it indicates the end of the current program. A change in received Current Class Program Identification Number is interpreted by XDS receivers as the start of a new current program.

A Length/Time-in-Show packet is composed of 2, 4 or 6 non-character-based informational characters. It is used to indicate the scheduled length of the program as well as the elapsed time for the program. The first two informational characters are used to indicate the program's length in hours and minutes. The second two informational characters show the current time elapsed by the program in hours and minutes. The final two informational characters extend the elapsed time count with seconds. The informational characters are encoded as indicated in Table 4.

TABLE 4

| | Character | | | | | | |
|---|---|---|---|---|---|---|---|
| | B6 | b5 | b4 | b3 | B2 | B1 | b0 |
| Length - (m) | 1 | | m5 | m4 | m3 | m2 | m1 | m0 |
| Length - (h) | 1 | h5 | h4 | h3 | h2 | h1 | h0 | |
| ET - (m) | 1 | | m5 | m4 | m3 | m2 | m1 | m0 |
| ET - (h) | 1 | h5 | h4 | h3 | h2 | h1 | h0 | |
| ET - (s) | 1 | s5 | s4 | s3 | s2 | s1 | s0 | |
| Null 0 | 0 | 0 | 0 | 0 | 0 | 0 | | |

The minute second fields have a valid range of 0 to 59, and the hour fields from 0 to 63. The sixth character is a standard null.

The Program Name packet contains a variable number, 2 to 32, of Informational characters that define the program title. Each character is in the range of 20 h to 7 Fh. The variable size of this packet allows for efficient transmission of titles of any length.

A complete definition of a XDS packets may be found in Recommended Practice for Line 21 Data Service, Electronics Industries Association, EIA-608 (drafts Oct. 12, 1992 and Jun. 17, 1993), the subject matter of which is hereby incorporated by reference as if fully stated herein. An exemplary device suitable for extraction of captions and XDS packets from a television signal is an ATI-TV ISA television tuner sold by ATI technologies Inc. of Markham, Ontario Canada. The device includes software for monitoring television signals and extracting captioning to create a program transcription.

The caption and program information extractor extracts the captioning information 6018 from the broadcast media signal along with program information 6020 from the concurrently transmitted XDS packets and stores the captioning information and program information in a content database 2220 serviced by a content database server 6022. The content database server is coupled to the previously described content server 2216.

A moderator server 2210 receives captioning information from the content server and transmits the captions to a moderator client 2204 over communications link 2208 and communications link 2206. A moderator 2100 uses the moderator client to edit the captioning information and adds moderator commentary to the edited captioning information thus creating moderated programming content using the captioning information as source material. The moderator client transmits the edited captioning information and moderator commentary to the moderator server where the moderator server creates interactive programming for transmission to a plurality of viewer clients, as exemplified by viewer client 2214 *a*, via a communications network 2202 such as the Internet and communications link 2212 *a*. A plurality of viewers, as exemplified by viewer 2200 *a*, view and interact with the interactive programming using a viewer client.

In one embodiment of a caption and program data extractor in accordance with an exemplary embodiment of the present invention, other components of the broadcast media signal are extracted and stored in the content database. For example, the caption and program data extractor may extract video frames from the broadcast media signal on either a regular or random interval and store the captured frames along with the captioning information and program information. As another example, the caption and program data extractor may extract portions of an audio component and store the portions in the content database. These additional components of the broadcast media signal are associated with the captioning and programming information in the content database so that the additional components may be recalled and used to augment the captioning information when generating interactive programming.

In one system for extracting closed captioning from a broadcast signal in accordance with an exemplary embodiment of the present invention, the extracted captions are compressed before they are stored. As the captions are textual information, many compression tools may be used. In one system, the compression tool used is the Lempel-Ziv-Oberhumer (LZO) compression tool authored by Markus Franz Xaver Johannes Oberhumer. Source code for the compression tool is available at http://www.oberhumer.com/opensource/lzo/. LZO is a lossless block compression technique with decompression requiring no memory resources. As the decompression step does not require any memory resources, decompression may be performed on hosts with limited memory such as set top boxes used with televisions as displays.

Figure 64:
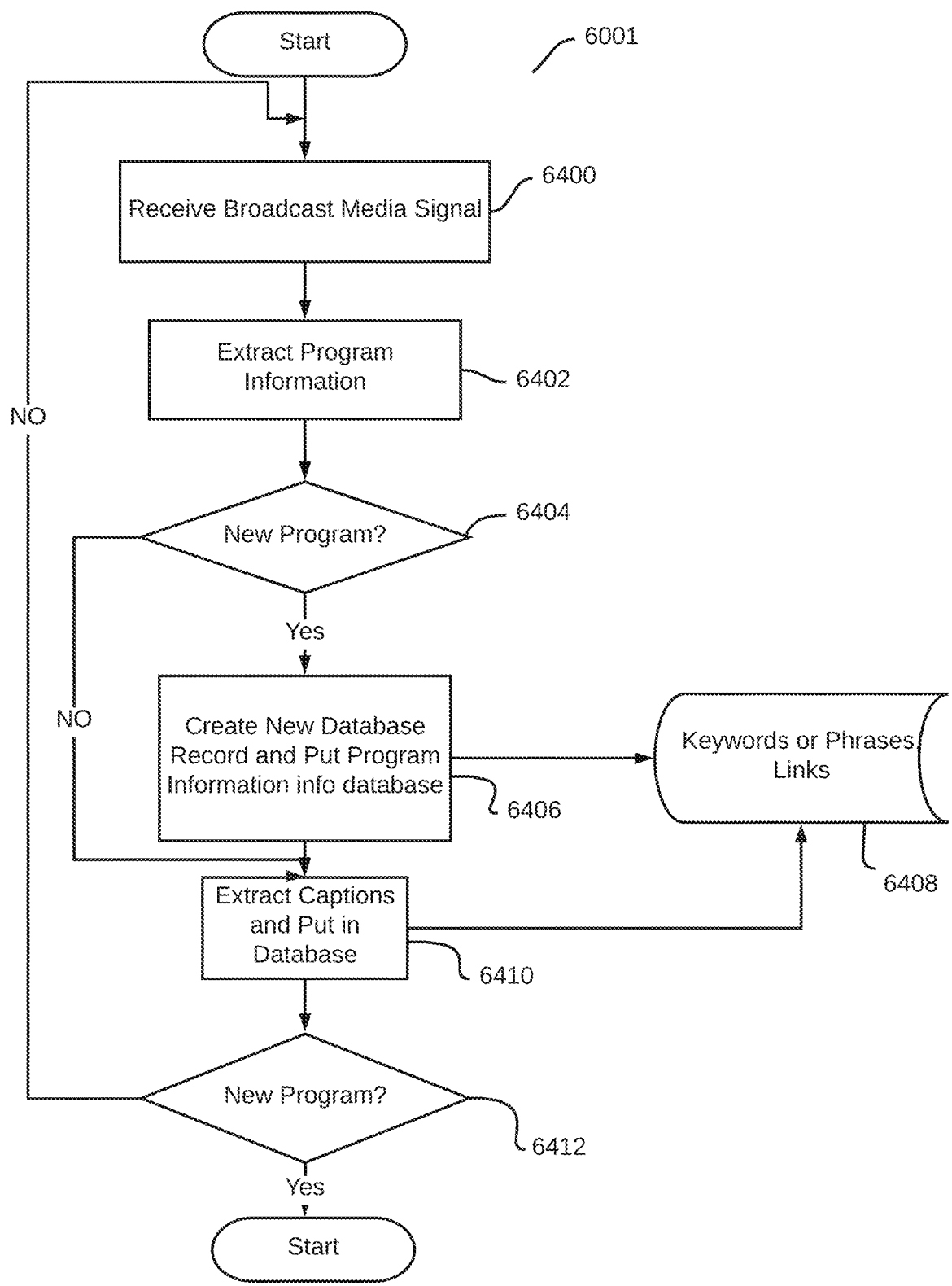
FIG. 64 is a process flow diagram of a program information and caption extraction process in accordance with an exemplary embodiment of the present invention.

FIG. 64 is a process flow diagram of a program information and caption extraction process in accordance with an exemplary embodiment of the present invention. A program information and caption extraction process 6001 is hosted by a previously described program information and caption extractor 6000 (of FIG. 60). The program information and caption extraction process receives (6400) a broadcast media signal having captions and program information as previously described. The program information and caption extraction process extracts (6402) the program information from the broadcast media signal and determines (6404) if the program information indicates that a new program is being broadcast. If so, the program information and caption extraction process creates (6406) a new database record (6408) for extracted captions using the program information and puts the program information into the new database record. The program information and caption extraction process then extracts (6410) the captions from the broadcast media signal and stores the captions in the new database record. The program information and caption extraction process determines (6412) if it should stop extracting captions. If not, the program information and caption extraction process continues receiving (6400) the broadcast media signal looking for programs and new captions to archive.

Figure 61:
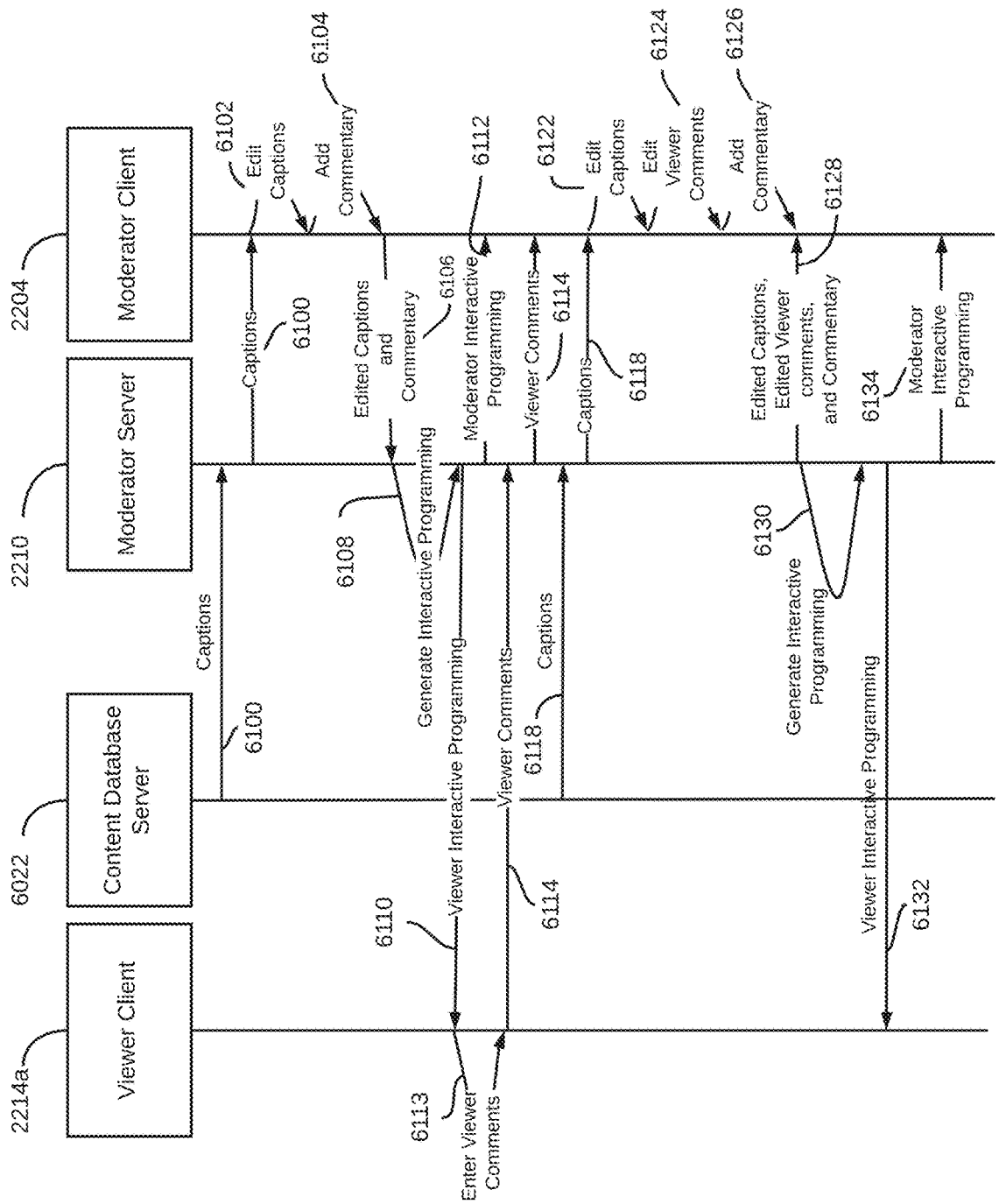
FIG. 61 is a sequence diagram of an interactive programming system in accordance with an exemplary embodiment of the present invention.

FIG. 61 is a sequence diagram of an interactive programming system in accordance with an exemplary embodiment of the present invention. A moderator uses a moderator client 2204 to request and receive captions 6100 from a content database server 6022 via a moderator server 2210. The moderator uses the moderator client to edit (6102) the captions and add (6104) commentary. The edited captions and commentary 6106 are transmitted to the moderator server where they are used generate (6108) interactive programming for both a viewer 6110 and the moderator 6112. A viewer interacts with the viewer interactive program by entering (6113) viewer comments 6114 using the viewer client. The viewer comments are transmitted by the viewer client the moderator server that retransmits the viewer comments to the moderator client. The moderator client requests and receives additional captions 6118 from the content database server via the moderator server. The moderator then edits (6122) the captions, edits (6124) the viewer comments, and adds (6126) commentary to create new edited captions, viewer comments, and commentary 6128 that are transmitted to the moderator server. The moderator server uses the edited captions, viewer comments, and commentary to generate (6130) new viewer interactive programming 6132 and moderator interactive programming 6134 for transmission to the viewer client and the moderator client respectively. The process of combining viewer comments, new captions, and moderator commentary to generate interactive programming is continuously repeated to generate a continuous stream of interactive programming.

In one interactive programming system in accordance with an exemplary embodiment of the-present invention, the captioning information is compressed as previously described. In addition, the interactive programming for both commentator and the viewer is compressed before transmission.

Referring again to FIG. 60, in one interactive programming system in accordance with an exemplary embodiment of the present invention, broadcast interactive programming 6018 is encoded for broadcast transmission in the VBI of a television signal. Textual components of an interactive program are generated as previously described and placed into a television VBI signal as captioning information. The television signal may include a video signal for a television program that the commentator and the viewers want to discuss. The television signal including the interactive programming is transmitted to the viewers and the viewers' television, as exemplified by broadcast interactive programming receiver 6020, decodes and displays the textual components of the interactive programming. Viewers interact with the interactive programming using a back channel 6022, such as through a communications network 2202, or a previously described telephony link.

Links to other resources are encoded in the television signal in the form of Uniform Resource Locators (URLs) which are string representations of locations for use in identifying abstract or physical resources on the Internet. URLs can be transmitted in the T-2 service encoded in line 21 of the VBI, and may be used by receiving devices to permit the linking of television programs with related content on the Internet so that the content from these Internet services may be combined, mixed or shared by the receiving device.

URLs are transmitted in T-2 by using the following general format:

<url>[attr1:val1][attr2:val2] . . . [attrn:valn][checksum]

The URL is enclosed in angle brackets, followed by zero or more pairs of attributes and values in square brackets, which are then followed by a checksum in square brackets. Four attributes are defined in this standard: "type", "name", "expires", and "script". The "type" attribute indicates what sort of content the URL is associated with (for example, content related to the current television program or with the broadcast network). The type can be airy one of the values in table 5:

TABLE 5

| Value | URL is associated with |
|---|---|
| PROGRAM | the current program |
| NETWORK | the broadcast network |
| STATION | the local station |
| SPONSOR | a commercial sponsor or advertiser for the current program |
| OPERATOR | the service (e.g., cable or satellite) operator |

The "name" attribute indicates a human-readable title for the resource and can be any string of characters between 20 h and 7 Eh except square brackets (5 Bh and 5 Dh) and angle brackets (3 Ch and 3 Eh). The "expires" attribute enables an author to specify the last date the URL is valid, after which the URL should be ignored by the receiving device. The "script" attribute enables the triggering of specific actions within the content referenced by the URL. The value specifies a script fragment that is to be sent to the page and executed; the scripting language is compatible with ECMA-262 (for example, "JavaScript™" or "JScript™"). The script is executed when the content referenced by the URL is displayed on the receiving device. If that content is currently being displayed, the script fragment is immediately executed. The context for the script is the root document corresponding to the URL specified.

Figure 62:
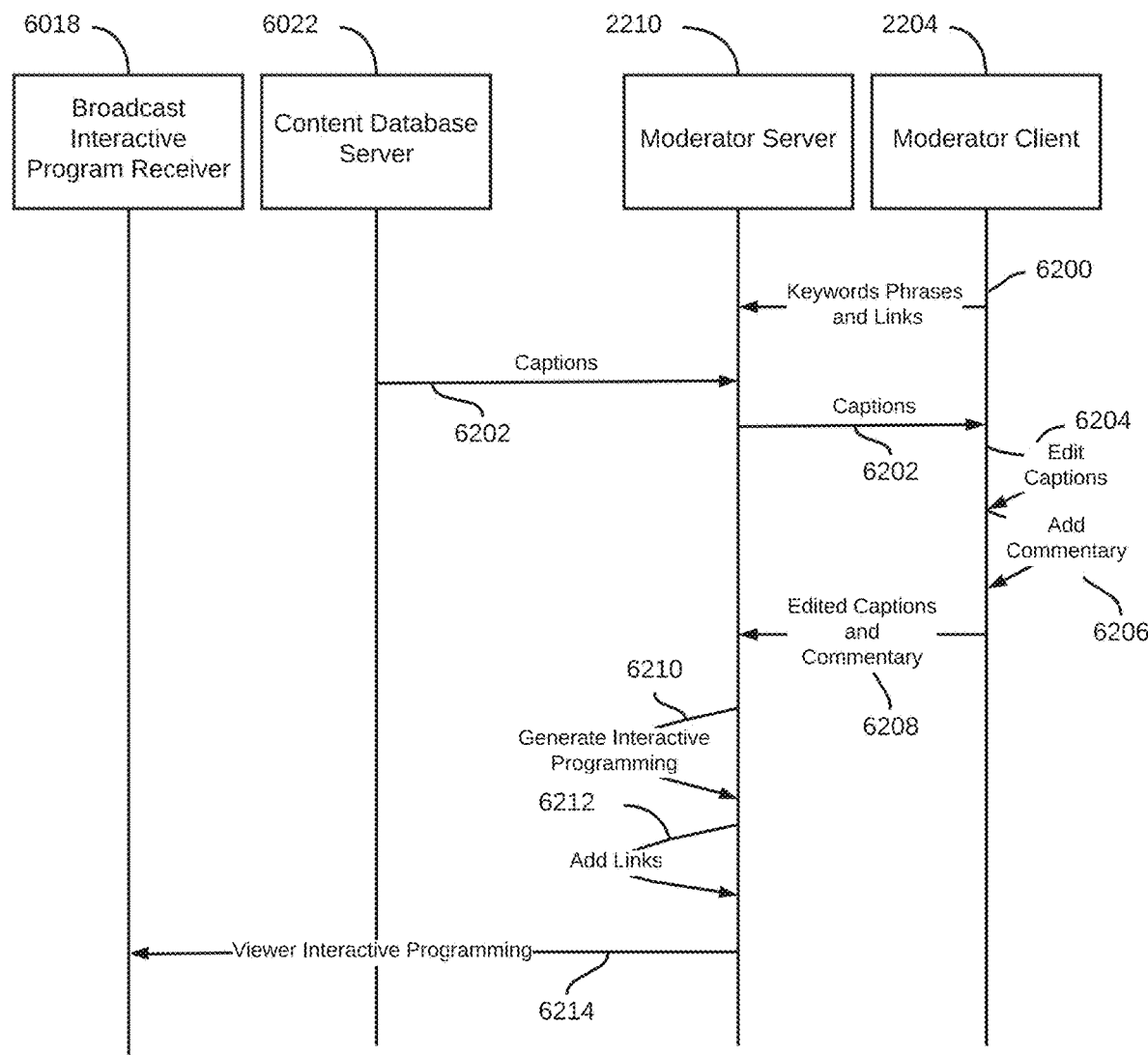
FIG. 62 is a sequence diagram of a key word or phrase to link conversion system in accordance with an exemplary embodiment of the present invention.

FIG. 62 is a sequence diagram of an interactive programming generation process wherein the interactive programming includes links to other resources in accordance with an exemplary embodiment of the present invention. Links may be added to an interactive program for use by a viewer for a variety of purposes. A link may provide access to a tCommerce site where viewers use their televisions and set-top boxes to browse products for sale. Another use of a link is to provide additional information for a viewer while watching an interactive program. For example, if the interactive program has a talkshow format, the links may be used to direct a viewer to a Web site where additional information about a talkshow topic is located.

As another example, a link may provide access to other related interactive programming. A moderator uses a moderator client 2204 to transmit key words or phrases associated to links 6200 to the moderator server. The key words or phrases will be used to search the captions by the moderator server. When a key word or phrase is found, the moderator server generates a link for inclusion in a VBI. The moderator server receives captions 6202 from a content database server 6022 and retransmits the captions to the moderator client. The moderator edits (6204) the captions and adds (6206) commentary to the captions. The edited captions and commentary 6208 are transmitted by the moderator client to the moderator server. The moderator server generates 6210 an interactive program from the edited captions and moderator commentary. The moderator server then adds 6212 links to the interactive programming 6214 using the key words or phrases and associated links before the interactive programming is transmitted to a viewer's broadcast interactive program receiver 6018.

Figure 63:
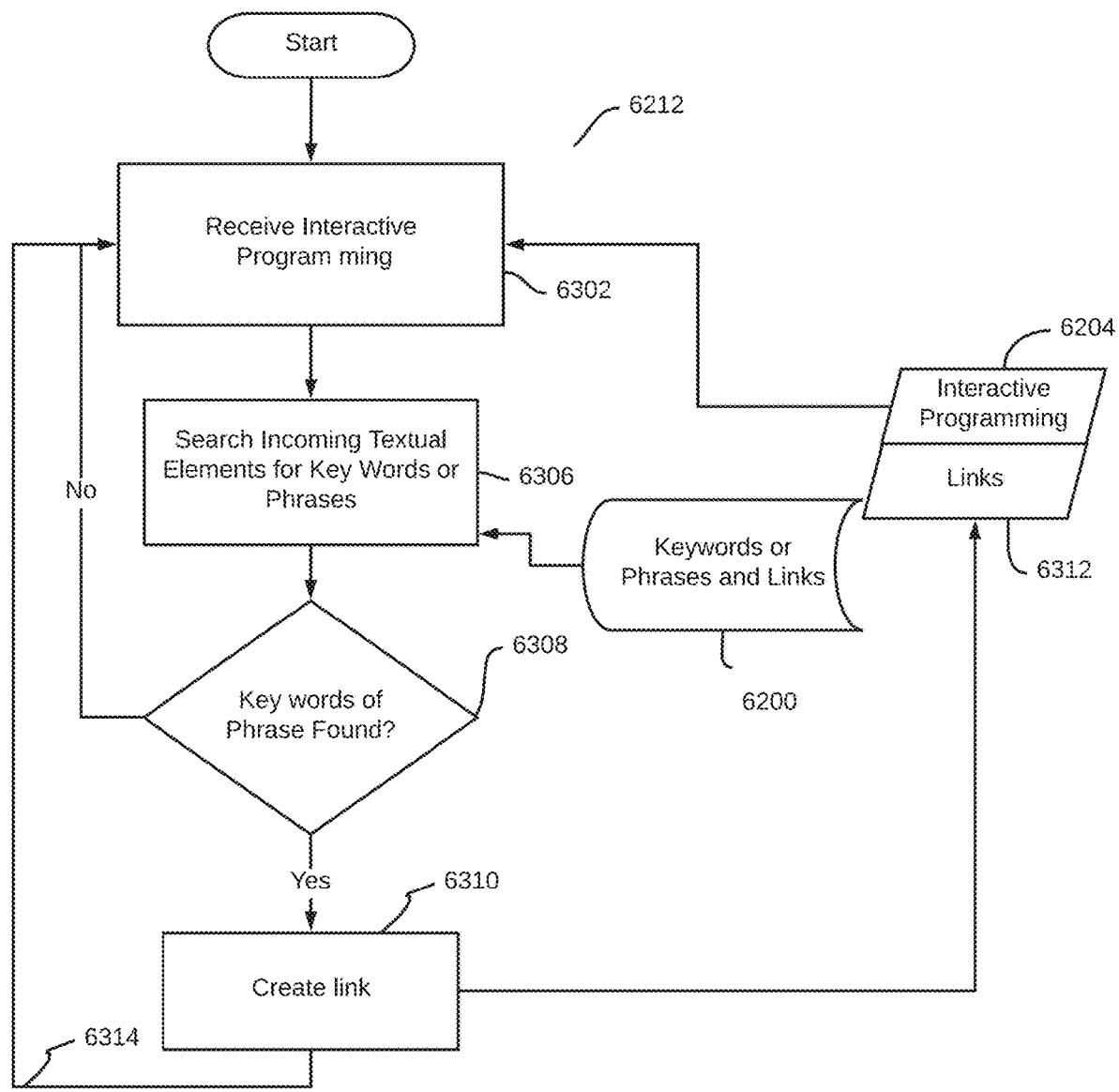
FIG. 63 is a process flow diagram of a key word or phrase to link conversion process in accordance with an exemplary embodiment of the present invention.

FIG. 63 is a process flow diagram of a dynamic link creation process in accordance with an exemplary embodiment of the present invention. Links are added to an interactive program dynamically without direct intervention or editing by the moderator. The moderator supplies key words or phrases that are associated with links as the contextual framework associating textual information in the interactive program with other resources. A dynamic link creation process 6212 receives (6302) input interactive programming 6204 including textual components. The dynamic link creation process searches (6306) the textual elements of the interactive programming for key words or phrases 6200 supplied by a commentator. If a key word or phrase is found (6308), the dynamic link creation process creates (6310) a link and adds the link (6312) to the interactive programming for transmission to a viewer. The dynamic link creation process continues processing (6314) new interactive programming as the interactive programming is created.

Figure 47:
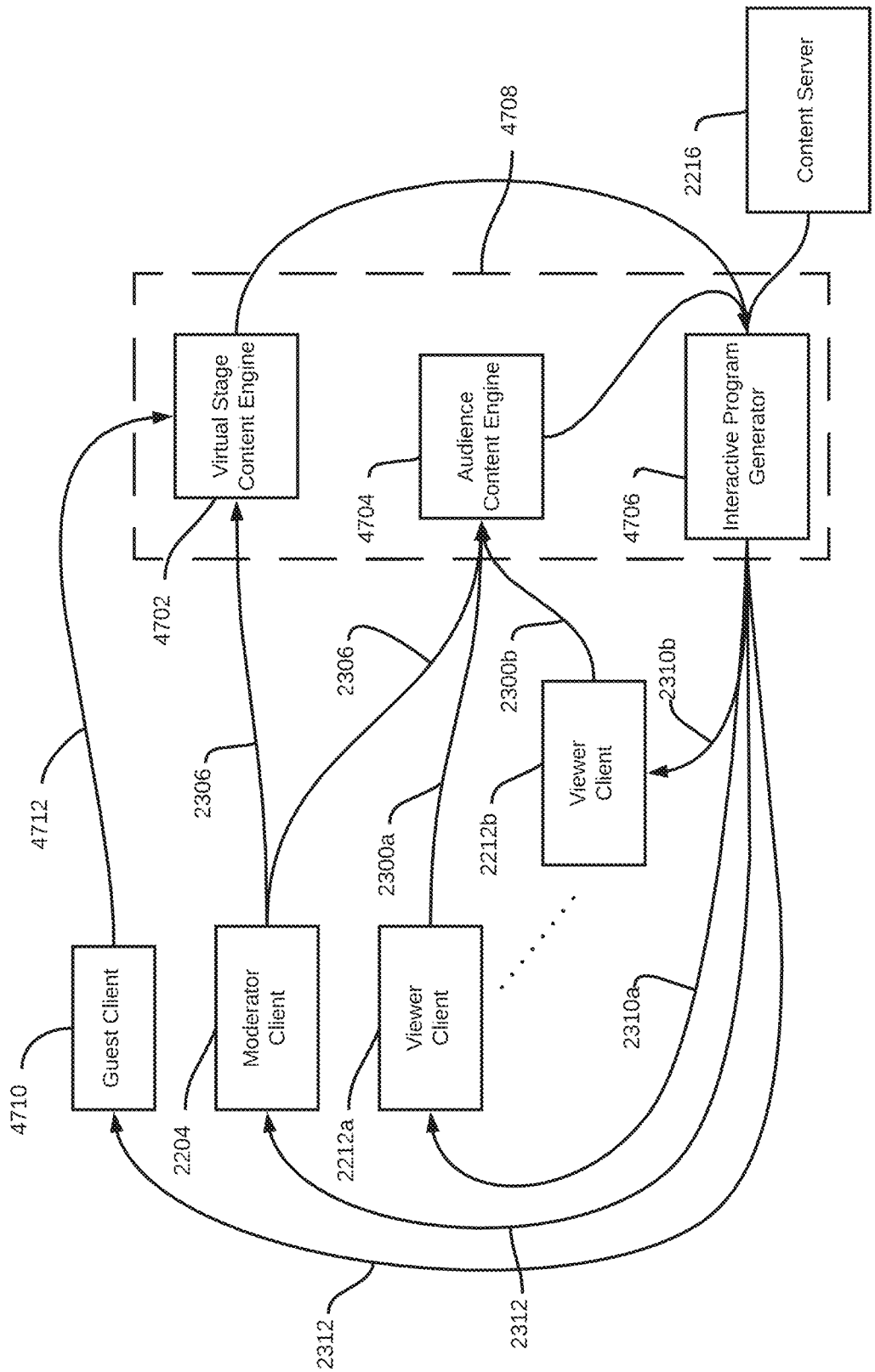
FIG. 47 is a collaboration diagram depicting an interactive programming generation process in accordance with an exemplary embodiment of the present invention.

FIG. 47 is a collaboration diagram depicting an interactive programming generation process in accordance with an exemplary embodiment of the present invention. A moderator server 2210 includes a virtual stage content engine 4702 and an audience content engine 4704. These content engines generate content, such as the content for a chat room, and transmit the content to an interactive program generator 4706 included in the moderator server. The virtual stage content engine receives previously described moderator comments and edited participant comments 2306 from the previously described moderator client. The virtual stage content engine uses the moderator's comments and edited participant comments to generate moderator content for a to-be-described stage section or area in an interactive program. The audience content engine receives previously described participant comments, 2300 *a* and 2300 *b*, from the previously described viewer clients, 2212 *a* and 2212 *b*, edited participant comments and moderator comments 2306 from the moderator client, and uses the participant comments, edited participant comments, and moderator comments to generate audience content for a to-be-described audience section or area in an interactive program.

The interactive program generator receives the moderator content and the audience content and uses the content to generate enhanced interactive programming. The interactive programming includes viewer interactive programming 2310 *a* and 2310 *b* that is transmitted to the viewer clients for display and use of the viewers. The interactive programming further includes moderator interactive programming 2312 transmitted to the moderator for viewing and use by the moderator. The cycle of receiving participant, moderator and edited participant comments and using the comments to generate interactive programming for transmission to the moderator and viewer is repeated indefinitely to create a continuous interactive program.

In an interactive program creation system in accordance with an exemplary embodiment of the present invention, content 4708 from a previously described content server 2216 is received by the interactive program generator and the content is included in the generated interactive programming. In an interactive program creation system in accordance with another exemplary embodiment of the present invention, a virtual guest client 4710 transmits virtual guest comments 4712 to the virtual stage content engine for inclusion in the virtual stage content generated by the virtual content engine.

In an interactive program creation system in accordance with another exemplary embodiment of the present invention, the moderator, participant, and guest interactive messages are chat messages and the virtual stage and audience content engines are chat engines. The text-based output from the chat engines is used by the interactive program generator generate interactive programming including electronic documents, such as transcripts, composed in a document markup language such as HTML or XML.

Figure 50:
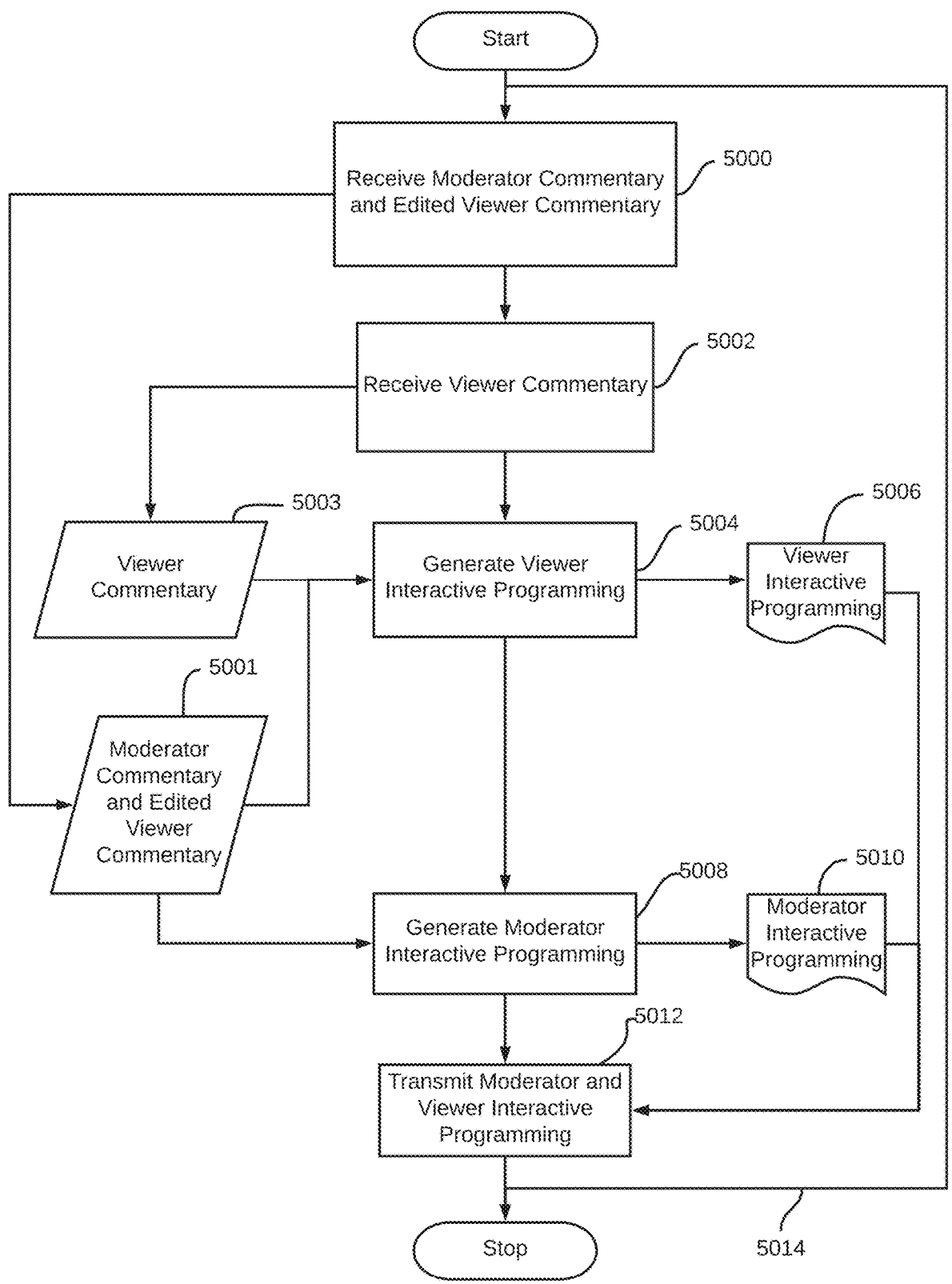
FIG. 50 is a process flow diagram of an interactive program generation process in accordance with an exemplary embodiment of the present invention.

FIG. 50 is a process flow diagram of an interactive program generation process in accordance with an exemplary embodiment of the present invention. A moderator server receives (5000) moderator commentary and edited viewer commentary 5001 from a moderator. The moderator server receives (5002) viewer commentary 5003 from viewers in an audience. The moderator server uses the viewer commentary, the moderator commentary, and the edited viewer commentary to generate (5004) viewer interactive programming 5006 for transmission to viewers in the audience. The moderator server uses the moderator commentary and the edited viewer commentary to generate (5008) moderator interactive programming 5010 for transmission to the moderator. The moderator then transmits (5012) the moderator interactive programming to the moderator and the viewer interactive programming to the viewers in an audience. The process is repeated (5014) continuously to generate an interactive program.

In one embodiment of a moderator server in accordance with the present invention, the moderator server is operated in an application service provider (ASP) mode. In this mode, the moderator server is used to create a "private label" interactive program creation system. In this mode, the moderator server provides services that an operator can embed into another system such that a viewer perceives the interactive program creation system as owned by individual operators. In some instances an indica of source, such as a "powered by" notice, is included in the interactive program creation system.

The moderator's interface is broken up into several operational sections. A "stage interaction" section 2410 displays the moderator's direct interaction with a virtual guest on a virtual stage. The stage interaction section includes a plurality of fields for display of virtual guests' previous questions as exemplified by previous question field 2412. For each answered virtual guest question, a moderator response field, as exemplified by moderator response field 2414, displays the moderator's response to the virtual guest's previous question. The stage interaction section further includes a current question field 2416 for display of a virtual guest's current question. A moderator uses a moderator text entry section 2418 to enter responses to the current virtual guest question.

An audience interaction section 2420 displays audience comments. The audience interaction comments are comments made by participants to other participants in the audience.

A moderator uses a status section 2423 to monitor the progress of the interactive program. The moderator invites audience members to the virtual stage to be virtual guests using an "invite to stage" selector 2426. The moderator can select a viewer to invite onto the virtual stage by using a pull down menu of viewer names and selecting a viewer to invite. Once a viewer is invited to the virtual stage, the viewer's interactive messages are displayed in the stage interaction section and not in the audience interaction section. The moderator can also exclude a participant by selecting a participant from a "kick user out" pull down menu 2428. Once excluded, the moderator server removes the excluded participant's comment signals from the plurality of participant comment signals edited by the moderator and used by the moderator server to generate the interactive program. In this way, the moderator exercises direct control over the participants participating in the interactive program.

In another interactive program creation system, the participant's exchange video clips and files directly with each other in a peer-to-peer relationship. In this mode, the moderator server is not directly involved in the message exchanges occurring between audience members interacting with each other.

The status section further includes an audience approval system indicator 2430 for indicating to the moderator how the audience feels about the progress of the show. Viewer responses are aggregated in a to-be-described process and displayed to the moderator as a colored indicator and as a numerical value. A moderator uses the audience member counter field 2432 and pull down menu to determine the number and identification of the viewers receiving the transmitted interactive program. The status section further includes an elapsed time field 2433 for display of the elapsed time of the interactive program.

An audience question section 2434 displays an audience question 2436 that the moderator may answer by selecting an answer question button 2438 or delete by selecting a delete question button 2440. The moderator can get a new audience question by selecting the update button 2442.

A polls section 2444 includes a poll question display field 2446 for display of a current poll question and a poll results display field 2448 for display of viewers' responses to the poll. The moderator selects a new poll button 2450 to enter a new poll question whenever the moderator feels that a new poll should be created.

Figure 54:
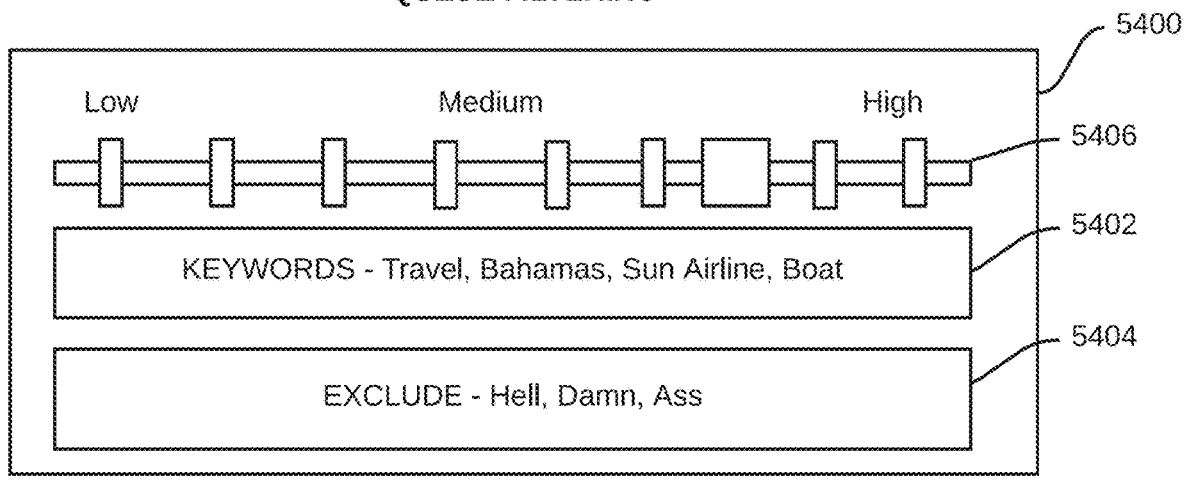
FIG. 54 is a participant question filtering moderator interface in accordance with an exemplary embodiment of the present invention.

FIG. 54 is a participant question filtering moderator interface in accordance with an exemplary embodiment of the present invention. A participant question filtering interface 5400 includes a keyword entry field 5402 for entry of keywords that the moderator would like to have included by viewers in questions sent to the moderator. Questions with the entered keywords will be given higher relevance, and thus priority, than questions without the keywords. The participant question filtering interface further includes an "exclude" entry field 5404 for words which the moderator does not want to see in questions, such as expletives or vulgarities. Any participant question having an excluded word will be deleted from a participant question queue managed by the moderator. The participant question filtering interface further includes a facility for setting a relevance threshold 5406. A moderator uses the relevance threshold setting facility to establish a threshold relevance value that a question should have before the question will be added to the question queue.

Figure 55:
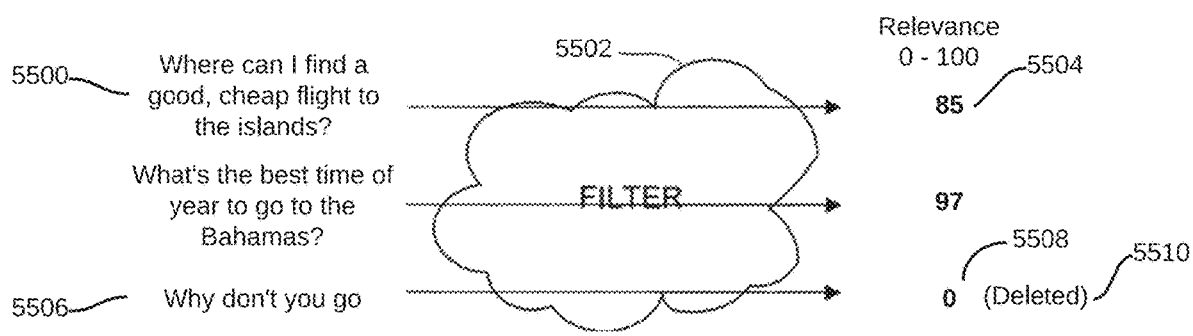
FIG. 55 is an illustration of the operation of a participant question filtering facility in accordance with an exemplary embodiment of the present invention.

FIG. 55 is an illustration of the operation of a participant question filtering facility in accordance with an exemplary embodiment of the present invention. A participant question 5500 is processed in a participant question filter 5502 and assigned a relevance value 5504. A moderator uses the relevance value to determine which participant questions the moderator would like to answer. If a participant question 5506 has an excluded word, then the relevance of the participant question is assigned a value 5508 of 0 and deleted 5510 from a participant question queue. In one embodiment of a participant question filter in accordance with the present invention, the participant question is deleted if the participant question's relevance value does not exceed the threshold relevance value set by the moderator. A moderator uses the participant question filtering facility in order to process large numbers of participant questions without becoming overwhelmed and to filter out offensive participant questions. This allows the moderator to automatically moderate an interactive program having a large number of participants, thus facilitating scalability from few participants to many participants.

Figure 56:
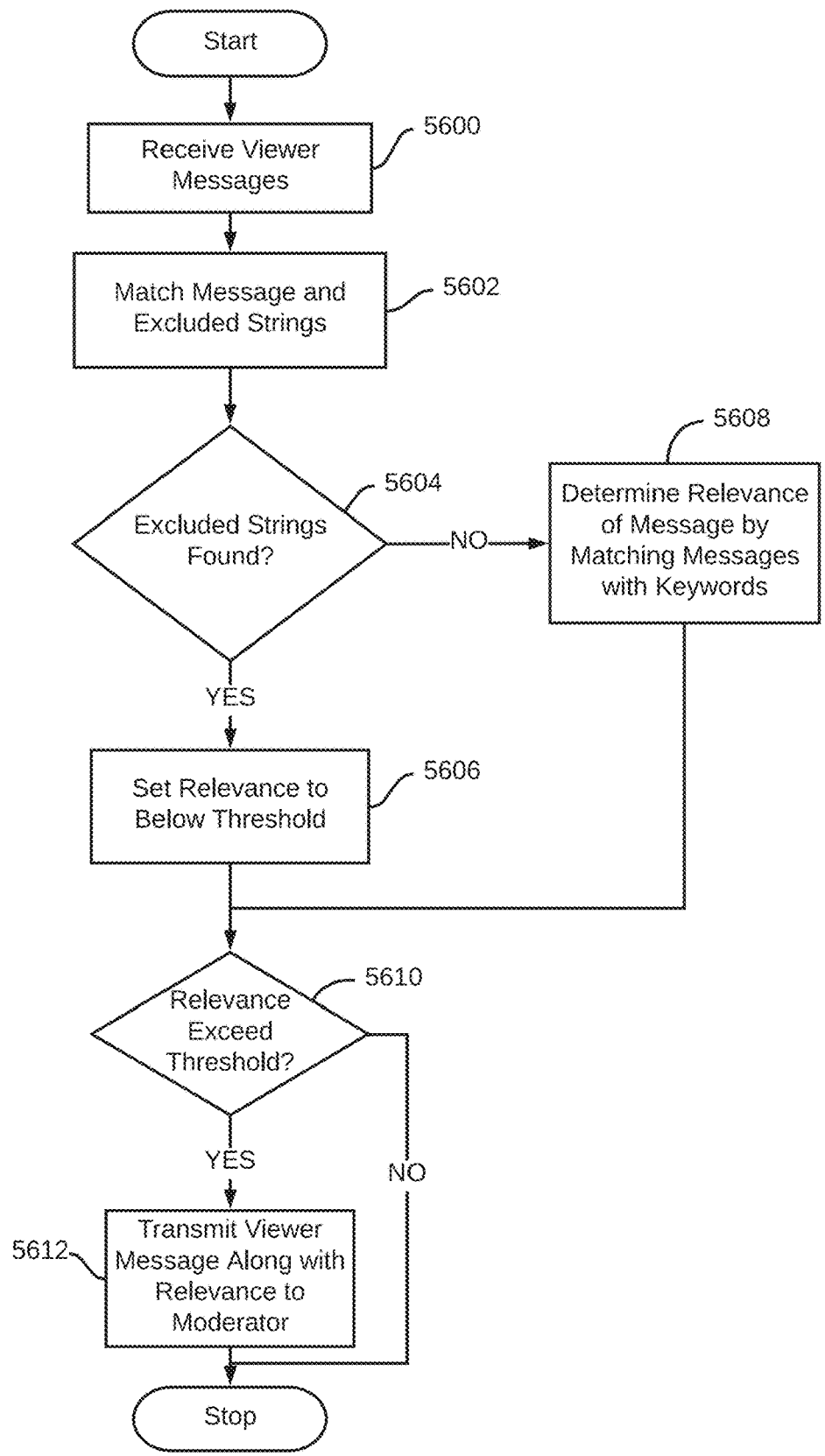
FIG. 56 is a process flow diagram of a participant question filter process in accordance with an embodiment of the present invention.

FIG. 56 is a process flow diagram of a participant question filter process in accordance with an embodiment of the present invention. The filter process receives (5600) a participant question 5601. The filter process attempts to match (5602) words in the participant question with the moderator's excluded words 5603. If it is determined (5604) that an excluded word is in the question, the relevance of the participant question is set (5606) to a value below the moderator's previously described threshold relevance value 5607.

If no excluded words are found in the participant question, the filter process determines (5608) the relevance of the participant question by matching the moderator's keywords 5609 to the words in the participant question. If it is determined (5610) that the relevance of the participant question exceeds the threshold relevance value, then the participant question is added (5612) to a participant question queue 5614.

In an embodiment of a filtering process in accordance with the present invention, keywords and excluded words are matched to the participant question using approximate string matching techniques in order to determine the relevance value of a participant question including misspelled keywords or excluded words.

Figure 25:
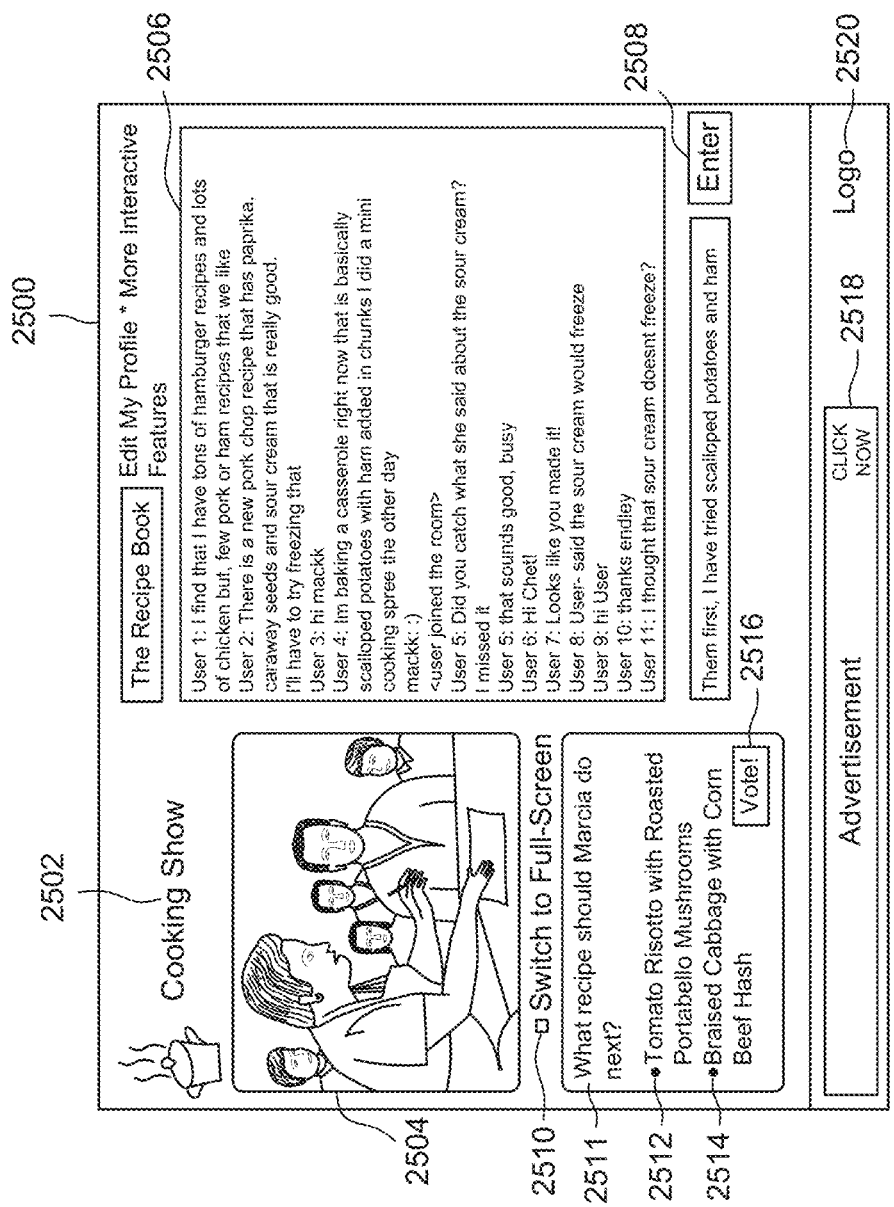
FIG. 25 is a screen capture of a viewer's interface used to view and interact with an interactive program in accordance with an exemplary embodiment of the present invention.

FIG. 25 is a screen capture of a viewer interface used to view and interact with an interactive program in accordance with an exemplary embodiment of the present invention. The viewer interface 2500 includes an interactive program identifier field 2502 for display of the name of the interactive program being viewed by the viewer. A content display section 2504 is included for display of a content portion of the interactive program. The content of an interactive program may be text-based, audio-based, or video-based in any combination dependent on the capabilities and desires of the moderator. An audience interactive message section 2506 is included for display of audience interactive messages that the audience is exchanging amongst themselves. An interactive message entry field 2508 is used by the viewer to enter interactive messages for display in the audience interactive message section and to interact with the moderator when the moderator invites the viewer onto the virtual stage.

A poll section 2510 displays a poll question 2511 asked by the moderator of the viewers. The poll section includes a plurality of response buttons, exemplified by response buttons 2512 and 2514, selectable by the viewer to indicate the viewer's response to the poll. The viewer selects an answer to the poll question by selecting one of the response buttons and then selects the "Vote!" button 2516 to register the viewer's poll answer with the moderator server. The viewer interface further includes sections for banner advertising 2518 and for placement of a trademark or service mark 2520 to identify the operator of the moderator server. By allowing banner adds, the moderator server allows a moderator to collect revenue from t-commerce interactions with the moderator's hosted interactive program.

In another embodiment of an interactive program creation system in accordance with the present invention, a poll is created using a plurality of participant questions for selection by participants. The participant question from the plurality of participant questions receiving the most participant selections is selected for submission to the moderator.

Figure 24:
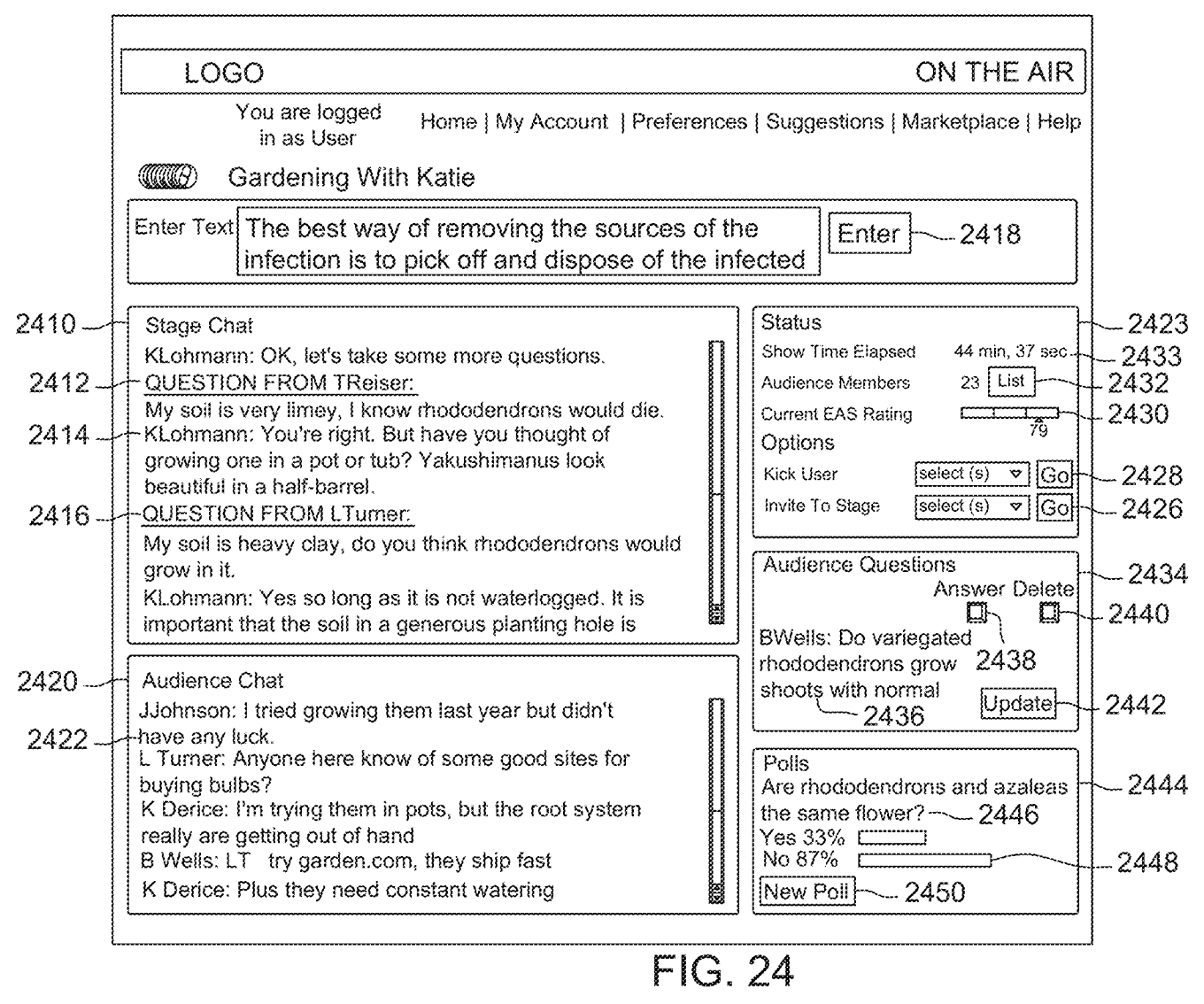
Figure 26:
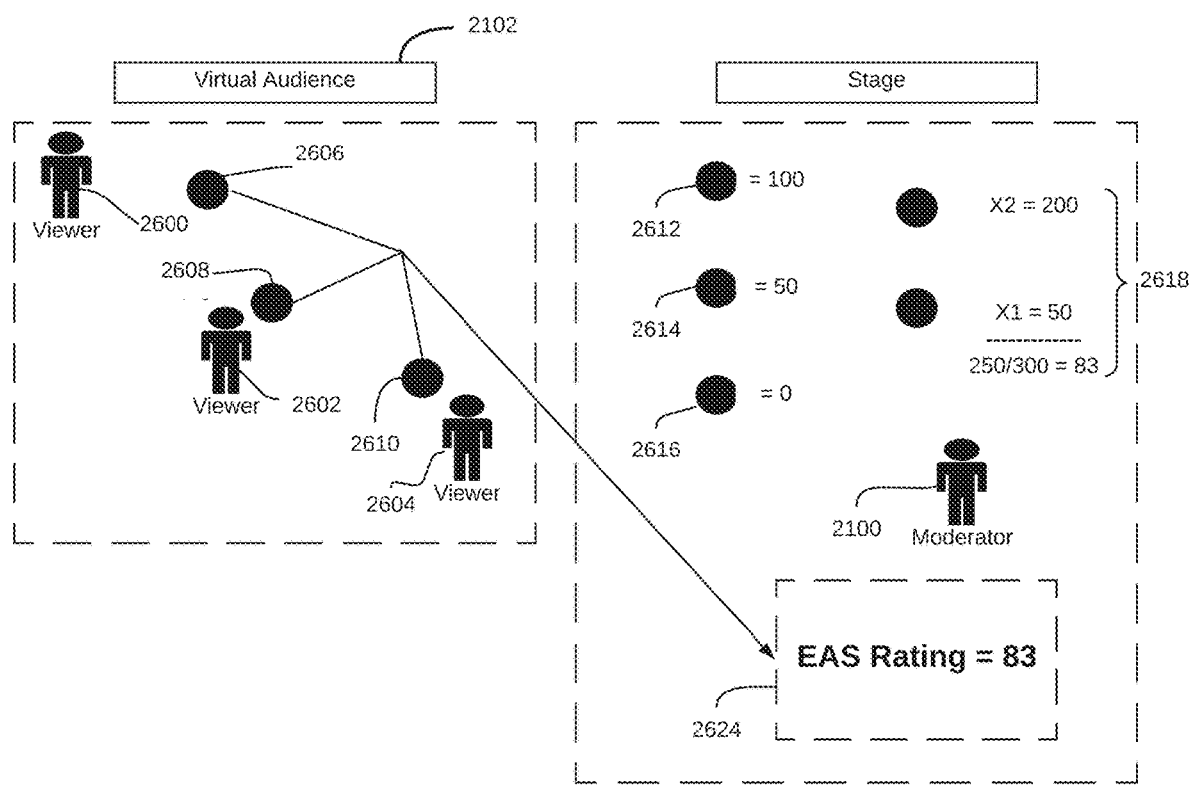
FIG. 26 is a diagram depicting a process for receiving viewer reactions to an interactive program and calculating an audience approval system rating for the interactive program in accordance with an exemplary embodiment of the present invention.

Referring again to FIG. 24, a current audience approval system rating field 2430 is provided for the display of viewers' rating of an interactive program. Referring now to FIG. 26, a diagram depicting a process for receiving viewer reactions to the interactive program and calculating an audience approval system rating for an interactive program in accordance with an exemplary embodiment of the present invention is shown. A moderator 2100 generates an interactive program and transmits the interactive program to an audience 2102 as previously described. The audience includes a plurality of viewers, as exemplified by viewers 2600, 2602 and 2604. Each viewer may have a different opinion of the quality of the interactive program; therefore, each viewer is provided with an individual audience approval system button as exemplified by audience approval system buttons 2606, 2608, and 2610. Each viewer selects an audience approval system rating button corresponding to the viewer's subjective rating of the interactive program. The selection of an audience approval system button transmits a corresponding audience approval system signal to the moderator server (not shown) thus creating a plurality of audience approval system signals for evaluation by the moderator server. The moderator server receives the plurality of audience approval system signals and uses them to generate a single audience approval system rating signal and transmits the audience approval system rating signal for display on the moderator's interface (not shown).

In an audience approval system in accordance with an exemplary embodiment of the present invention, an audience approval system signal can take on three states, 2612, 2614, and 2616, with each state representing a viewer's subjective opinion of the interactive program. In this embodiment, the three states are mapped to the corresponding numeric values of "100", "50", and "0", with "100" representing a viewer's complete satisfaction with the interactive program, "50" representing the viewer's partial satisfaction with the interactive program, and "0" representing the viewer's complete dissatisfaction with the interactive program. Each of the plurality of audience approval system signals are mapped to one of these numeric values. These numeric values are used to generate an arithmetic mean representing the audience approval system rating of the interactive program. In the illustrated example of FIG. 26, viewer 2600 rates the interactive program at "100", viewer 2602 rates the interactive program at "50", and viewer 2604 rates the interactive program at "100". These values are used by the moderator server to generate (2618) an arithmetic mean 2624 of the plurality of mapped viewers' audience approval system signals. The arithmetic mean is presented to the moderator as the audience approval system rating of the moderator's interactive program. In one audience approval system in accordance with an exemplary embodiment of the present invention, the audience approval system rating is mapped to a color, with the numeric value of "100" being represented in green, the numeric value of "50" being represented in yellow, and the numeric value of "0" being represented in red.

Figure 27:
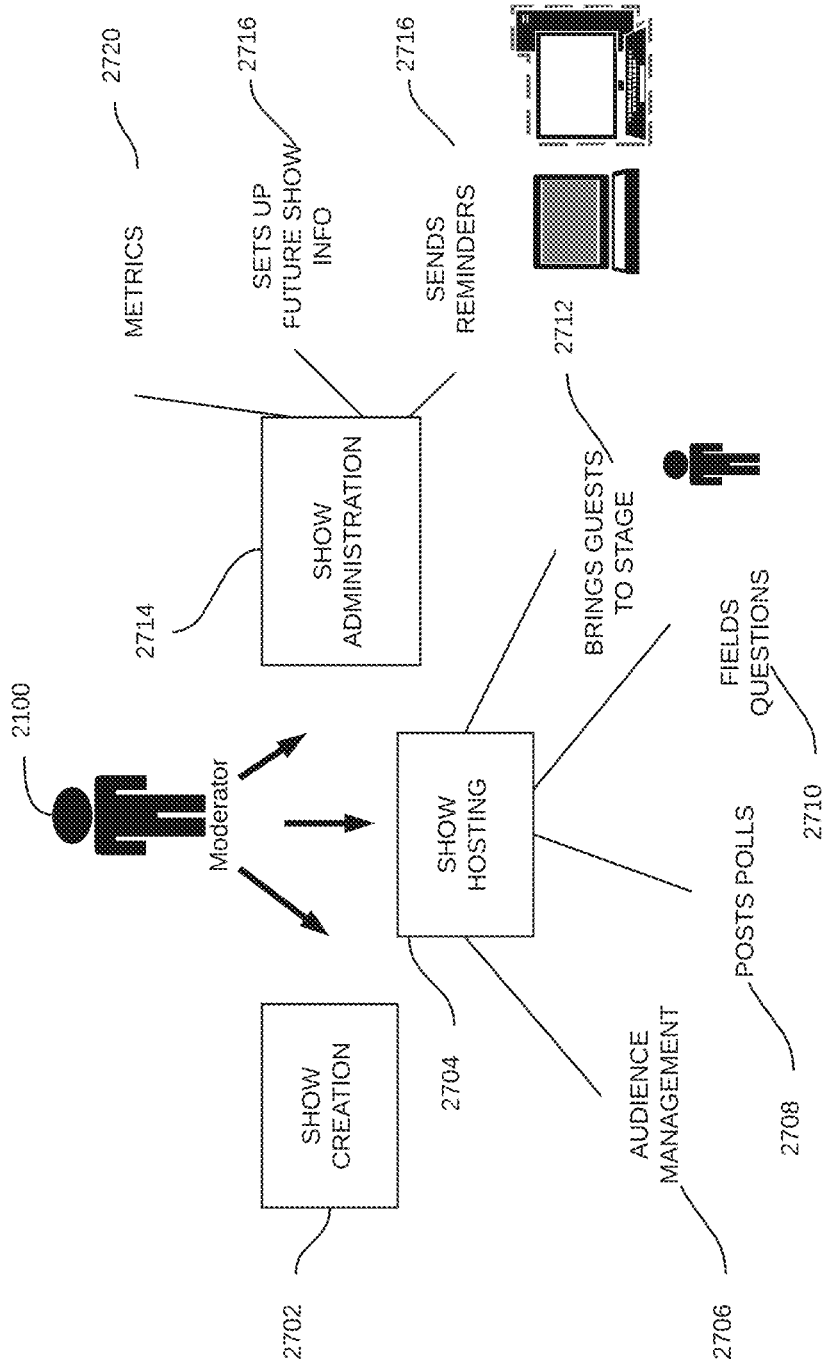
FIG. 27 is a diagram depicting the ways in which a moderator may interact with a system for creating an interactive program in accordance with an exemplary embodiment of the present invention.

FIG. 27 is a use case diagram depicting ways in which a moderator may interact with a system for creating an interactive program incorporating viewer interactions in accordance with an exemplary embodiment of the present invention. A moderator 2100 accesses the system in order to create (2702) an interactive program. In one system for creating an interactive program incorporating viewer interactions in accordance with an exemplary embodiment of the present invention, the moderator creates a talkshow that is a periodically broadcast interactive program. Creation of an interactive program may include selecting a theme for the talk show, establishing a broadcast time, and creating a brief description of the talk show. This interactive program information is stored in a moderator database 2230 (FIG. 22). The moderator database is used by a moderator server 2210 (FIG. 22) to generate a to-be-described programming guide.

The moderator also accesses the interactive program creation system to host (2704) an interactive program. While the moderator is hosting an interactive program, the system provides facilities 2706 for audience management allowing the moderator to restrict access to an interactive program. As previously described, the system provides facilities for the moderator to block interactive messages from viewers in the audience. The system also provides a facility 2708 for posting polls during the interactive program. This allows a moderator to pose questions to the audience in order to receive and aggregate viewers' opinions about various subjects during an interactive program as previously described. The system further includes facilities 2710 for answering questions presented by viewers to the moderator. As previously described, a moderator can receive questions from viewers and determine whether or not to answer them. Additionally, the system provides an invitation facility 2712 for inviting viewers to participate in the interactive program as a virtual guest as previously described.

The moderator may also access the interactive program creation system to perform (2714) administrative tasks associated with moderating a periodically presented interactive program. The interactive program creation system provides facilities 2716 for sending scheduling reminders to viewers about upcoming interactive programs. Such scheduling reminders may be transmitted to a viewer by email, to a viewer's personal pager, to a viewer's wireless phone, or to a viewer's personal digital assistant. The interactive program creation system also includes facilities 2720 for a moderator to review metrics collected by the system on a moderator's interactive program.

Figure 28:
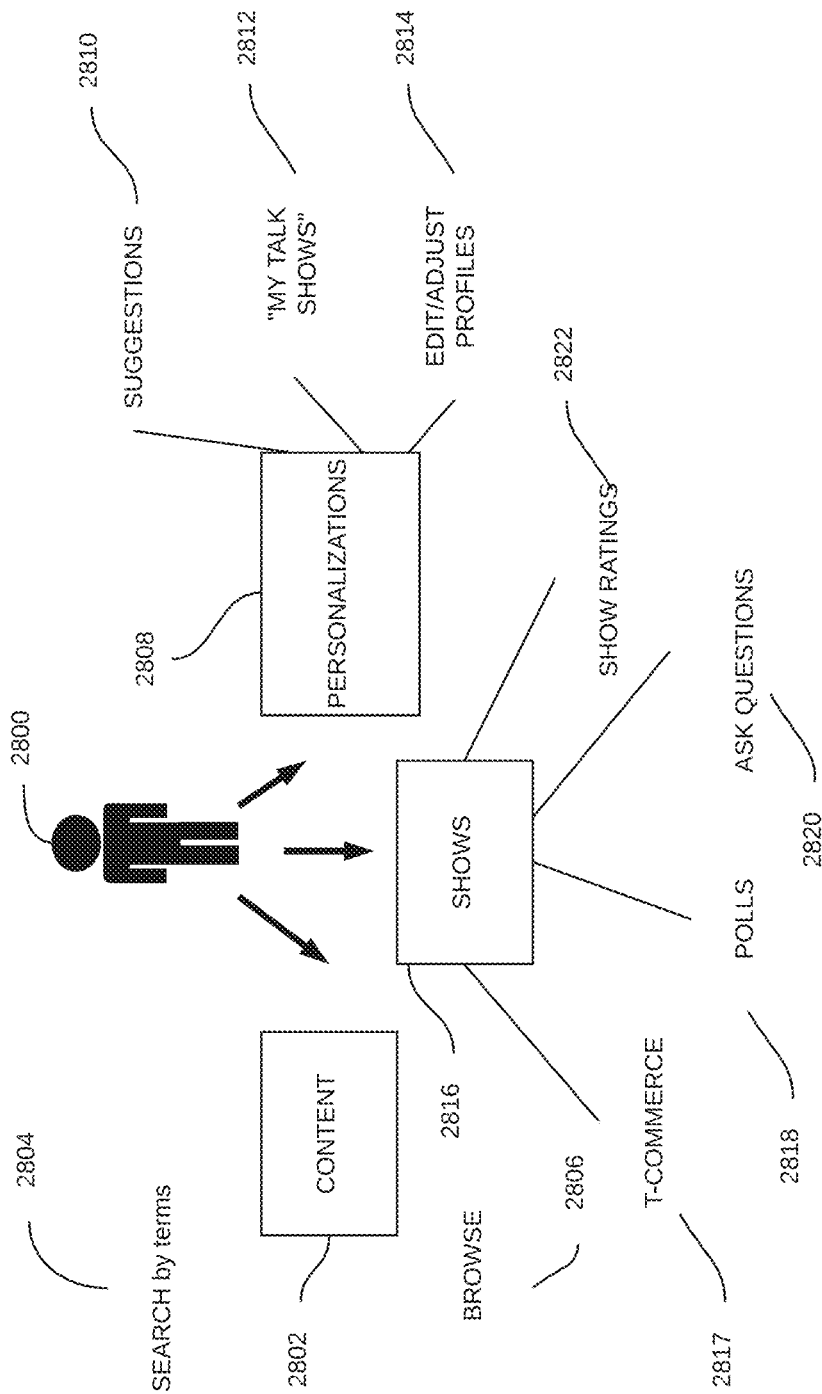
FIG. 28 is a use case diagram depicting ways in which a viewer may interact with a system for creating an interactive program in accordance with an exemplary embodiment of the present invention.

FIG. 28 is a use case diagram depicting ways in which a viewer may interact with a system for creating an interactive program incorporating viewer interactions in accordance with an exemplary embodiment of the present invention. A user accesses the interactive program creation system in order to search for (2802) interactive programs. The interactive program creation system includes facilities 2804 for searching the interactive program creation system for interactive programs on particular topics that the viewer may be interested in. The interactive program creation system also includes browsing facilities 2806 allowing the viewer to examine an interactive program creation system directory of interactive programs in a hierarchal manner.

The viewer may also access the interactive program creation system to view 2816 and become part of an interactive program. The interactive program creation system includes facilities 2817 allowing a viewer to interact with embedded advertising. The interactive program creation system also includes facilities 2818 allowing a moderator to poll viewers during an interactive program as previously described. The interactive program creation system also includes facilities 2820 allowing a viewer to ask questions of the moderator and virtual guests as previously described. The interactive program creation system also includes facilities 2822 allowing a viewer to rate an interactive program as previously described.

The viewer may also access the interactive program creation system to personalize (2808) the viewer's experience with the interactive program creation system. The interactive program creation system includes facilities 2810 for submitting suggestions by the interactive program creation system of interactive programs the viewer may be interested in based on viewer preferences as included in a viewer profile and previously viewed interactive programs. The interactive program creation system further includes facilities 2812 for creation of a list of favorite interactive programs used by moderators to send scheduling reminders to the viewer about upcoming interactive programs as previously described. The interactive program creation system also includes facilities 2814 allowing a viewer to create and edit a viewer profile including topics of interest to the viewer. In one embodiment of an interactive program creation system in accordance with the present invention, viewer profiles are stored in data files on the viewer client. In another embodiment of an interactive program creation system in accordance with the present invention, viewer profiles are stored on a central server and downloaded as XML documents to the viewer client as needed.

Figure 29:
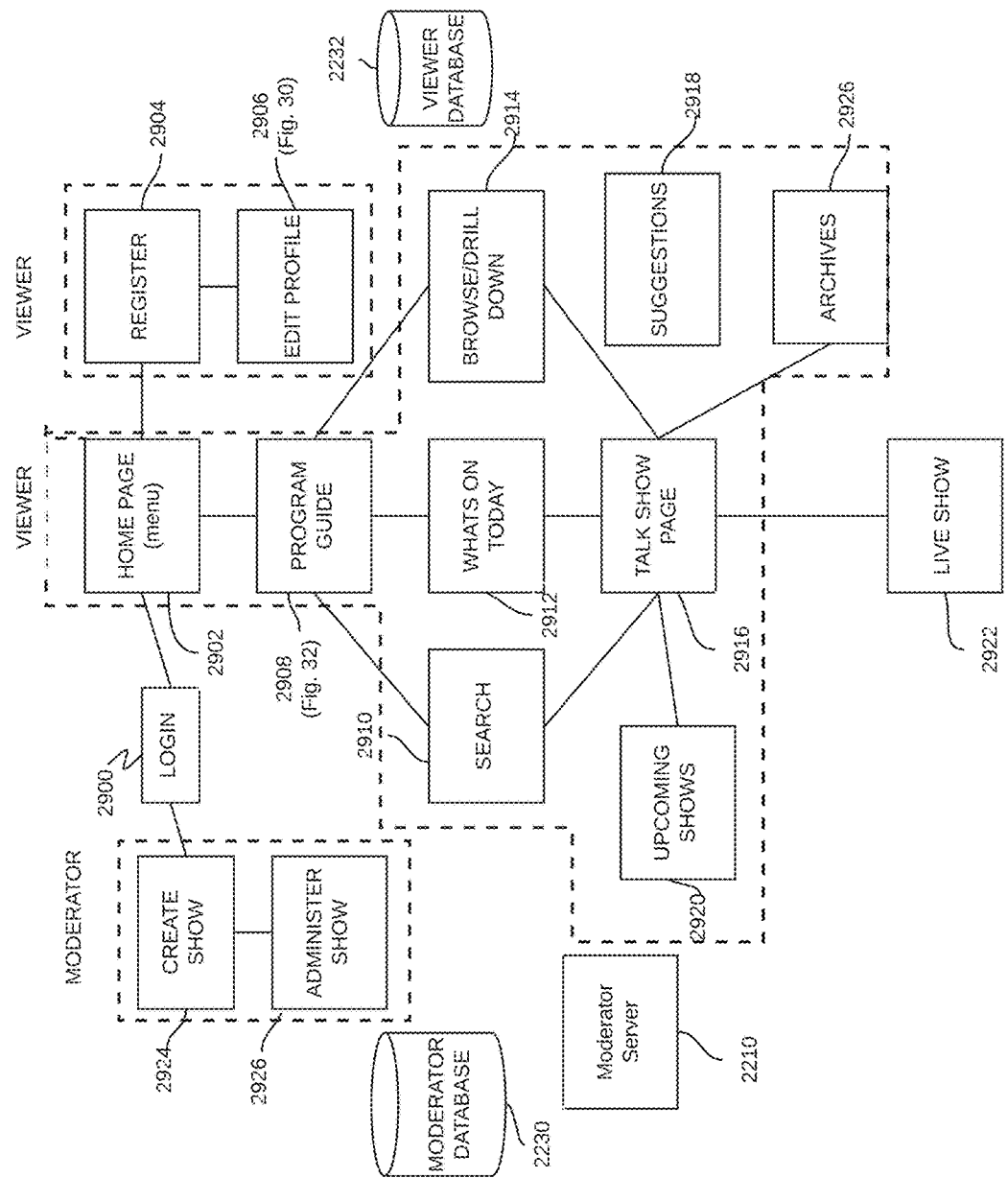
FIG. 29 is a Web site diagram of an interactive program creation system in accordance with an exemplary embodiment of the present invention.

FIG. 29 is a Web site diagram of an interactive program creation system in accordance with an exemplary embodiment of the present invention. As previously described, in one interactive program creation system in accordance with an exemplary embodiment of the present invention, a moderator server hosts a Web site for accessing interactive programs by both moderators and viewers. A user, such as a moderator or viewer, accesses the Web site via a log-in page 2900.

Figure 49:
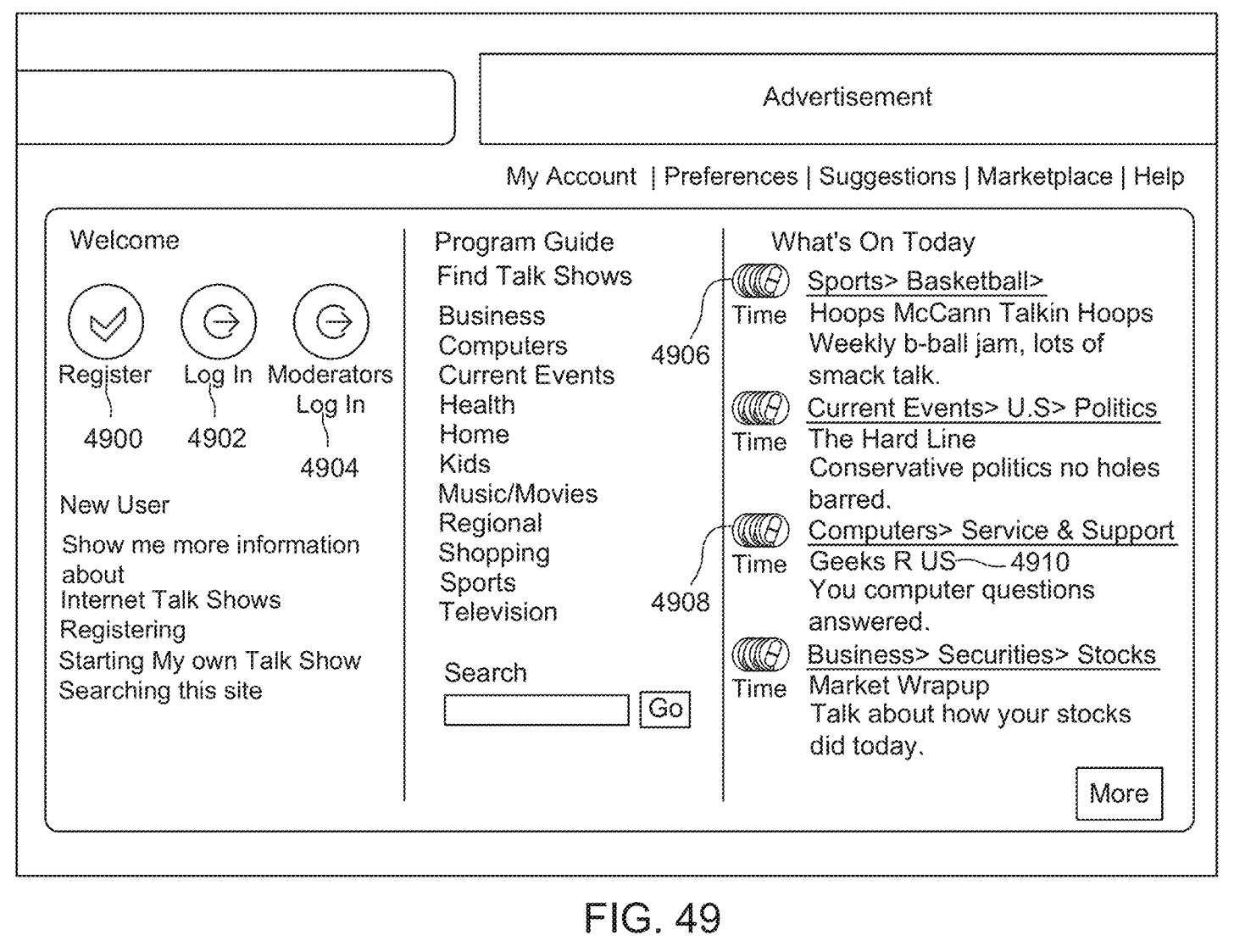

FIG. 49 is a screen capture of an interactive program creation system log-in interface in accordance with an exemplary embodiment of the present invention. A user selects a register button 4900 to register as either a viewer or a moderator. If the user is registering as a viewer, the user obtains a viewer identifier and a viewer password. If the user is registering as a moderator, the user obtains a moderator identifier and a moderator password. The identifiers and passwords are used by the user to access the interactive program creation system on future visits and can be stored in "cookies" on the client the user is using to access the interactive program creation system.

A user selects a log-in button 4902 to access the interactive program creation system as a viewer or selects a moderator log-in button 4904 to access the interactive program creation system as a moderator. The interactive program creation system log-in interface further includes an upcoming program guide section 4906 for display of interactive programs that are scheduled to be produced by their moderators in the next 24 hours. The listings in the upcoming program guide section include a previously described "mic" viewer rating 4908 and a category link 4910 to a viewer interface where a viewer can find more interactive programs similar to the listed interactive program.

Referring again to FIG. 29, if the user logs in as a viewer, the viewer is directed to a viewer home page 2902. From the viewer home page, the viewer may access a registration process 2904. Once registered, the viewer can access an edit profile process 2906.

FIG. 30 is a screen capture of an edit profile viewer interface in accordance with an exemplary embodiment of the present invention. The edit profile viewer interface is used by a viewer to edit the viewer's personal information stored in the viewer's profile. The edit profile viewer interface includes a viewer identification field 3000 for display of the viewer's identification and a password entry field for entry of the viewer's password. In operation, a user enters a new password into the password entry field and selects a "Submit and Continue" button 3003 to change the viewer's password. The viewer's identification and password are associated together in the user database 2232 (FIG. 29) for use by the viewer as the viewer accesses different facilities of the interactive program creation system.

The edit profile viewer interface further includes personal information entry fields, such as a first name entry field 3004 and a last name entry field 3006. Alternatively, the viewer may enter an anonymous viewer name rather than the viewer's real name in order to hide the viewer's identity. In operation, a viewer enters their personal information and selects the "Submit and Continue" button to store the viewer's personal information in the viewer's database. The personal information is used by the interactive program creation system to personalize the viewer's experience while using the interactive program creation system.

The edit profile viewer interface further includes a viewer profile entry field 3008. In operation, the viewer enters the viewer's interests into the viewer profile entry field. The entered viewer profile is stored in the viewer database for use by the interactive program creation system to make suggestions of interactive programs that the viewer may want to participate in. To make suggestions, the viewer profile is queried and key terms are identified. For example, the illustrated viewer profile 3010 includes the key terms "sports", "movies", and "music". The interactive program creation system compares these key terms to key terms included in the moderator database 2230 (FIG. 29) by moderators who have created interactive program profiles. If a match is found, the interactive program creation system suggests the matching interactive program to the viewer.

In an embodiment of an interactive program creation system in accordance with the present invention, interactive programs are suggested to the viewer in a "pay-for-placement" mode. For example, if a plurality of interactive programs match the viewer's profile, the first interactive program suggested to the viewer is the interactive program whose moderator has paid the interactive program creation system's operator the most for being placed first.

The edit profile viewer interface further includes a viewer email address entry field 3012, viewer city 3016, viewer state 3018, viewer zipcode 3020, and viewer country 3022 entry fields. In operation, the viewer enters their email and address location and selects the "Submit and Continue" button to store the viewer address information in the viewer database. Moderators using the interactive program creation system can use the viewer address information to notify a viewer when the moderator's interactive program is to be broadcast. Additionally, the viewer may optionally select an "Include in Directory" button 3022 in order to exclude the viewer's address information from view by the moderators.

The edit profile viewer interface further includes an interactive program search entry field 3024. A viewer uses the search entry field to enter a search term used to search the moderator database for interactive programs with terms matching the search term. The edit profile viewer interface further includes a category or hub selection field 3026. A viewer may select an individual category, such as "News" 3027 to be taken to a hub process for accessing interactive programs related to the selected category.

The edit profile viewer interface further includes an advertising section for display of "click-through" style banner ads. A user selects one of the banner ads to be transferred to an advertiser's or retailer's Web site. The edit profile viewer interface further includes a feature section 3030 for display of links to featured hubs. By selecting a featured hub link, a viewer can quickly access a hub process for accessing interactive programs related to the selected feature category.

FIG. 31 is a screen capture of a hub viewer interface in accordance with an exemplary embodiment of the present invention. The screen capture is of an exemplary "News" 3100 hub. Other hubs may be created for other subjects such as "home improvement" and the like. The hub includes links for accessing by the viewer, interactive programs whose themes are national news 3102, world news 3104, business news 3106, sports news 3108, weather news 3110, and entertainment news 3112. In operation, a viewer selects one of the links to access a specialized program guide including links to interactive programs with a theme corresponding to the link title.

Referring again to FIG. 39, a viewer may access an interactive program electronic program guide process 3908. A viewer uses the program guide process to add upcoming interactive programs to a viewer's interactive program list that is stored in the viewer database 2232.

Figure 32:
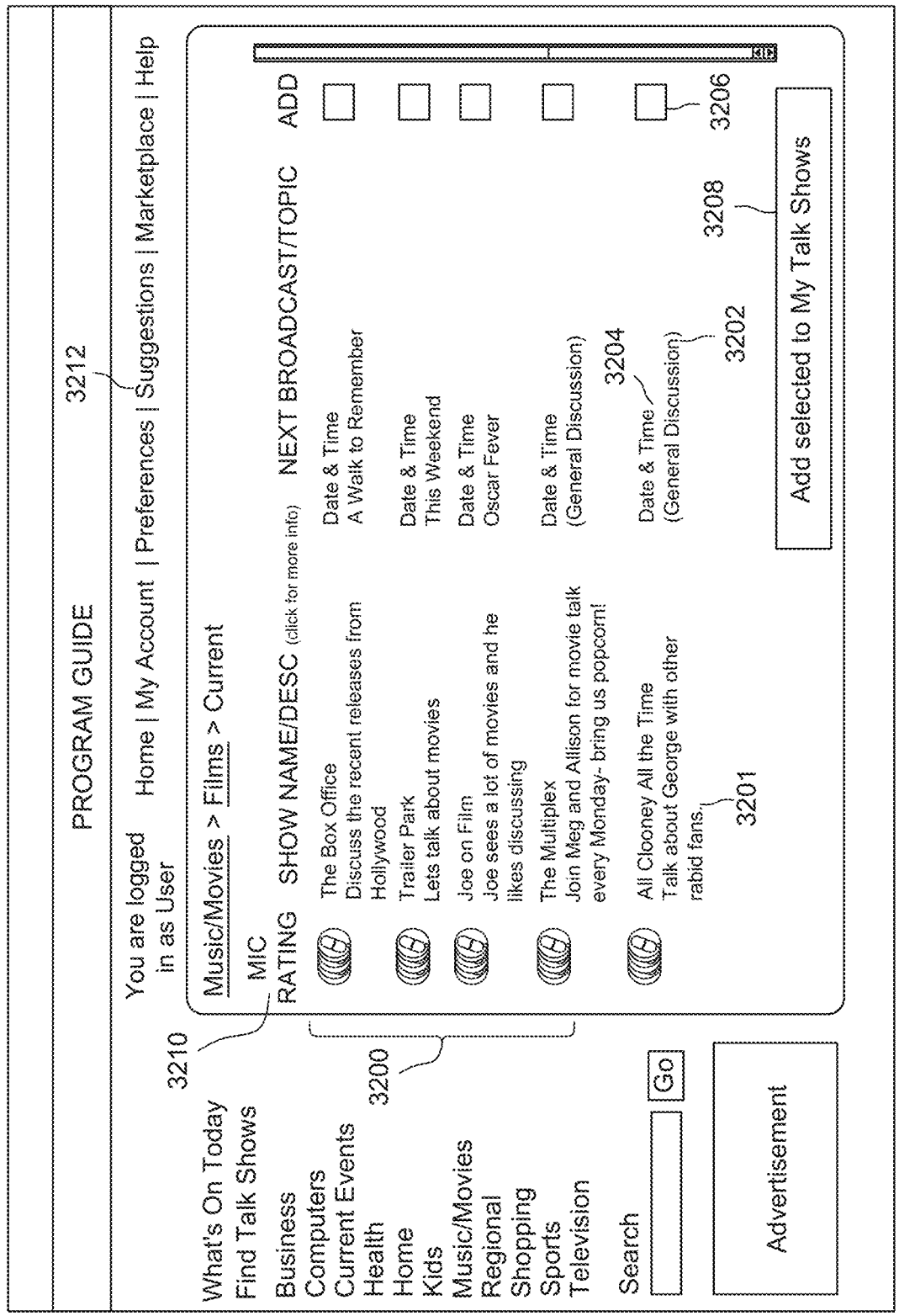
FIG. 32 is a screen capture of a program guide viewer interface in accordance with an exemplary embodiment of the present invention.

FIG. 32 is a screen capture of a program guide viewer interface in accordance with an exemplary embodiment of the present invention. The program guide includes a plurality of listings for interactive programs available for viewing 3200. Each of the listings includes a title and brief description field 3201, a current subject field 3202, a time field 3204, and a listing selection button 3206. In operation, a viewer reads the listing title and brief description to determine if the viewer wants to participate in the interactive program. The viewer reads the time field to determine when the next interactive program will be available, and reads the current subject field to determine what the next subject to be discussed during the interactive program will be. The viewer then selects the listing selection button and the "Add Selected to My Talk Shows" button 3208 to add the listing to a viewer's list of interactive programs that the viewer wants to participate in. The list is maintained in the viewer's database 2232 (FIG. 29).

The program guide viewer interface further includes an interactive program rating 3210 display. The interactive program rating is a viewer rating determined from viewer responses to the interactive program. In a program guide in accordance with an exemplary embodiment of the present invention, the viewer rating is expressed in terms of "mics" (short for "microphone"). The greater the number of mics, the higher the viewer rating of the interactive program. For example, the maximum number of mics an interactive program may receive is five mics for a popular program. A minimally popular interactive program may only receive only one mic.

The program guide viewer interface further includes a link to an interactive program suggestion 3210 process. As previously described, the interactive program creation system uses a viewer's profile stored in the viewer database and interactive program descriptions stored in the moderator database to suggest interactive programs that the viewer may be interested in.

In another program guide viewer interface in accordance with an embodiment of the present invention, the viewer may also access archived programs in an "on-demand" mode. In an on-demand mode, the program guide includes previously broadcast and archived interactive programs.

Referring again to FIG. 29, a viewer may access the previously described search facilities 2910 of the interactive program creation system from the program guide. Additionally, the program guide provides a link to an immediate program guide 2912 for listing interactive programs that are scheduled to be broadcast within the next day. A viewer may also access a browsing facility 2914. Using the browsing facility, a viewer can view a hierarchal list of interactive programs from which the viewer can select an interactive program to participate in.

The viewer may access a specific interactive program's home page 2916 in a variety of ways, such as: selecting a link to an interactive program from the previously described search facility 2910; immediate program guide 2912; browsing facility 2920; and suggestion facility 2918. Additionally, included in a moderator database 2230 is a schedule of upcoming interactive program broadcasts. The schedule of upcoming interactive program broadcasts may be accessed by the viewer using an upcoming interactive program facility 2920. From an interactive program's home page, a viewer may join a previously described actual interactive program 2922. Each interactive program is hosted by a previously described moderator server 2210.

FIG. 48 is a screen capture of an interactive program home viewer interface in accordance with an exemplary embodiment of the present invention. An interactive program home viewer interface is generated by a moderator server using information entered by a moderator and stored in the moderator database. The interactive program home viewer interface includes an identifier field 4800 for display of an interactive program's identifier. An interactive program description field is used to display a brief description of the interactive program as described by the moderator.

The interactive program home viewer interface further includes a schedule section 4804 where the schedules of upcoming transmissions of the interactive program are listed. An upcoming listing 4805 includes a reminder button 4806. In operation, a viewer selects the reminder button for a listing and an entry is made by the interactive program creation system to the previously described viewer profile. The entry is used to transmit notifications to the viewer when the interactive program is about to be transmitted.

The interactive program home viewer interface further includes a preference addition button 4808 that the viewer selects to have the interactive program added to the previously described viewer's list of interactive program preferences. A contact button 4810 is provided for use by a viewer in sending an email message to a moderator. A search button 4812 is provided for the viewer to search for additional interactive programs that are related thematically to the interactive program represented in the interactive program home viewer interface.

Referring again to FIG. 29, the interactive program creation system further includes a facility 2926 for retrieving archived previously broadcast interactive programs for viewing. A viewer uses the archive facility to view transcripts and enhanced content of interactive programs that the viewer may have missed or wants to view again. In one facility for retrieving archived interactive programs for viewing in accordance with an exemplary embodiment of the present invention, the archived interactive programs can be viewed on an "on-demand" or "pay-for-view" basis.

In another facility for retrieving interactive programs for viewing in accordance with an exemplary embodiment of the present invention, the archived interactive programs may be accessed for presentation in conjunction with other content such as in a syndication mode. For example, an archived interactive program whose theme was discussion about a particular product can be linked to an advertisement for that product on a separate Website. As another example, an interactive program with a topical theme may be syndicated by a live news Website.

FIG. 33 is a screen capture of an interactive program archive viewer interface in accordance with an exemplary embodiment of the present invention. An archive viewer interface includes a plurality of archive listings of previously broadcast and archived interactive programs 3300 with each archive listing 3301 including a title field 3302, a subject field 3304, and a date field 3306. In operation, a viewer reviews the plurality of archive listings and selects the archive listing corresponding to an archived interactive program the viewer wants to view. After selecting the archive listing of the archived interactive program, the viewer views a replay of the archived interactive program corresponding to the archive listing. In an interactive program archive viewer interface in accordance with an exemplary embodiment of the present invention, archived listings are organized by themes, such as the illustrated "The Gardening Center" 3308 that is an archive with a gardening theme. In other interactive program archive viewer interfaces in accordance with an exemplary embodiment of the present invention, an entity, such as a corporation, sponsors the archive as a form of advertising. For example, a brokerage may sponsor an archive with a financial theme or a hardware retailer may sponsor an archive with a "do-it-yourself" theme.

Referring again to FIG. 29, the interactive program creation system further includes facilities 2924 for a moderator to create an interactive program. A moderator uses the facility to create an interactive program by entering information about the interactive program and the information is stored in the moderator database 2230.

FIG. 34 is a screen capture of a moderator interface for an interactive program authoring tool in accordance with an exemplary embodiment of the present invention. The interactive program creation moderator interface includes an interactive program identifier display field 3400 for displaying the interactive program's name. A moderator uses an interactive program identifier entry field 3402 to enter the name of the interactive program. The interactive program creation moderator interface further includes a description entry field 3404 for entry by the moderator of a brief description of the interactive program and a category/genre selection menu 3408 for selection by the moderator of a category under which the interactive program will be placed. The interactive program creation moderator interface further includes a host name entry field 3406 for entry of the moderator's name. The interactive program creation moderator interface further includes a broadcast scheduling selection menu 3410, day selection buttons 3412, and a time selection menu 3414 for selection of the broadcast time of the interactive program. In operation, a moderator enters in an interactive program name, interactive program description, and host name. The moderator selects a category, a broadcast schedule, the days of the week the interactive program will be broadcast, the time the interactive program will be broadcast, and selects a "Submit and Continue" button 3418 to store the entered and selected interactive broadcast information in the moderator database 2230 (FIG. 29). The moderator can also select an "Include in Program Guide" button 3416 to include the interactive program information in the previously described program guide.

FIG. 59 is a screen capture of an interactive program authoring wizard in accordance with an exemplary embodiment of the present invention. Within the interactive program authorizing tool is a "wizard" which allows a host/moderator to easily set up a new interactive program. A "wizard" is a software tool that guides a user through the configuration of a software application. A wizard typically includes a set of selectable configuration templates for use by a user and a dialog that guides the user through the configuration process. The interactive program authoring wizard can operate as a standalone application and may be used through a Web browser. The interactive program authoring wizard features beginner, intermediate, and expert levels and offers the ease of use of other mass market authoring tools making it easy for potential moderators to get started hosting their own interactive programs. During a setup process, the moderator selects from several preset genres allowing the moderator to quickly set the look and feel of their interactive programs. For example, these presets may include formats for defining interactive programs such as a news and perspective program, a sports program, a business program, a human interest program, a do-it-yourself program, etc. The interactive program authoring tool 5900 has a "genre/theme" link 5902 selectable by the moderator to bring up a list of themes 5904 that the moderator selects from. By selecting a theme, the moderator selects a configuration for the interactive program establishing backgrounds, layouts, and interactive areas for an interactive program. The moderator selects a theme and the selects a "submit and continue" button 5906 to configure the interactive program using a themed interactive program template.

Referring again to FIG. 34 interactive program creation moderator interface further includes a link to a broadcast schedule editing facility 3418. A moderator uses this link to access a more detailed interactive program scheduling entry facility. The interactive program creation moderator interface further includes a link to an add co-hosts facility 3420. A moderator uses this link to access a facility for adding a co-host or additional, but subordinate moderator, such as a side-kick, a panel of experts, or a special guest to the interactive program.

The interactive program creation moderator interface further includes a link to a theme facility 3422. A moderator uses this link to access a facility for assigning the interactive program to a thematic category for easier classification of interactive programs for browsing by a viewer.

The interactive program creation moderator interface further includes a link to a send reminders facility 3424. A moderator uses this link to access a facility for transmitting reminders to viewers. The interactive program creation system uses the previously described viewer's lists of interactive programs to send notifications to each of the viewers who have added the moderator's interactive program to their list of interactive programs. Reminders may be sent by various communication links such as email, voice mail, and pager as agreed to by the viewer.

Figure 52:
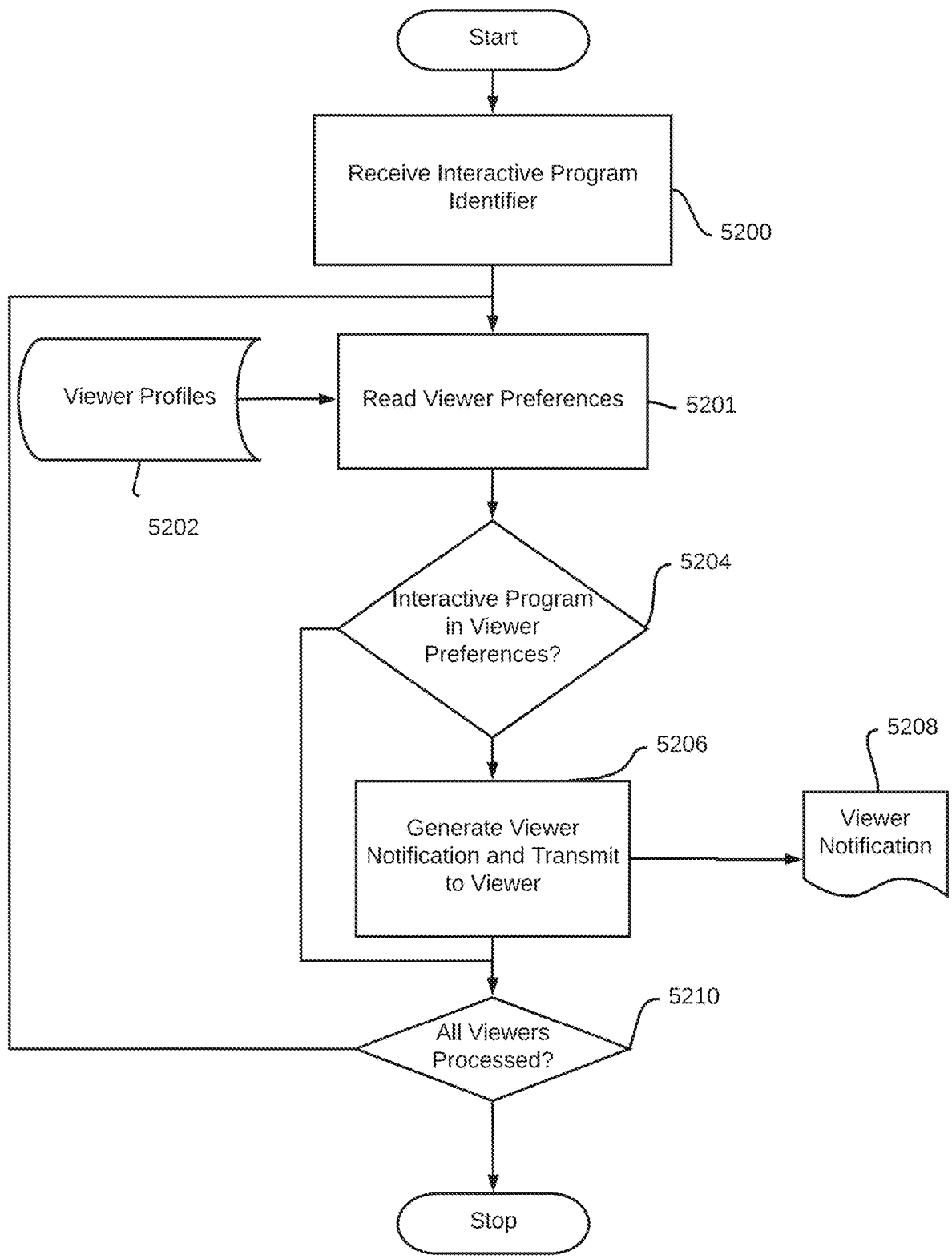
FIG. 52 is a process flow diagram of a viewer notification process in accordance with an exemplary embodiment of the present invention.

FIG. 52 is a process flow diagram of a viewer notification process in accordance with an exemplary embodiment of the present invention. A moderator server receives (5200) an interactive program identifier from a moderator for which the moderator would like to transmit reminders to viewers. The moderator server reads (5201) viewer preferences from previously described viewer profiles 5202. Included in a viewer's profile is a list of interactive programs for which the viewer wants to be reminded of upcoming transmissions. If the moderator server determines (5204) that a viewer wants to receive notifications for the identified interactive program, the moderator server generates (5206) a viewer notification 5208 and transmits the viewer notification to the viewer. The moderator server then determines (5210) if all viewers have been processed. If not, the moderator server continues searching for viewers wishing to receive notifications. The moderator server continues processing until all viewers wishing to receive notifications of the transmission of the interactive program have been notified.

In one viewer notification process in accordance with an exemplary embodiment of the present invention, a viewer notification is transmitted as an email message to the viewer. The viewer may retrieve the email message by any suitable device or client such as a personal digital assistant, a personal computer, etc. In another viewer notification process in accordance with an exemplary embodiment of the present invention, the viewer notification is in the form of an audio reminder transmitted to a viewer's voice mail system or directly to a viewer's telephone. In another viewer notification process in accordance with an exemplary embodiment of the present invention, the viewer notification is in the form of an instant message that is transmitted to a viewer if the viewer is currently on a system that is accessible to the moderator server.

Referring again to FIG. 34, the interactive program creation moderator interface further includes a link to a traffic report facility 3426. A moderator uses this link to access a facility for generating reports describing the user interactions with an interactive program broadcast by the moderator.

FIG. 35 is a screen capture of a moderator interface for an interactive program reporting tool in accordance with an exemplary embodiment of the present invention. In general, a moderator uses an interactive program reporting tool to specify reports generated using data recorded about viewer interaction with an interactive program broadcast and stored in the moderator database as previously described. Additionally, the interactive program reporting tool is used by a moderator to generate a report regarding viewer access of archived interactive programs so that the moderator can determine the popularity of old content that was previously broadcast. The moderator can specify reports to analyze the data in a variety of ways using a variety of data mining techniques to yield customizable, comprehensive, and flexible reports. Additionally, viewer identifications associated with the viewer interaction data can be combined with the previously described viewer profile data to generate reports on the demographics and geographic locations of the viewers participating in an interactive program. In this mode, a viewer's privacy may be protected by aggregating the viewer data or stripping viewer identifiers from any data viewable by a moderator. The reporting tool moderator interface includes a select group report menu 3500 for selecting a specific set of reports to view.

The reporting tool moderator interface further includes entry fields for selection of types and formats of viewer interaction reports. Each of these sections is typified by a selection button 3504 and a format selection pull-down menu 3506. A moderator selects a selection button to include the specific type of report in a viewer interaction report and uses the format pull-down menu to select the format of the specific report. The types of reports the moderator can include in a viewer interaction report include a peak usage report 3504. A peak usage report is a report indicating the peak usage of the interactive program by the viewers.

A moderator can select a total traffic report 3508. A total traffic report is a report depicting the total number of viewers and viewer interactions with the interactive program over the broadcast time of the interactive program.

A moderator can select a breakdown by user report 3512. A breakdown by user report is reported depicting the interactions of single viewers.

A moderator can select a breakdown by demographic report 3516. A breakdown by demographic report is a report depicting viewer interactions by viewers fitting certain demographic descriptions.

A moderator can select a breakdown by geography report 3520. A breakdown by geography report is a report depicting where viewers participating in an interactive program are physically located.

A moderator can select a visitor path report 3524. A visitor path report is a report depicting where viewers are located on a network.

A moderator can select a referral report 3528. A referral report is a report depicting from which locations viewers have been referred from such as an external Web site, etc.

A moderator can select a polling data report 3534. A polling data report is a report depicting the results of polls taken by a moderator during an interactive program.

A moderator can select a "clicks by a viewer" report 3538. A clicks by a viewer report is a report depicting how many selections viewers make during an interactive program.

A moderator can select a feature utilization report 3542. A feature utilization report is a report depicting how many different features viewers are using during an interactive program.

A moderator can select a chat or interactive messaging report 3544. A chat or interactive messaging report is a report depicting how many interactive messages are being sent between the audience members during an interactive program.

Figure 36:
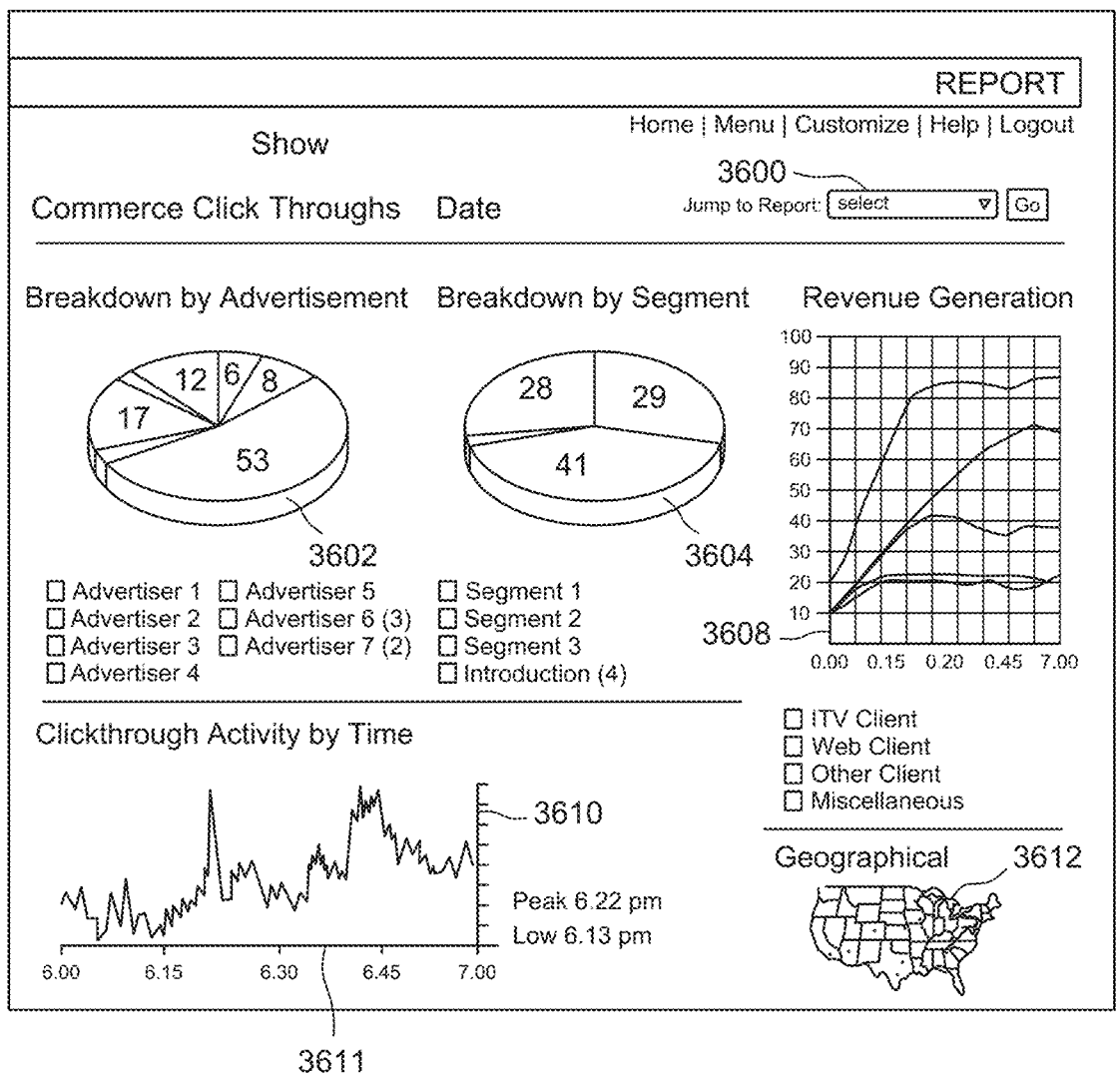
FIG. 36 is a screen capture of a moderator interface for a participant interaction report generated in accordance with an exemplary embodiment of the present invention.

FIG. 36 is a screen capture of a moderator interface for a viewer interaction report generated in accordance with an exemplary embodiment of the present invention. The report moderator interface includes a report selection pull down menu 3600 for immediately viewing sections of the report without having to scroll through each of the reports.

Graph 3610 is a graph of click-through activity versus time for an interactive program. During an interactive program, individual instances of viewers selecting advertising banners are recorded in the previously described moderator database associated with the time of the selection of the advertising banner. An interactive program creation system can use the recorded advertising selection events and their associated times to generate the click-through activity versus time graph.

Graph 3612 is a geographically based graph depicting the geographic location of viewers participating in an interactive program. The viewers participating in an interactive program are recorded in the previously described moderator database. Each recorded viewer's geographic location can be determined from the previously described viewer's profile or by mapping the viewer's IP address to a specific geographic location. An interactive program creation system can use the recorded viewer identifications and viewer geographic locations to generate a graphic illustrating the geographic locations of the viewers.

The viewer interactivity reports are used by a moderator to determine the effectiveness of an interactive program. For example, the moderator can use the demographic charts to determine if the interactive program is reaching an audience with the demographic profile desired by the moderator. As a further example, the moderator can determine the effectiveness of various portions of an interactive program by analyzing participant interaction with the interactive program over time. Spikes in interactive message transmissions from the participants may indicate portions of the interactive program that the participants find most engaging.

Figure 37:
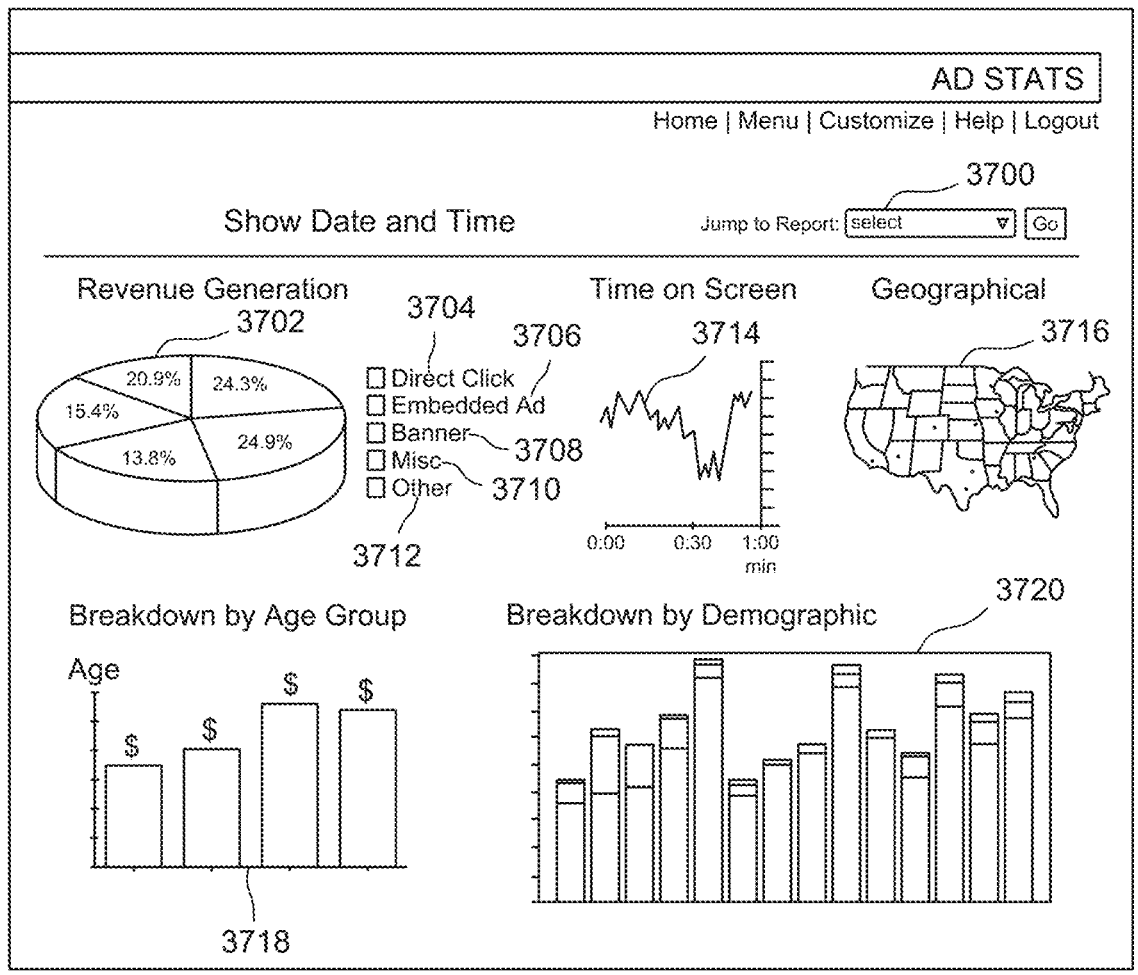
FIG. 37 is a screen capture of a moderator interface for an advertising report generated in accordance with an exemplary embodiment of the present invention.

FIG. 37 is a screen capture of a moderator interface for an advertising report generated in accordance with an exemplary embodiment of the present invention. A revenue generation graphic 3702 illustrates the relative amounts of revenue generated from the viewers participating in an interactive program. As the viewers participate in the interactive programs, the viewers' interactions with links and advertising banners included in the interactive program are recorded in the moderator database as previously described. An interactive program creation system can use the recorded viewer interactions to generate a graphic showing the relative contributions to total revenue by each of several possible viewer interaction modes. For example, in the illustrated graph, comparisons are made for selection of links 3704, selection of embedded ads 3706, selection of banner ads 3708, and selection of other types of ads 3710 and 3712, as a percentage of total revenue.

An advertising geographical graphic 3716 indicates the geographic viewer locations of viewers participating with the interactive program. As the viewers participate in the interactive programs, the viewers' interactions with links and advertising banners included in the interactive program are recorded in the moderator database as previously described. Additionally, a viewer identification for each viewer interaction is stored in the moderator database. Each viewer's geographic location can be determined from the previously described viewer's profile or by mapping the viewer's IP address to a specific geographic location. An interactive program creation system can use the recorded viewer interactions and viewer identifications to generate a graphic illustrating the geographic locations of advertising revenue generation. An interactive program creation system can use viewer interaction data, viewer identification data, and viewer profile data to generate a revenue by age graphic 3718 or a revenue by demographic description graphic 3720.

Figure 51:
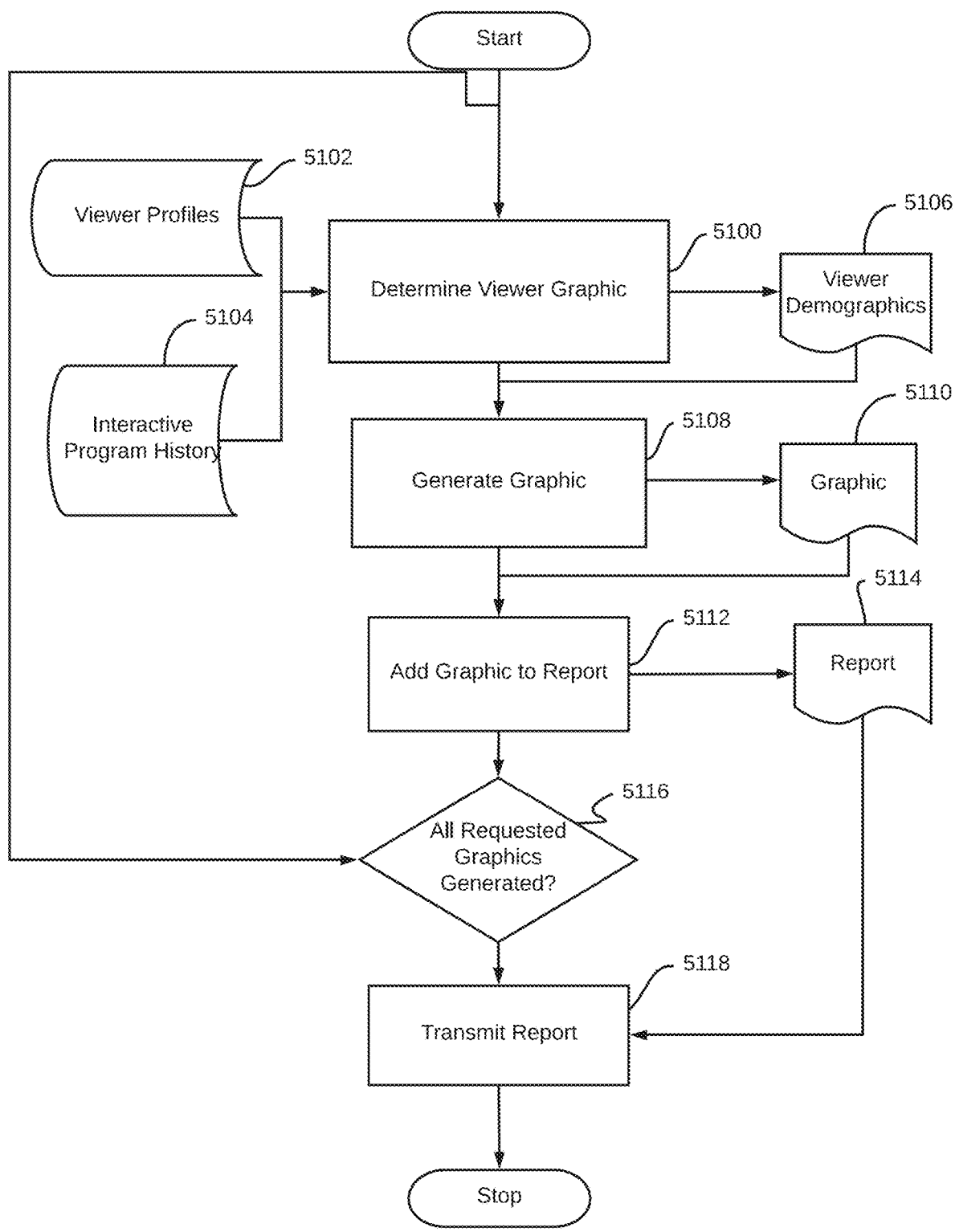
FIG. 51 is a process flow diagram of an interactive program report generation process in accordance with an exemplary embodiment of the present invention.

FIG. 51 is a process flow diagram of an interactive program report generation process in accordance with an exemplary embodiment of the present invention. A moderator server determines (5100) a set of viewer graphics for an interactive program's viewing audience by using the interactive program's history 5104 along with a set of viewer profiles 5102. For each viewer that participated in the interactive program when the interactive program was transmitted, the moderator server extracts the individual viewer's stored viewer profile. The moderator server aggregates the individual viewer profiles to generate viewer demographics 5106 for the interactive program transmission. The moderator server generates (5108) a graphical representation 5110 of the viewer demographics, for example a bar graph, and adds 5112 the graphical representation to a report 5114. The moderator server determines (5116) if all requested graphics have been generated. If not, the moderator selects the next graphic to generate and repeats the process thereby adding a new graphic to the report. Once all of the graphics have been added to the report, the moderator server transmits (5118) the report to the moderator requesting the report.

Figure 38:
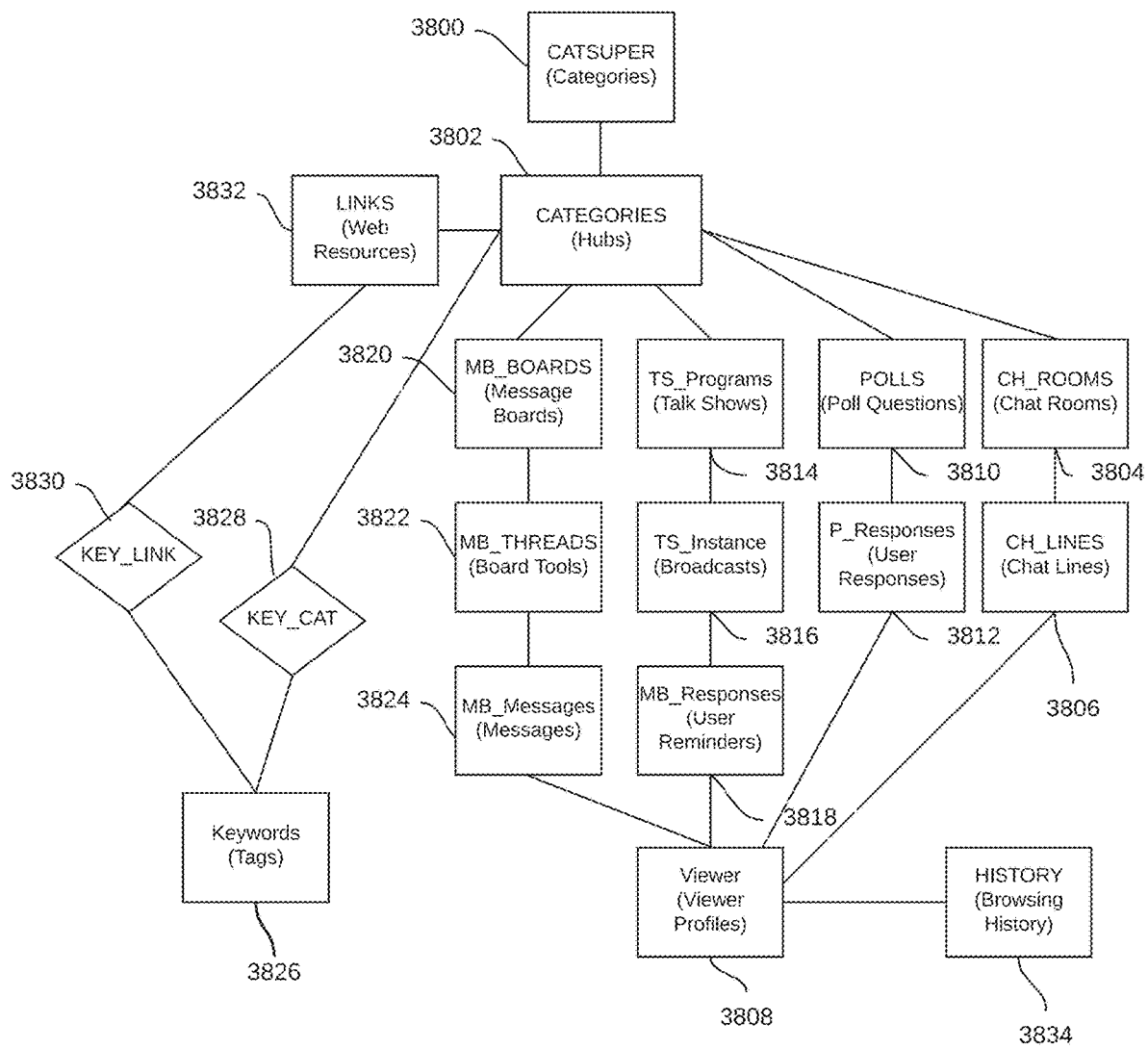
FIG. 38 is a database entity relation diagram for a moderator database in accordance with an exemplary embodiment of the present invention.

FIG. 38 is a database entity relation diagram for a moderator database in accordance with an exemplary embodiment of the present invention. The database entity relation diagram is an expression of meta data describing how the data in the viewer and moderator databases are related. The moderator database includes information used to organize interactive programs created and administered by moderators and histories of interactive programs including viewer interactions with the interactive programs. Interactive programs are organized within categories as previously described. Category information is used to create hubs of viewer interactions. A super category 3800 is associated with many categories 3802 but each category is only associated with one super category. A category or hub is associated with many interactive chat rooms 3804, which is in turn associated with many interactive chat lines 3806. A viewer profile is associated with many interactive chat lines. In operation, a plurality of viewers select a category and enter an interactive chat room associated with the category. Viewer submissions within an interactive chat room are used to generate individual interactive chat lines that are viewed by the viewers as they exchange interactive messages.

A category is associated with a plurality of polls 3810 with each poll being associated with a plurality of poll responses 3812. A viewer profile is associated with a plurality of poll responses. In operation, viewers respond to a poll associated with a specific category and the viewers' responses are recorded in the moderator database for future analysis.

A category is associated with a plurality of interactive programs 3814 and each interactive program is associated with a plurality of interactive program broadcasts or instances. Each interactive program broadcast is associated with a plurality of reminders 3818 with each reminder being associated with a single user profile. In operation, a moderator determines an interactive programming schedule of interactive program broadcasts and generates reminders that are transmitted to viewers who have expressed an interest in being reminded of the interactive program's broadcasts.

A category is associated with a plurality of message boards 3820 with each message board being associated with a plurality of message board threads 3822. Each message board thread is associated with a plurality of message board messages 3824 with each message board message being associated with a single viewer profile. A viewer profile may be associated with a plurality of message board messages. In operation, viewers leave messages grouped into message board threads on message boards maintained by moderators. The messages may be for the moderators or may be for other viewers.

Keywords 3826 are stored in the moderator database so that viewers can search for categories 3802 and links 3832 associated with the categories. Additionally, all user inputs can be indexed and tagged to become interactive triggers that are linked to interactive programs served by the moderator server. Category keywords 3828 are associated with a plurality of categories. In operation, a viewer enters a category keyword into a previously described search facility and a set of categories for use by the viewer are generated that are associated with the category keyword. Link keywords 3830 associated with links to off-site resources are also stored in the moderator database. In operation, a viewer enters a link keyword in the previously described search facility and a set of links associated with the link keyword is generated for use by the viewer.

Viewer profiles are associated with a plurality of viewer histories 3834. In operation, a viewer history is recorded of a viewer's interactions when accessing an interactive program creation system while not actually participating in an interactive program.

Figure 39:
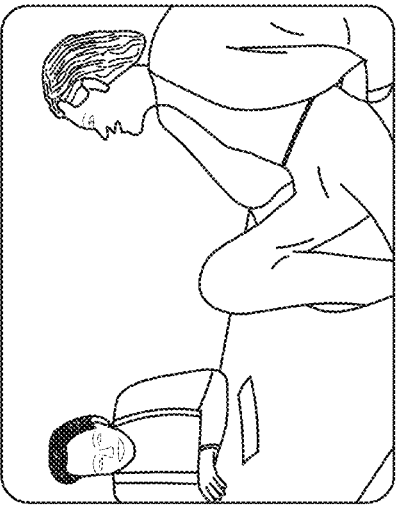
FIG. 39 is a screen capture of a viewer interface for a non-moderator based interactive program associated with a broadcast in accordance with an exemplary embodiment of the present invention.

FIG. 39 is a screen capture of a viewer interface for a non-moderator based interactive program associated with a broadcast in accordance with an exemplary embodiment of the present invention. As previously described, an interactive program can include broadcast content from a source not associated with the interactive program, such as a broadcast from a commercial broadcaster. In this case, an interactive program includes participant commentary but may not include moderator commentary. The viewer interface for a non-moderated interactive program includes a broadcast content section 3900 for display of non-interactive broadcast content. The viewer interface for a non-moderated interactive program further includes a viewer interactive message section 3902 for display of viewer interactive messages transmitted to a moderator server (not shown). The viewer interface for a non-moderated interactive program includes a viewer interactive message entry field for entry of viewer interactive messages. In operation, a viewer views the non-interactive broadcast content, enters interactive messages into the interactive message entry field and selects the "enter" button 3906 to submit the interactive message to the moderator server. The viewer's entered interactive message is then combined with other viewers' interactive messages to generate an interactive message display that is shown in the interactive message display section.

In an interactive program creation system in accordance with an embodiment of the present invention, the broadcast program is synchronized to the interactive program using synchronization signals included in the interactive program signals. In this way, an interactive program may be synchronized with an external broadcast.

Figure 40:
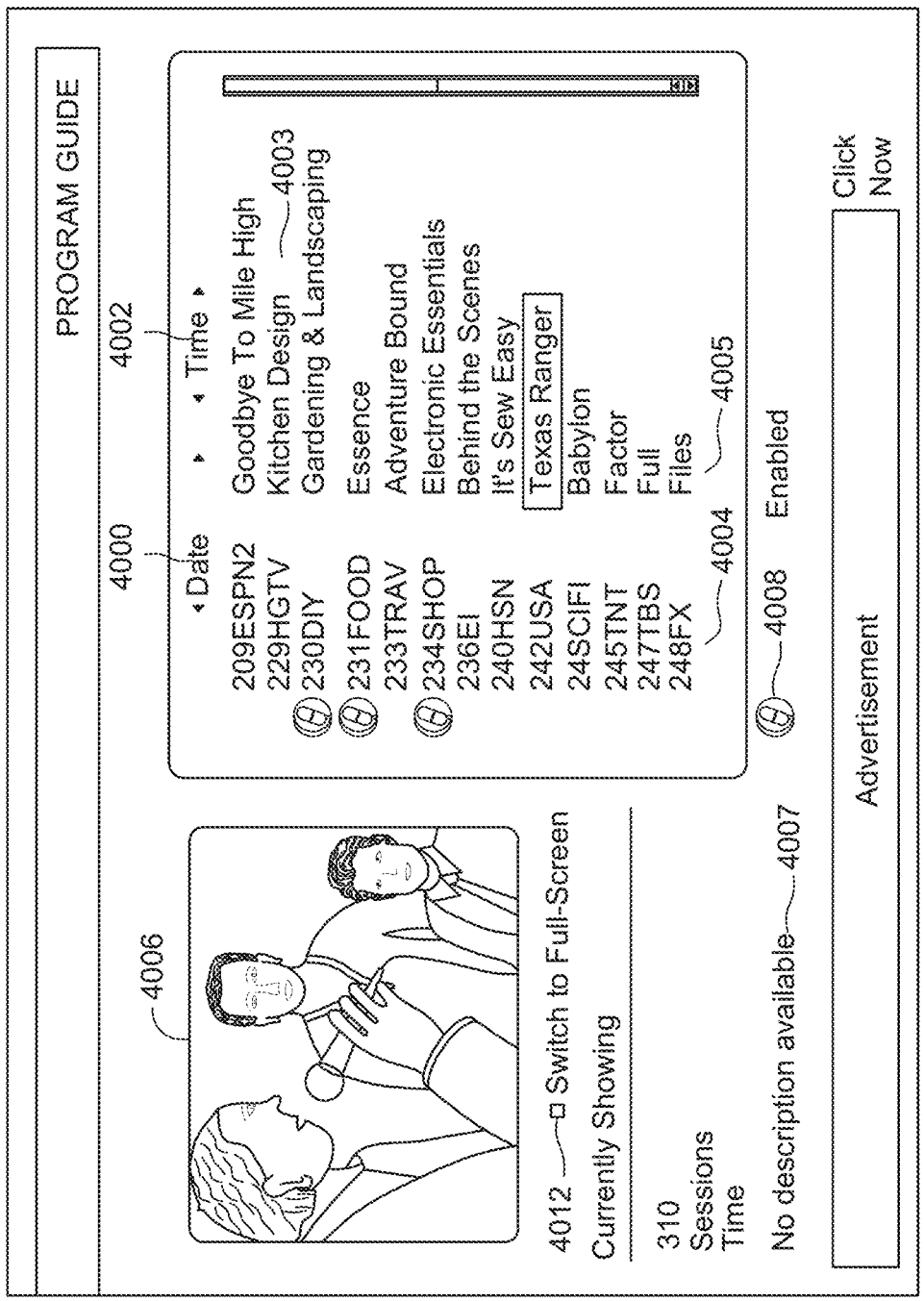
FIG. 40 is a screen capture of a viewer interface for a broadcast program guide in accordance with an exemplary embodiment of the present invention.

FIG. 40 is a screen capture of a viewer interface for a broadcast program guide in accordance with an exemplary embodiment of the present invention. The broadcast program guide viewer interface includes a date selection/display field 4000 and a time selection/display field 4002. A viewer uses the date selection/display field and time selection/display field to select and display a date and time for which the viewer wants to view scheduled broadcasts. Scheduled broadcasts for the selected date and time are shown in a listings section 4003. The listings section includes a broadcast channel column for display of the broadcast channel of a particular program, and a program information column 4005 for display of information about a scheduled program.

A current broadcast content section 4006 includes a display of broadcast content that is currently being broadcast on a selected broadcast channel. Information about the broadcast content is shown in a broadcast content information section 4007 formatted as a televised programming guide. The broadcast information includes a broadcast channel, a title, a broadcast time, and a description, if available, of the broadcast content. If a microphone indicator 4008 is shown next to a listing of a scheduled broadcast this indicates that the scheduled broadcast is available as an interactive program including broadcast content as previously described. In operation, a viewer can select an interactive program that is currently being broadcast and view the broadcast content in the current broadcast content section. A viewer selects a "switch to full screen" button 4012 to participate in a currently broadcast interactive program corresponding to the currently broadcast content displayed in the current broadcast content section.

Figure 41:
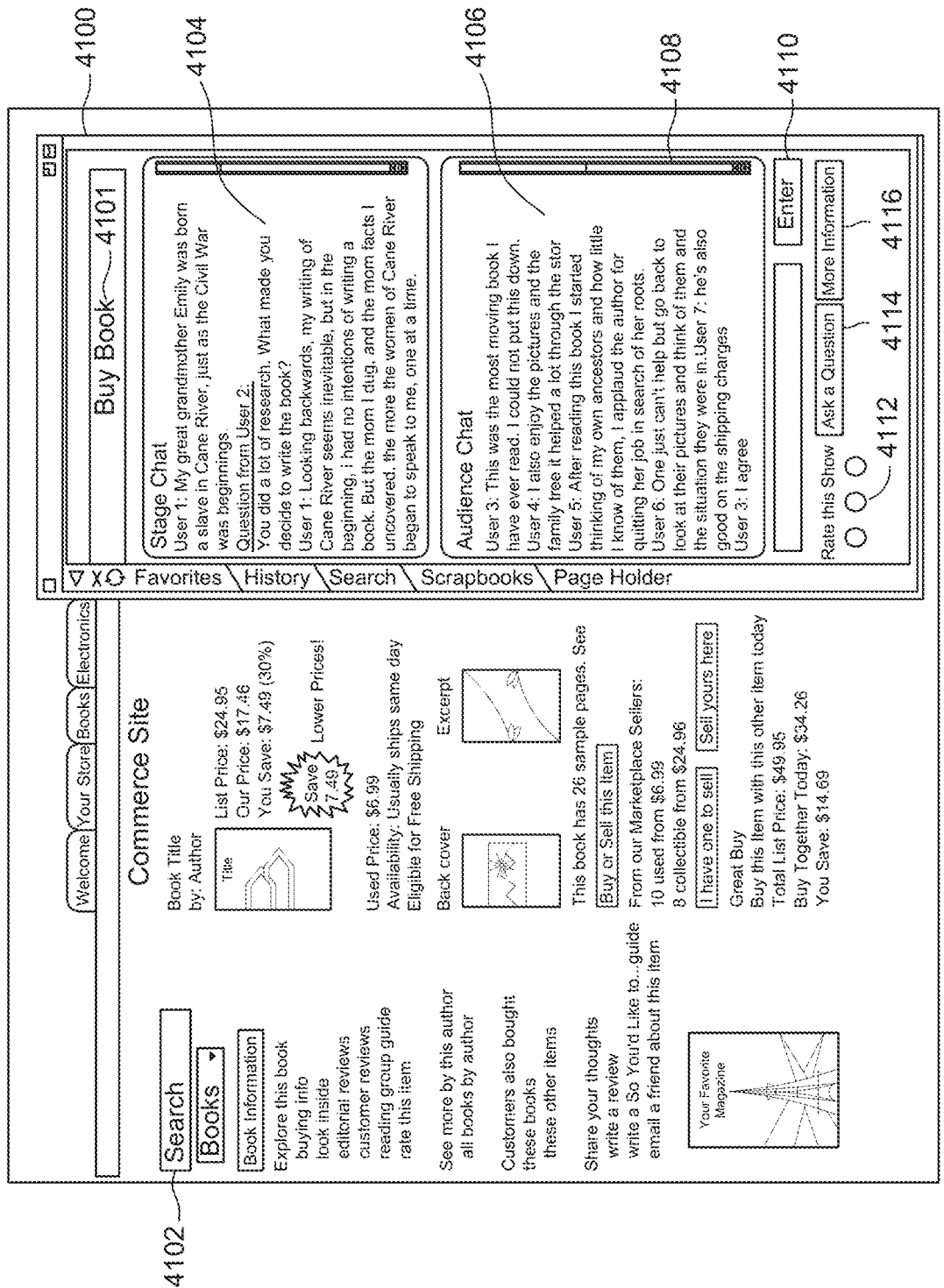
FIG. 41 is a screen capture of a viewer interface for an interactive program incorporating Web content in accordance with an exemplary embodiment of the present invention.

FIG. 41 is a screen capture of a viewer interface for an interactive program incorporating Web content in accordance with an exemplary embodiment of the present invention. A viewer initiates participation with an interactive program displayed in an interactive program reduced screen viewer interface 4100. The reduced screen viewer interface includes a link 4101 to a Web page 4102 that includes additional information about the interactive program's theme. For example, the link may be to an eCommerce Web site where a viewer may purchase a book that is currently being discussed by a moderator and viewers participating in the interactive program. The reduced screen viewer interface includes a stage interaction section 4104 for display of interactive messages exchanged between a moderator and a virtual guest or invited viewer as previously described. The reduced screen viewer interface further includes an audience interactive message display section 4106 for display of interactive massages exchanged between viewers as previously described. The reduced screen viewer interface further includes an interactive message entry field 4108. In operation, a viewer enters an interactive message into the interactive message entry field and selects the "Enter" button 4110 to transmit the interactive message to a moderator server (not shown) for inclusion in the stage or audience interaction display section.

The reduced screen viewer interface further includes interactive program rating buttons 4112 for viewer rating of an interactive program as previously described. In operation, a viewer selects one of the interactive program rating buttons to indicate the viewer's satisfaction with the interactive program. Viewer ratings from a plurality of viewers are aggregated together and displayed to the moderator as previously described.

A moderator uses a reduced screen viewer interface to create a contextual commerce application using an interactive program. The moderator uses the interactive program to build a community from an audience attracted to the subject matter of the interactive program, such as a product line or a series of books. The moderator then links the reduced screen viewer interface to a location where a viewer can make a purchase of a product or item related to the subject matter of an interactive program. In addition, archived interactive programs can be accessed in an "on-demand" mode to be linked to an e-commerce Website in order to have a continually available sales tool such as an "infomercial" or testimonial for a product or item.

Figure 42:
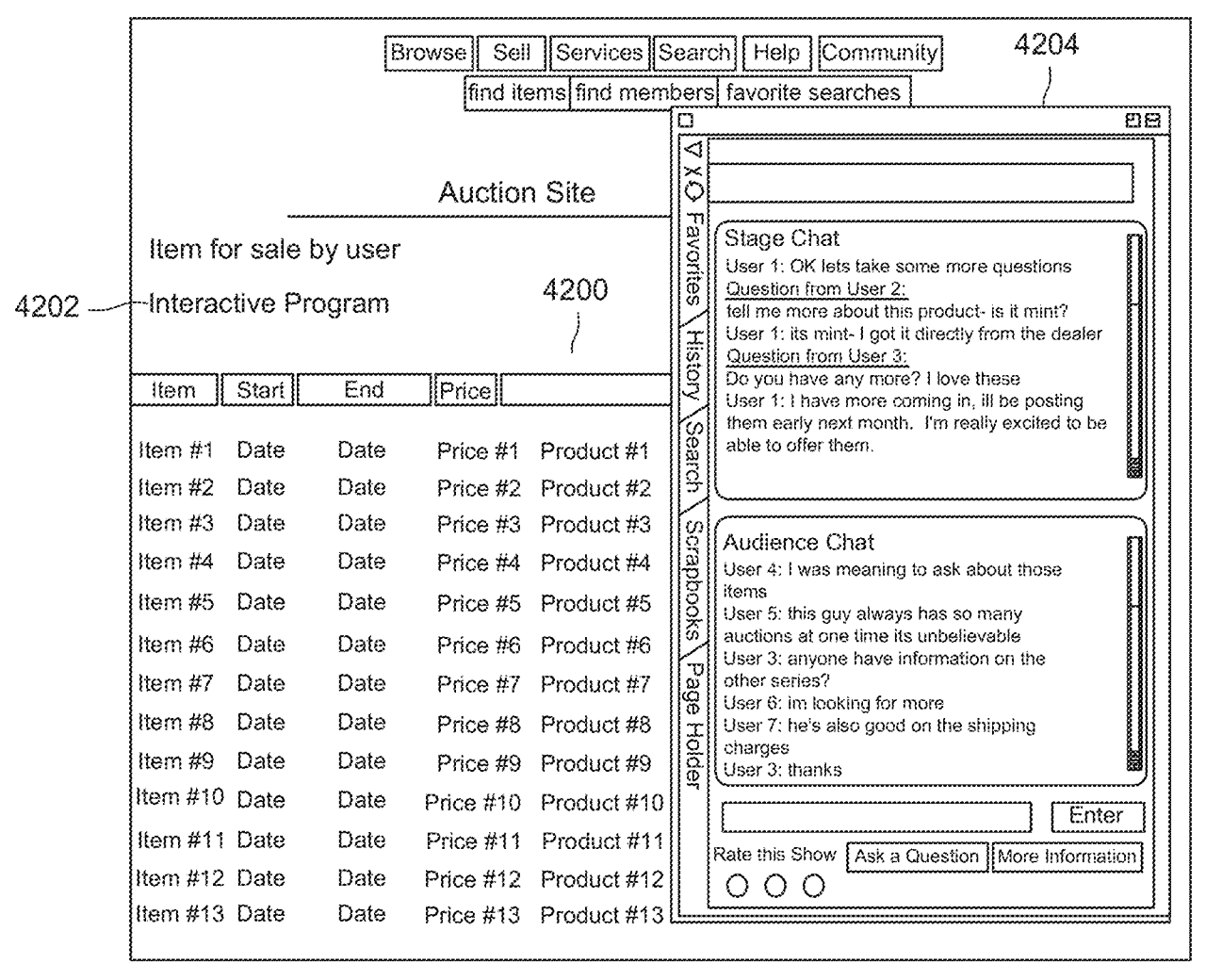

FIG. 42 is a screen capture of a viewer interface for an interactive program incorporating Web content in accordance with another exemplary embodiment of the present invention. A viewer initiates interaction with a previously described reduced screen viewer interface 4204 for an interactive program by selecting a link 4202 included in a Web page 4200. For example, a seller offering items on an auction site may be a moderator for an interactive program in order to discuss the offered items with participating viewers. In this case, the seller includes a link to an interactive program for which the seller serves as a moderator.

FIG. 43 is a screen capture of a viewer interface for a facility to manage a viewer's personal favorite interactive programs in accordance with an exemplary embodiment of the present invention. The personal favorite viewer interface includes a listings display section 4300 for display of one or more listings 4301. Each listing includes a viewer rating field 4302 for display of previously described viewer ratings of an interactive program displayed in the listing. The listing further includes a name field 4304 for display of an interactive program's name, a next broadcast field 4306 for display of the interactive program's next broadcast, a reminder button 4308, and a delete button 4310. In operation, a viewer selects the reminder button to receive previously described reminders from a listed interactive program's moderator and selects an "update settings" button to transmit the reminder request to a moderator server (not shown). To delete an interactive program from the viewer's personal favorite list, the viewer selects the delete button and selects the update settings button to delete a listed interactive program to delete the listed interactive program.

Figure 44:
FIG. 44 is a screen capture of a viewer interface for a facility to suggest programs to a viewer in accordance with an exemplary embodiment of the present invention.

FIG. 44 is a screen capture of a viewer interface for a facility to suggest programs to a viewer in accordance with an exemplary embodiment of the present invention. The suggested program viewer interface includes a suggested interactive program listing section 4400. A suggested interactive program listing includes a field for display of a previously described viewer rating 4404, a field for display of an interactive program's name and brief description 4406, a next broadcast field 4408 for display of an interactive program's next display time, and an "add" button for adding a listed interactive program to the viewer's list of favorite interactive programs. In operation, a viewer selects the add button for a listed interactive program and selects an "Add Selected to My Interactive Programs" button 4412 to add a listed interactive program to the viewer's previously described favorite interactive program.

Figure 45:
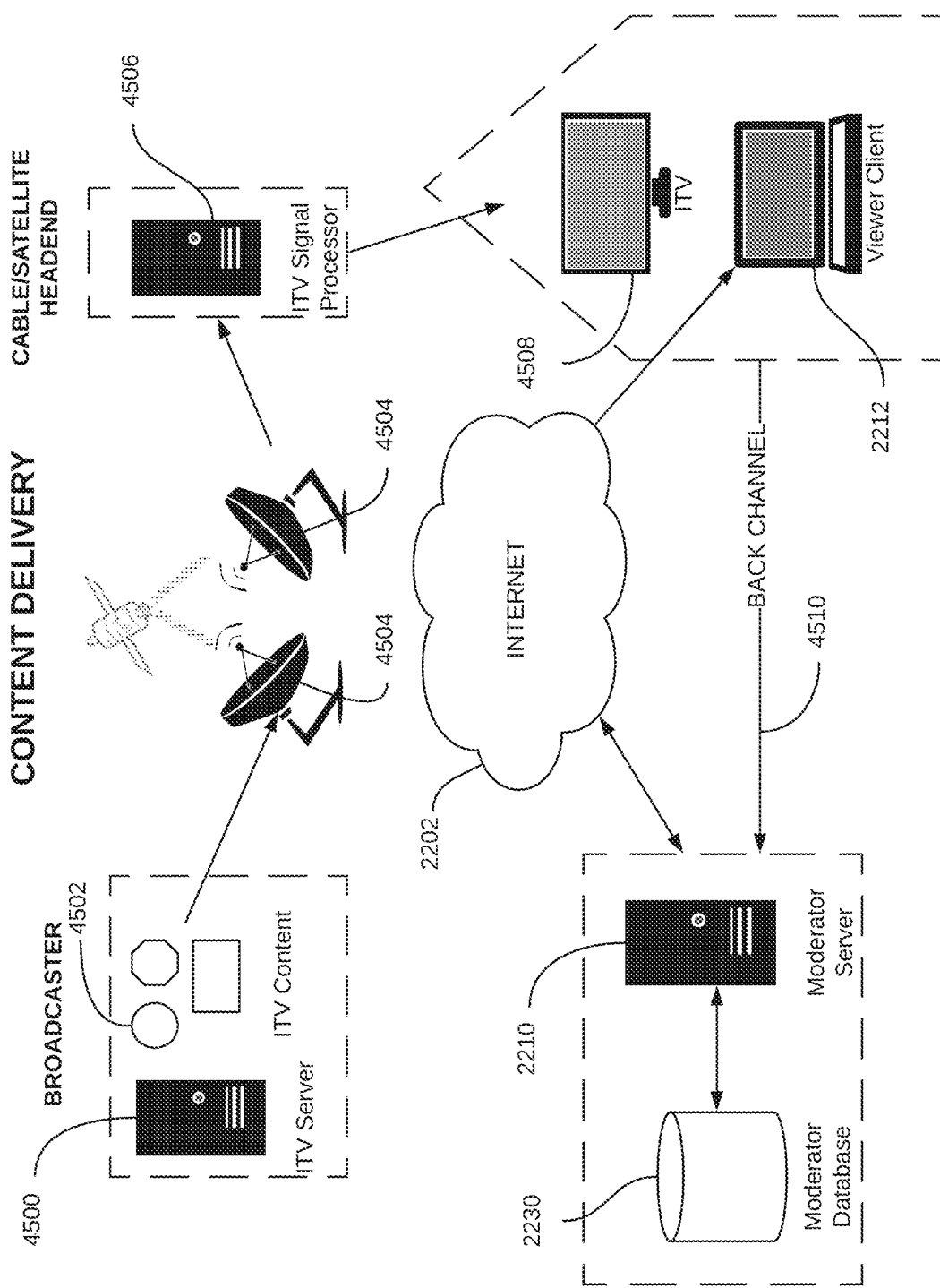
FIG. 45 is a deployment diagram of a process for conversion and delivery of interactive programs via an interactive television network in accordance with an exemplary embodiment of the present invention.

FIG. 45 is a deployment diagram of a process for conversion and delivery of interactive programs via an interactive television network in accordance with an exemplary embodiment of the present invention. A moderator server 2210 receives participant comments and moderator content from an audience and a moderator and generates interactive program for transmission over the Internet 2202 to a viewer client 2212 as previously described.

The same interactive program can be transmitted over a conventional interactive television (iTV) network as well. The moderator server transmits the interactive program to an iTV server 4500 and the iTV server generates iTV content 4500 from the interactive program. The iTV content is transmitted via communications network 4502 to an iTV signal processor 4506. The iTV signal processor receives the iTV content and uses the iTV content to generate iTV signals for transmission to an iTV enabled television 4508 for viewing by a viewer. In this mode, triggers are generated from the interactive program signals and the viewer uses the triggers to participate in the interactive program, such as through the use of tags associated with the triggers included in the iTV signals' Vertical Blanking Interval (VBI), and the viewer's comments are transmitted via a back channel 4510 to the moderator server. In this way, a viewer can use either an iTV enabled television or a viewer client to participate in an interactive program as previously described.

Figure 53:
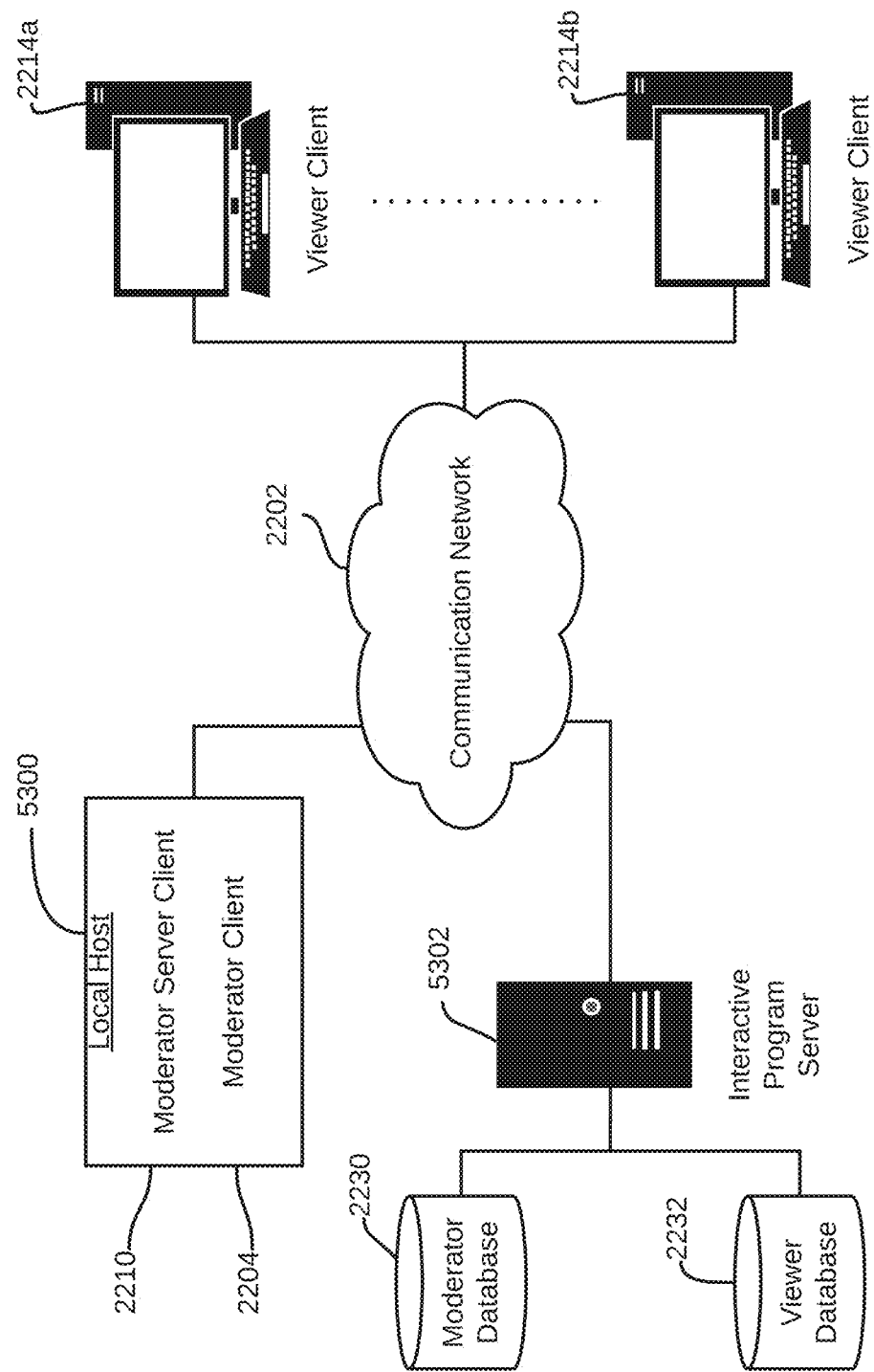
FIG. 53 is a deployment diagram of a locally hosted moderator server in accordance with an exemplary embodiment of the present invention.

FIG. 53 is a deployment diagram of a locally hosted moderator server in accordance with an exemplary embodiment of the present invention. A moderator server 2210 implementing the previously described interactive program creation facilities is hosted by a local host 5300. The local host may also host the previously described moderator client 2204. In this embodiment, the locally hosted moderator server is operably coupled to a plurality of previously described viewer clients, as exemplified by viewer clients 2214 *a* and 2214 *a*, via previously described communications network 2202. The moderator server is further coupled to an interactive program server 5302 via the communications network. The interactive program server is operably coupled to the previously described moderator database 2230 and viewer database 2232.

In operation, the locally hosted moderator server is used by a moderator to create an interactive program for transmission to the viewer clients and moderator client as previously described. In this embodiment, viewer information is stored in the viewer database, moderator information is stored in the moderator database and the moderator server and the viewer clients access the information via the interactive program server. The local host may be any type of programmable device capable of bidirectional communication with other devices over a communications network. For example, the local host can be a game console, or a personal computer, or a set-top-box, etc.

Figure 46:
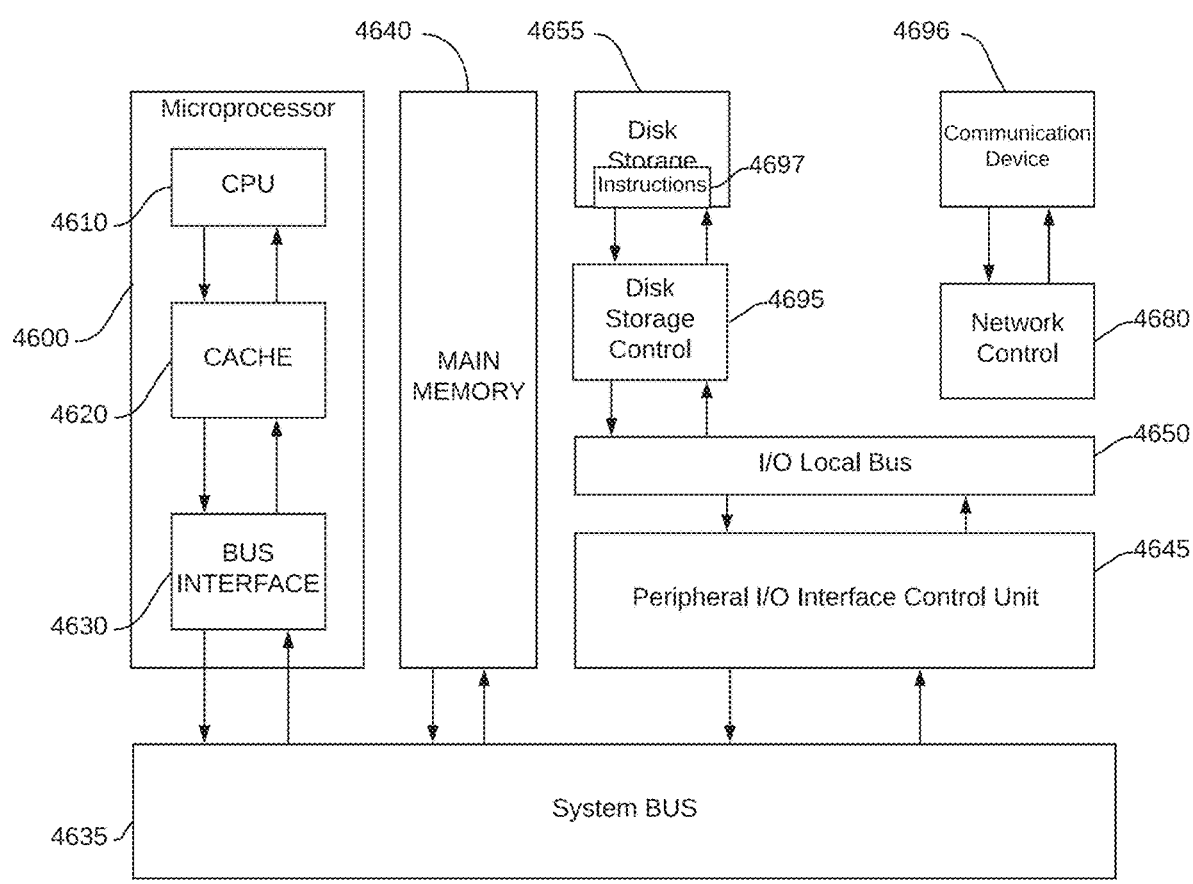
FIG. 46 is a hardware architecture diagram of a computing device suitable for use as a moderator server host in accordance with an exemplary embodiment of the present invention.

FIG. 46 is a hardware architecture diagram of a data processing system suitable for use as a moderator server host in accordance with an exemplary embodiment of the present invention. A microprocessor 4600, including a Central Processing Unit (CPU) 4610, a memory cache 4620, and a bus interface 4630, is operatively coupled via a system bus 4635 to a main memory 4640 and an I/O interface control unit 4645. The I/O interface control unit is operatively coupled via an I/O local bus 4650 to a disk storage controller 4695, and a network communications controller 4680. A communications device 4696 is operatively coupled to the network communications controller and is adapted to allow software objects hosted by the general purpose computer to communicate via a network with other software objects.

The disk storage controller is operatively coupled to a disk storage device 4655. Computer program instructions 4697 implementing a previously described moderator server are stored on the disk storage device until the microprocessor retrieves the computer program instructions and stores them in the main memory. The microprocessor then executes the computer program instructions stored in the main memory to implement the moderator server.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents.

What is claimed is:

1. A method for providing a moderated interactive program for a plurality of viewer client devices communicating over a communications network, each of the plurality of viewer client devices including a display and a user interface, the method comprising:
generating the moderated interactive program using multi-media content, a first interactive component, and a second interactive component, the multi-media content including a moderated discussion of a product, a service, or both a product and a service;
providing the moderated interactive program to each of the plurality of viewer client devices such that the multi-media content is displayed on the display of each of the plurality of viewer client devices, together with the first interactive component and the second interactive component, wherein the display of the first interactive component is synchronized with the display of the multi-media content;
receiving responses to the moderated interactive program from the viewer client devices while the moderated interactive program is being displayed on the viewer client devices, the responses being generated at the viewer client devices based on interactions of users of the viewer client devices with the second interactive component; and
as responses to the moderated interactive program are received, continually updating the moderated interactive program to include a reaction of at least one of the users of the viewer client devices to the multi-media content based on the received responses and providing the updated moderated interactive program to each of the plurality of viewer client devices for display at each of the plurality of viewer client devices,
wherein the first interactive component is displayed within the user interfaces of the viewer client devices and the users of the viewer client devices can interact with the first interactive component to purchase the product, the service, or both the product and the service discussed in the multi-media content while viewing the multi-media content.

2. The method of claim 1, wherein the responses to the moderated interactive program from the viewer client devices include responses to a poll.

3. The method of claim 1, wherein each of the user interfaces includes a third interactive component that directs the user of the viewer client device to additional information about the product, service, or both product and service discussed in the multi-media content.

4. The method of claim 1, wherein the communications network comprises a cable television network.

5. The method of claim 1, wherein the communications network comprises a wide area network.

6. The method of claim 1, further comprising:
receiving from a first one of the viewer client devices a viewer notification request;
generating a viewer notification based on the viewer notification request, the viewer notification indicating a broadcast of the interactive program; and
transmitting the viewer notification to the first one of the viewer client devices to notify the user of the first one of the viewer client devices of the broadcast of the interactive program.

7. The method of claim 1, wherein the first interactive component is generated using metadata associated with the multi-media content and wherein the metadata is generated using caption information extracted from the multi-media content.

8. The method of claim 1, wherein the first interactive component is generated using metadata associated with the multi-media content and wherein the metadata is generated by analyzing textual elements of the multi-media content.

9. The method of claim 1, wherein the first interactive component is generated by a dynamic link creation process.

10. The method of claim 1, wherein the second interactive component is generated by a dynamic link creation process.

11. The method of claim 1, further comprising associating one or more video frames or audio frames in the multi-media content with captioning information to present the one or more video frames or audio frames to one or more of the plurality of viewer client devices as part of the moderated interactive program.

12. The method of claim 1, wherein the responses to the moderated interactive program comprise real time chat messages.

13. The method of claim 1, further comprising embedding one or more Easter eggs in the moderated interactive program to enable the users of the plurality of viewer client devices to unlock features of the moderated interactive program.

14. The method of claim 1, wherein the responses to the moderated interactive program from the viewer client devices include votes from the users of the viewer client devices.

15. The method of claim 1, wherein the responses to the moderated interactive program from the viewer client devices include comments on the multi-media content from the users of the viewer client devices.

16. The method of claim 1, wherein:
the responses to the moderated interactive program from the viewer client devices include requests from the users of the viewer client devices for additional information about the at least one of the product and the service discussed in the multi-media content; and in response to the requests, the moderated interactive program is updated to include the additional information.

17. The method of claim 1, wherein the viewer interface incorporates web content for the product, service, or both product and service discussed in the multi-media content.

18. The method of claim 1, wherein the viewer interface includes a link to a web page where the users of the plurality of viewer client devices can purchase the product, service, or both product and service discussed in the multi-media content.

19. The method of claim 1, wherein the multimedia content, the first interactive component, and the second interactive component are generated at a producer client device.

20. The method of claim 1, wherein the multimedia content includes live video content, wherein the live video content, the first interactive component, and the second interactive component are generated at a producer client device, and wherein the first interactive component is placed within the live video content as the live video content is generated.

21. A system for providing a moderated interactive program to a plurality of viewer client devices over a communications network, each of the plurality of viewer client devices including a display and a user interface, the system comprising at least one server including a hardware processor, a hardware memory, and program instructions stored in the memory and executable by the processor to cause the at least one server to:
   generate the moderated interactive program using multi-media content, a first interactive component, and a second interactive component, the multi-media content including a moderated discussion of a product, a service, or both a product and a service;
   provide the moderated interactive program to each of the plurality of viewer client devices via the communications network such that the multi-media content is displayed on the display of each of the plurality of viewer client devices, together with the first interactive component and the second interactive component, wherein the display of the first interactive component is synchronized with the display of the multi-media content;
   receive responses to the moderated interactive program from the viewer client devices while the moderated interactive program is being displayed on the viewer client devices, the responses being generated at the viewer client devices based on interactions of users of the viewer client devices with the second interactive component; and
   as responses to the moderated interactive program are received, continually updating the moderated interactive program to include a reaction of at least one of the users of the viewer client devices to the multi-media content based on the received responses and providing the updated moderated interactive program to each of the plurality of viewer client devices for display at each of the plurality of viewer client devices,
   wherein the first interactive component is displayed within the user interfaces of the viewer client devices and the users of the viewer client devices can interact with the first interactive component to purchase the product, the service, or both the product and the service discussed in the multi-media content while viewing the multi-media content.

22. The system of claim 21, wherein the responses to the moderated interactive program from the viewer client devices include responses to a poll.

23. The system of claim 21, wherein each of the user interfaces includes a third interactive component that directs viewer client device to additional information about the product, service, or both product and service discussed in the multi-media content.

24. The system of claim 21, wherein the communications network comprises a cable television network.

25. The system of claim 21, wherein the communications network comprises a wide area network.

26. The system of claim 21, wherein the program instructions stored in the memory and executable by the processor further cause the at least one server to:
   receive from a first one of the viewer client devices a viewer notification request;
   generate a viewer notification based on the viewer notification request, the viewer notification indicating a broadcast of the interactive program; and
   transmit the viewer notification to the first one of the viewer client devices to notify the user of the first one of the viewer client devices of the broadcast of the interactive program.

27. The system of claim 21, wherein the first interactive component is generated using metadata associated with the multi-media content and wherein the metadata is generated using caption information extracted from the multi-media content.

28. The system of claim 21, wherein the first interactive component is generated using metadata associated with the multi-media content and wherein metadata is generated by analyzing textual elements of the multi-media content.

29. The system of claim 21, wherein the first interactive component is generated by a dynamic link creation process.

30. The system of claim 21, wherein the second interactive component is generated by a dynamic link creation process.

31. The system of claim 21, wherein the program instructions stored in the memory and executable by the processor further cause the at least one server to:
   associate one or more video frames or audio frames in the multi-media content with captioning information to present the one or more video frames or audio frames to one or more of the plurality of viewer client devices as part of the interactive program.

32. The system of claim 21, wherein the responses to the moderated interactive program comprise real time chat messages.

33. The system of claim 21, wherein the program instructions stored in the memory and executable by the processor further cause the at least one server to:
   embed one or more Easter eggs in the moderated interactive program to enable the users of the plurality of viewer client devices to unlock features of the moderated interactive program.

34. The system of claim 21, wherein the responses to the moderated interactive program from the viewer client devices include votes from the users of the viewer client devices.

35. The system of claim 21, wherein the responses to the moderated interactive program from the viewer client devices include comments on the multi-media content from the users of the viewer client devices.

36. The system of claim 21, wherein:
   the responses to the moderated interactive program from the viewer client devices include requests from the users of the viewer client devices for additional information about the at least one of the product and the service discussed in the multi-media content; and in response to the requests, the moderated interactive program is updated to include the additional information.

37. The system of claim 21, wherein the viewer interface incorporates web content for the product, service, or both product and service discussed in the multi-media content.

38. The system of claim 21, wherein the viewer interface includes a link to a web page where the users of the plurality of viewer client devices can purchase the product, service, or both product and service discussed in the multi-media content.

39. The system of claim 21, wherein the multimedia content, the first interactive component, and the second interactive component are generated at a producer client device.

40. The system of claim 21, wherein the multimedia content includes live video content, wherein the live video content, the first interactive component, and the second interactive component are generated at a producer client device, and wherein the first interactive component is placed within the live video content as the live video content is generated.

* * * * *